United States Patent [19]

Lumsden

[11] 4,287,567
[45] Sep. 1, 1981

[54] HIGH SPEED CENTRAL OFFICE SCANNER

[75] Inventor: James R. Lumsden, Edmonton, Canada

[73] Assignee: Universal Industrial Control Devices Ltd., Edmonton, Canada

[21] Appl. No.: 62,529

[22] Filed: Jul. 31, 1979

Related U.S. Application Data

[63] Continuation-in-part of Ser. No. 911,670, Jun. 1, 1978, abandoned.

[51] Int. Cl.³ ............................ G06F 15/16; H04Q 3/54
[52] U.S. Cl. .................................. 364/900; 179/18 ES; 179/18 AB; 179/18 FG; 179/2 DP
[58] Field of Search ... 364/200 MS File, 900 MS File; 179/18 ES, 18 AB, 18 FG, 2 DP, 2 R

[56] References Cited

U.S. PATENT DOCUMENTS

| | | | |
|---|---|---|---|
| 3,553,384 | 1/1971 | Lucas et al. | 179/18 ES |
| 3,629,851 | 12/1971 | Werner | 179/18 ES |
| 3,676,846 | 7/1972 | Busch | 364/200 |
| 3,725,866 | 4/1973 | Oldfield, Jr. et at. | 364/200 |
| 3,974,343 | 8/1976 | Cheney et al. | 179/18 ES |
| 3,987,252 | 10/1976 | Vicari | 179/18 ES |
| 4,027,289 | 5/1977 | Toman | 364/900 |
| 4,086,434 | 4/1978 | Bocchi | 179/2 AM |
| 4,144,407 | 3/1979 | Zaffignani et al. | 179/18 ES |

OTHER PUBLICATIONS

"An Experimental Digital Switching System", Perucca, Conference: International Switching Symposium Munich, Germany, Sep. 1974, pp. 22711-22718.

Primary Examiner—Gareth D. Shaw
Assistant Examiner—Eddie P. Chan

[57] ABSTRACT

The invention relates to a high speed central office scanner for use with a plurality of transponding units connected by telephone lines. The scanner is comprised of N, I/O units, each comprised of a multiplexer for connecting the I/O units to M telephone lines; a microprocessor and multiplex logic which sequentially selects one of the M telephone lines; a busy detect circuit for checking the selected telephone line and providing a signal when the line is busy; a TX/RX unit connected to the selected line for transmitting an instruction code to a transponder connected thereto when the signal is absent and for receiving data from the transponder in response to the instruction code; and a storage unit. The scanner further includes a master microprocessing unit, which includes a main microprocessor for sequentially selecting one of the N, I/O units and for generating an interrogating code for transmission to each selected I/O unit. Each master microprocessor unit includes a master storage unit for storing received data from the selected I/O unit and a main TX/RX unit for transmitting the received data stored in the main storage unit, upon receipt of a further interrogation code, wherein each of the N, I/O units scan the M telephone lines independently and asynchronously with respect to each other of the N, I/O units and the master microprocessing unit.

9 Claims, 5 Drawing Figures

HIGH SPEED CENTRAL OFFICE SCANNER

CROSS REFERENCE

This is a continuation-in-part application of U.S. application Ser. No. 911,670 which was filed on June 1, 1978 now abandoned.

INTRODUCTION AND GENERAL DISCUSSION

The present invention relates to a scanner and more particularly to a high speed scanner for use in both cyclically or randomly sending to and receiving information from a transponding device connected to a telephone system.

The scanner of the present invention can be used to access a transponder of the type described in copending U.S. patent application Ser. No. 881,791, now abandoned, which was filed on Feb. 27, 1978 and is assigned to Universal Industrial Control Devices Limited. It should however be understood that the scanner of the present invention is not limited to the particular transponder identified above and may be connected to pluralities of other transponders.

The entire scanning system is controlled by a central computer which can form a part thereof. The central computer has, as its inputs, information of a special request nature from various service companies. The computer codes this information to form an information block and then sends this block to the correct scanner of the system so that the block is eventually routed to the correct subscriber's transponder. The central computer is supplied with the standard I/O hardware for use by the companies, i.e. CRT displays, printers and disc storage memories.

In another embodiment the central computer transfers the special request to a data concentrator which then codes the information into an information block for transmission to the correct master microprocessor. Data received from the subscriber's transponder via the correct master microprocessor is then decoded by the data concentrator and feed directly to the central computer via a high speed direct memory access line. This latter embodiment relieves the central computer of its load in formulating the information blocks and in addition provides a system whereby the central computer is interrupted for only a short time while receiving data from the subscriber's transponder.

As will be seen from the detailed description, each subsystem operates within the overall system on what is known as a polled basis. In other words, when one subsystem has information to be sent to another subsystem, the subsystem to receive the information is first asked whether or not it is in a condition to actually receive this information. The receiving subsystem must send a "yes" reply to the transmitting subsystem before any data can be transmitted. This is an important feature of the subsystem because it allows each subsystem, the operation of which is controlled by its own microprocessor, to cyclically operate independently of each other subsystem, except when it is necessary for two subsystems to communicate with one another. When two subsystems communicate with one another then, and only then, do the two subsystems synchronize with one another. This independent asynchronous operation of the individual subsystems allows for fast scanning and high reliability. The polling requirement of one subsystem to communicate with another, ensures that no data is lost because two or more subsystems are simultaneously attempting to communicate with some other subsystem.

The scanning system is comprised of a plurality of I/O modules. In one embodiment of the invention, one module can handle 128 incoming pairs of telephone lines connecting as many as 128 transponders. Although several transponders can be individually accessed even though they are connected to the same telephone line pair, there cannot be more than 128 transponders connected to a given I/O module. For the purposes of this discussion, it will be assumed that only one transponder is connected to each telephone line pair. The I/O modules are set out in groups of 16 and their can be up to 8 of these groups. 2048 Transponders are connected as subsystems in 8 groups to a single master microprocessor. The master microprocessor is connected, via a data set, a high speed link and another data set, to a central computer. In one of the embodiments described in detail hereinbelow, the central computer can handle up to 16 master microprocessors, each of which can handle 128 I/O modules, each of which can handle 128 transponders. As a result, a system according to the present invention can handle 262,144 transponders. Using present day technology a scanner consisting of 128 I/O modules, 1 master microprocessor, and 1 data set can be housed in 10 linear feet of 7 foot high rack. This provides a scanning unit which is much smaller than conventional scanners.

Each of the 2048 I/O modules, the 16 master microprocessors and the central computer are subsystems which operate asynchronously performing their designated duties and only synchronizing with one another when data is to be transferred. Since 2048 I/O modules are independently operating, it can be seen that high reliability exists in this portion of the system. The 16 master microprocessors can each be duplicated and the program is such in the master microprocessors that when failure of one master microprocessor takes place, the central computer can shut down the faulty master microprocessor and can activate the redundant unit. The central computer can even be parelleled. Therefore, due to the redundancy of the subsystems and the independent asynchronous operation of the subsystems, high reliability of the system is ensured.

In another embodiment a data concentrator is connected between the central computer and the series of computer terminal data sets. One advantage of the data concentrator is that it can handle many more data sets. One embodiment can, for example, handle 20 data sets which will enable a single central computer to handle 327,680 transponders.

It was mentioned above that each subsystem is controlled by its own microprocessor. As a result, each subsystem is reprogrammable and so it can been seen, especially with respect to the I/O modules, that the system is very versatile. This reprogrammable feature allows the scanner of the present invention to be adapted to accept almost any type of transponder.

Each subsystem, before breaking its connection with a subsystem to which it is sending data, checks receipt of this data with respect to security and validity and sends a "handshake" signal back to the transmitting subsystem, if and only if the data has been received correctly. At that point, and only at that point, is the link between the two subsystems broken. It can therefore been seen that a system according to one embodiment of the present invention offers a high degree of data reliability as well as a high degree of subsystem reliability.

It is important that the scanner not effect the standard impedance of the telephone line when not in use. One embodiment of the present invention provides a scanner which has an infinite DC impedance on the tip to ring lines of the telephone system. This same scanner provides greater than 20 meg-ohms AC impedance when not selected and approximately a 600 ohm AC impedance, tip to ring, when selected. These standards are well within the specifications set out by the telephone companies.

The scanner embodiment mentioned above employs a novel circuit which isolates logic ground from the central office ground, thereby providing for the use of solid state switches which are capable of withstanding over voltages on the tip and ring lines which are far in excess of the break down voltage of the switches. In conjunction with this novel circuitry, the scanner employs a busy test circuit which consumes less than 300 microamps when a telephone circuit is selected. Other configurations of the busy test circuit according to the present invention use virtually no power from a selected telephone circuit.

In yet another embodiment a busy detect circuit is employed which has no connection whatever to the central office ground. This embodiment has a finite DC impedance on the tip and ring lines of the telephone system, however, this impedance is very large and well within the required specifications.

In order to fully understand the operation of the scanner, it is necessary to understand the kinds of intructions that the sanner must send to the many transponders connected thereto and the kind of information that can be retrieved from the transponders. As an example of this information transfer, the transponder disclosed in the above-mentioned United States patent application Ser. No. 881,791 now abandoned, will be described herein with respect to its receipt of instructions and its transmission of stored data. The transponder can be connected to three utilities and measures consumption of these utilities in accumulating registers. The transponder can initialize an accumulator and transmit the accumulated quantity when requested by the central computer.

The transponder also has an hourly peak demand memory which stores hourly consumption of the electric utility. This requires the transponder to keep track of the real time and date.

The transmit baud rate of the transmitter is also adjustable. The transponder can also be controlled to load shed certain "luxury" loads when demand of power is high. Finally, the transponder can be connected to fire and intrusion alarms. These alarms must be monitored on a cyclic basis.

To summarize, the following is a list of intructions received and data transmitted by and from the transponder:

Interrogate all three accumulators
Interrogate status word
Interrogate accumulators and status words
Interrogate hourly demand memory
Interrogate hourly demand memory, status word and accumulator
Reset—Accumulator 1 and retransmit
Reset—Accumulator 2 and retransmit
Reset—Accumulator 3 and retransmit
Reset—Hourly demand memory and Tx status word
Reset—Alarm register and retransmit
Load—Accumulator 1 and retransmit
Load—Accumulator 2 and retransmit
Load—Accumulator 3 and retransmit
Load—Time clock register and retransmit
Load—Customer identification code
Control 1 and retransmit status word
Control 2 and retransmit status word
Control 3 and retransmit status word
Control 4 and retransmit status word
Contrl 5 and retransmit status word
Baud rate—set for 150 B.
Baud rate—set for 300 B.
Baud rate—set for 600 B.
Baud rate—set for 1200 B.
Tx. control delay—set for 50 ms
Tx. control delay—set for 100 ms
Tx. control delay—set for 200 ms
Tx. control delay—set for 300 ms
Tx. control delay—set for 400 ms
Tx. control delay—set for 500 ms
Tx. control delay—set for 600 ms
Tx. control delay—set for 700 ms
Tx. control delay—set for 800 ms
Tx. control delay—set for 900 ms
Tx. control delay—set for 1000 ms
Tx. control delay—set for 1100 ms
Tx. control delay—set for 1200 ms
Tx. control delay—set for 1300 ms
Tx. control delay—set for 1400 ms
Tx. control delay—set for 1500 ms
Diagnostic RAM test pattern The instruction list defined above can be broken down into two groups, the first group containing merely the status word and the second group containing all of the remaining instuctions.

In order to instruct the transponder or to receive data from the transponder in the second group, the central computer must initialize the action. This group is known as the special request group. The status word is, however, different in that it includes information concerning the fire and intrusion alarms and therefore must be retrieved from the transponders on a cyclic basis. For this reason, the I/O module itself has a scanning routine under the control of an internal microprocessor which cyclically scans the transponders connected thereto retrieving status word data from the transponders. This scanning action is not controlled by the central computer, with the exception that the I/O module's scanning routine can be interrupted by the central computer to process a special request entry. Since 2048 I/O modules are simultaneously and asynchronously scanning a total of 262,144 transponders, it can be seen that each transponder is scanned much more often than would be the case if a single large scanner were employed or if a plurality of scanners were used which were synchronously controlled.

SUMMARY OF THE INVENTION

In accordance with an aspect of the invention there is provided a high speed scanner for communicating with a plurality of transponding units connected by telephone lines, said scanner comprising: N, I/O means, where N is a positive integer, each I/O means comprising: multiplex means for connecting said I/O means to M telephone lines, each telephone line being connected to at least one transponder, where M is a positive integer; a microprocessor; multiplex logic means, controlled by said microprocessor for sequentially selecting one of said M telephone lines; a busy detect means for checking said selected line and producing a signal when said selected line is busy; transmitting-receiving means connected to said selected line, controlled by said microprocessor for transmitting an instruction code to a transponder connected thereto when said signal is absent, and receiving data from said transponder in response to said instruction code; storage means; and I/O interface logic means, wherein said microprocessor analyzes the received data and enters the received data in said storage means if the received data satisfies a predetermined criterion; master microprocessor means comprising: interface logic means connected with said I/O interface logic means of each of said N, I/O means; a main microprocessor for sequentially selecting one of said N, I/O means and for generating an interrogation code for transmission to each selected I/O means to enquire if said selected I/O means has received data stored therein; main storage means for storing received data from said selected I/O means; and main transmitting-receiving means for transmitting said received data stored in said main storage means upon receipt of a further interrogation code; wherein each said N, I/O means scan said M telephone lines independently and asynchronously with respect to each other of said N, I/O means and said master microprocessor means.

INTRODUCTION TO THE DRAWINGS

The present invention will be described in detail hereinbelow with the aid of the accompanying drawings in which.

DETAILED DESCRIPTION OF PREFERRED EMBODIMENT

Figure 1:
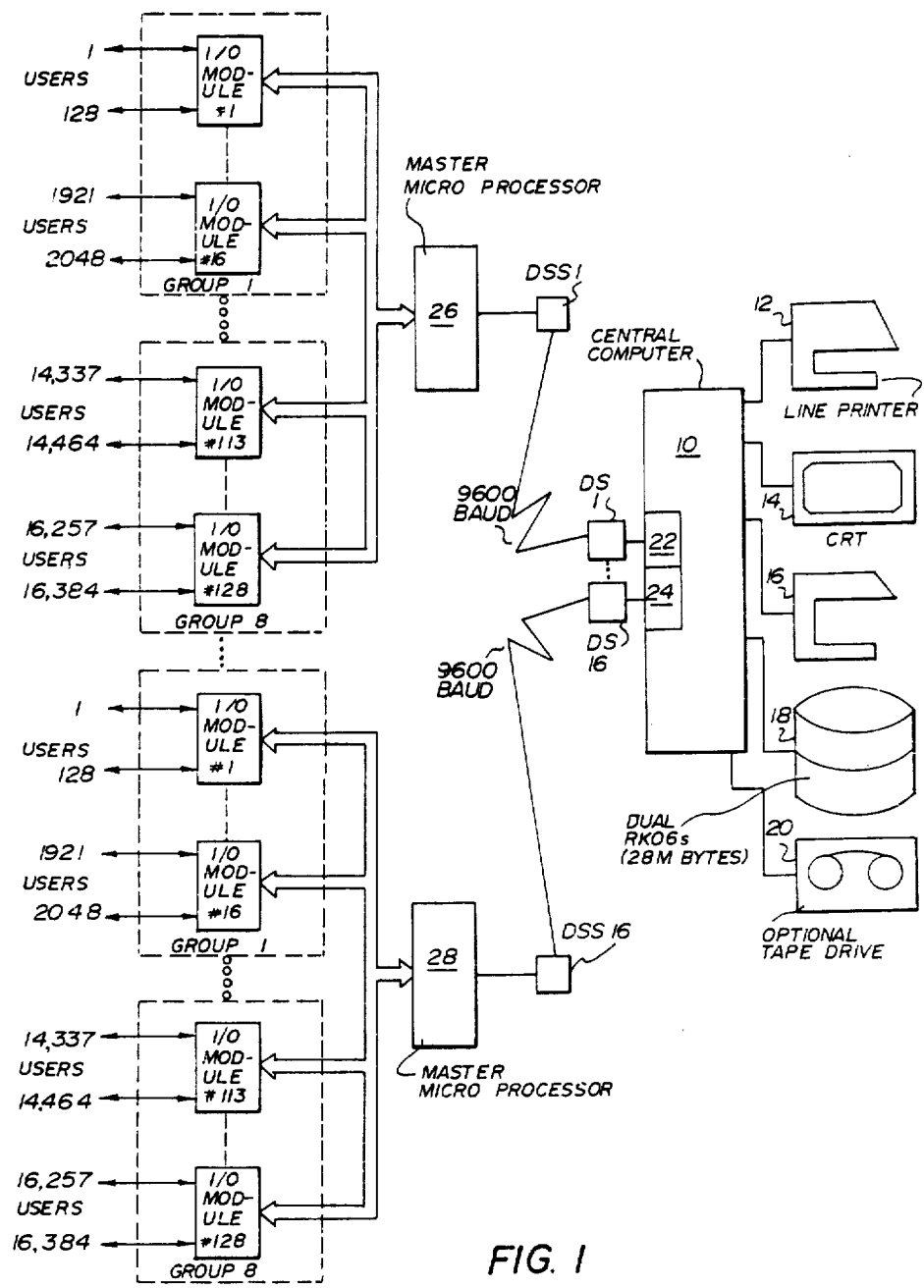
FIG. 1 is a schematic representation of an overall scanning system according to one embodiment of the present invention.

With reference to FIG. 1 it can be seen that one embodiment of the system is comprised of a central computer 10 having the standard I/O devices 12, 14, 16, 18 and 20 connected thereto, such as line printers, cathode ray tube displays, disc drives and tape drives.

The computer 10 is provided with a plurality of I/O interfaces. In FIG. 1 only two are shown, namely interfaces 22 and 24.

Each interface is connected to a data set DS1 through DS16. The data set translates digital data to be transmitted by the computer 10 into standard FSK. Similarly, the data set converts FSK signals being received by the computer and converts these signals into digital data signals. Each data set DS1 through DS16 is connected, on a one-to-one basis to a second data set. These data sets are designated DSS1 through DSS16. The data sets are each connected by a high speed link capable of transmitting FSK signals at a rate of 9600 baud.

Each data set DSS1 through DSS16 is connected to a master microprocessor, two of which are shown at 26 and 28 in FIG. 1.

As is shown in FIG. 1, each 128 users or subscribers are connected via a telephone line to an I/O module, with 128 such modules being connected in parallel to a single master microprocessor. Since the central computer can handle 16 master microprocessors and since each master microprocessor can handle up to 128 I/O modules, the system shown in FIG. 1 can handle up to 262,144 subscribers. Of course, it would be impossible to shown the entire schematic diagram in FIG. 1, and so middle repetitive portions have been removed.

In addition, for the sake of simplicity, 16 I/O modules have been grouped together so that one master microprocessor handles 8 such groups.

Figure 2:
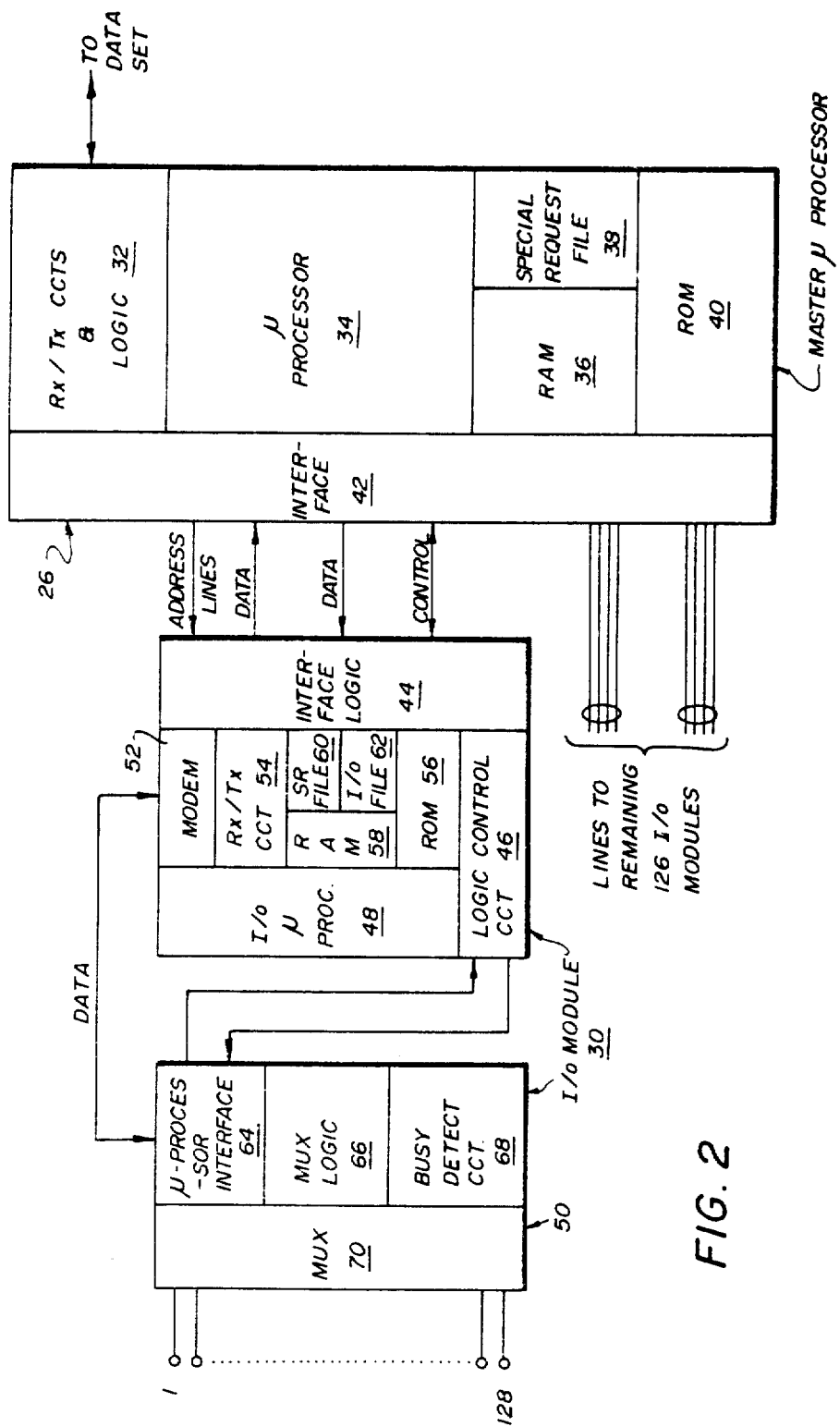
FIG. 2 is a schematic diagram of one I/O module and one master microprocessor according to a particular embodiment of the present invention.

FIG. 2 is a schematic diagram of a master microprocessor 26 and one I/O module 30.

The master microprocessor 26 is comprised of receive and transmit circuits and logic 32; a microprocessor 34; a random access memory (RAM) 36 containing a special request file 38; a read only memory (ROM) 40 and interface logic 42. The logic block 32 receives data from the central computer and checks both its security and validity. If validity and security of the incoming signal are correct, the input data is stored in the special request file 38 of RAM 36. Similarly, data to be transmitted from master microprocessor 26 is assembled in logic block 32 from RAM 36 prior to its transmission. Logic block 32 adds to the data to be transmitted the correct codes to satisfy security and correct parity bits and words to satisfy validity.

Data coming from the I/O modules is stored in RAM 36 prior to its transmission to the central computer.

ROM 40 contains the program which controls microprocessor 34 which, in turn, controls the various modules and sequences which take place in the master microprocessor 26.

Interface logic 42 receives data and control signals from all of the I/O modules and routes this data, upon command of microprocessor 34, to the appropriate place. It should be noted that interface logic 42 interconnects with 128 I/O modules.

A typical I/O module is shown at 30 in FIG. 2. It should be remembered that the system as described herein in detail contains 2048 such modules.

I/O module 30 is comprised of interface logic 44 which interconnects the I/O module with master microprocessor 26; logic control circuit 46 which, under the control of I/O microprocessor 48, sends the appropriate logic signals to switching input block 50 of the I/O module. The I/O module also includes a modem 52 which receives the FSK data from the transponder and converts it into a digital signal. The modem 52 also operates in the opposite direction converting digital data instructions of the I/O module into FSK instructions to be sent, via the switching block to the appropriate transponder. RX/TX circuit 54 performs the same function as block 32 in the master microprocessor 26, in that it checks security and validity of the incoming signal and prepares the correct signal to be transmitted to the transponder. The program controlling the I/O microprocessor 48 is stored in ROM 56. The I/O module also contains RAM 48 which includes special request file 60 where information to be sent to the transponder is stored and I/O file 62 wherein information to be transmitted to the master microprocessor 26 is stored.

The switch block portion 50 of the I/O module 30 is comprised of an interface 64 which feeds appropriate signals to multiplex (MUX) logic block 66 which in turn selects which switch is to be activated in order to connect the correct telephone line to the I/O module so that the correct transponder be accessed. In addition, the interface 64 connects the data to be transmitted to the transponder to the correct telephone line once it has been selected. Data being returned to the I/O module is routed into RAM 58 via interface 64. The switch block 50 also checks to see if the selected line is busy and the busy information is transmitted via interface 64 from busy detect circuit 68. The switch block 50 also includes multiplex switching network (MUX) 70. MUX 70 contains the switches necessary to selectively connect one of the 128 telephone lines to a single I/O module.

Figure 3:
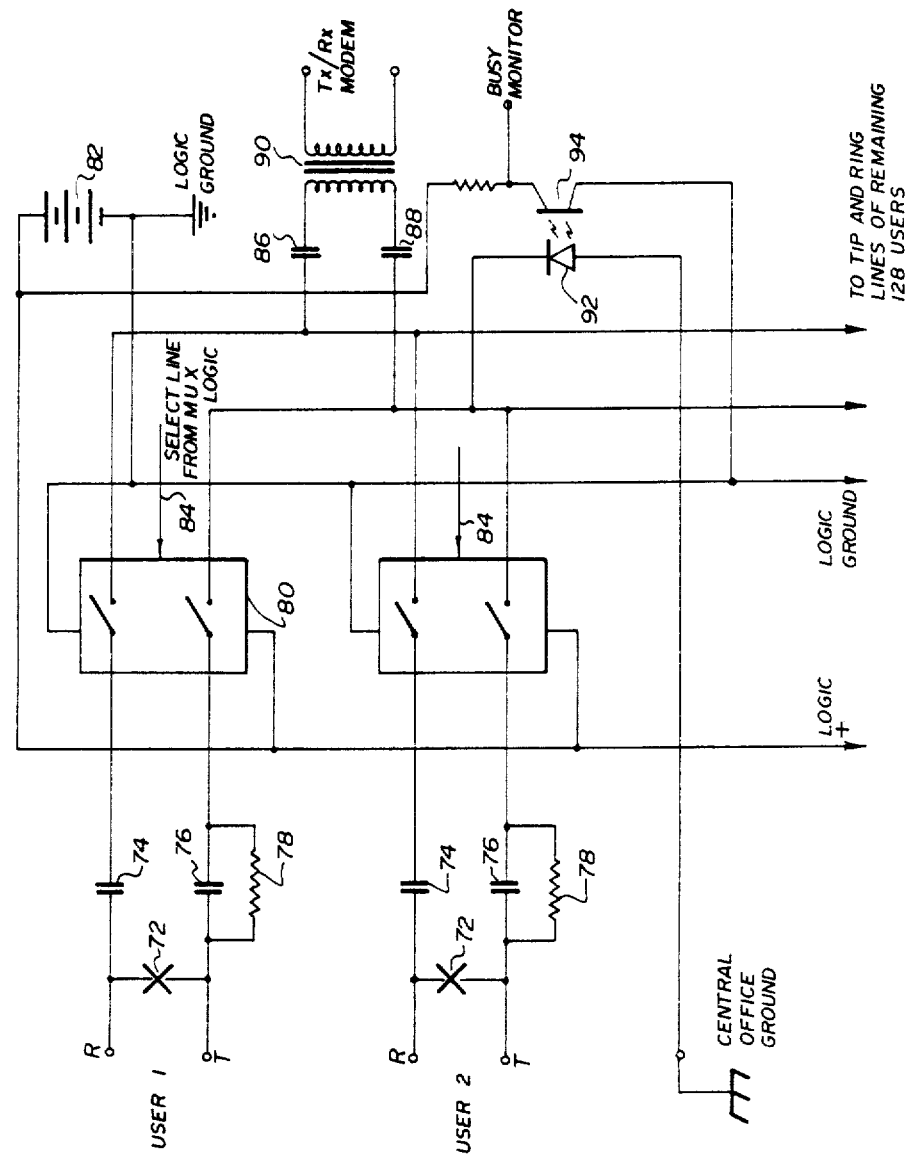
FIG. 3 is a schematic diagram of a portion of the input circuitry to a particular I/O module in accordance with the present invention.

FIG. 3 is a partial schematic diagram of switching block 50. Each user is connected to the system via a tip (T) and ring (R) line. FIG. 3 shows only two user connections, however, it should be understood that each module is capable of handling 128 users. Each T-R line has an over voltage gas discharge protection device 72 or equivalent connected thereto. Each T-R line is isolated, in a balanced manner by capacitors 74 and 76. The T line of each user is DC coupled to the system via resistor 78.

Electronic switch 80 is of the double-pole, single-throw type and disconnects both tip and ring lines from the remainder of the system. Switch 80 is activated by battery 82. It should be noted that battery 82 is connected to a different ground than the main ground of the central office. Large over voltages can appear between the tip and ring lines and the central office ground and these voltages are isolated from the solid state switches and the logic circuitry controlling them. As a result, it is possible for the switches and the logic circuits to handle telephone lines having high over voltages appearing thereon without being destroyed.

The switches are turned on by activation of the appropriate select line 84 controlled by MUX logic 66 shown in FIG. 2.

The selected telephone line is fed to TX/RX modem 52 via a balancing network consisting of capacitors 86 and 88 and transformer 90.

When a user line is busy and is selected, there will appear a voltage between the central office ground and the T line sufficient to activate LED 92 connected thereacross. This biases phototransistor 94 to its conductive state and a logic level ground voltage appears on the busy monitor output. This signal is sent to logic control circuits 46 of FIG. 2 and inhibits an instruction signal being sent via that busy line. This busy inhibit circuit can be overriden as will be explained below.

The optoelectronic switch consisting of LED 92 and phototransistor 94 completely isolates the logic voltage system from the telephone voltage system. Such a circuit draws approximately 300 micro amps from the selected telephone line. Other busy detect circuits can reduce this current draw, for example a differential amplifier connected to an optoelectronic switch would, for all practical purposes eliminate current consumption on the selected line.

Each I/O module can operate independently of the central computer and does so most of the time. Each module cyclicly scans the transponders connected thereto. The I/O module sends to each transponder the instruction to provide the I/O module with the status word. The status word information is compared with what is expected and if something is out of the ordinary, the data received from the transponder interrogated, is placed in the I/O file 62 and is then sent to the central computer the next time the master microprocessor scans that particular I/O module. Each master microprocessor can scan all 128 I/O modules in approximately 200 milliseconds. As a result, information contained in an I/O file in an I/O module will not be stored there very long before it is sent on its way to the central computer. This is critical because the status word contains information concerning the condition of the fire and intrusion alarms. If one of these alarms is set, this information must be transmitted to the appropriate authority as soon as possible.

As was mentioned above, the scanner of the present invention is reprogrammable and therefore connectable to different types of transponders. However, the status word used in the transponder according to the above-identified application will be described in detail for the sake of completeness. When a transponder is interrogated with respect to its status word, it sends 9 data words back to the I/O module. The first data word is the alert code. The second is the I.D. code of the transponder. The third is the customer I.D. code. The fourth is the baud rate at which the transponder is set and the transmit delay time of the modem enable signal. This delay time allows a transmitter to power up prior to sending data if the transponder is used in a radio link rather than in a telephone system. The fifth word contains information concerning the condition of the 8 status/alarm inputs connected to the transponder. The sixth word contains information concerning the real time clock and date to which the transponder has been set. The seventh word contains information concerning the current value of the peak demand accumulator. The remaining two words are used for data security.

It can be seen that if any of the data being returned to the I/O module from a transponder interrogated to supply the status word does not favourably compare with the pre-programmed data that should be received, it is essential that the correct authority be notified as soon as possible.

The I/O module scans only those transponders connected to users who have subscribed to a fire and intrusion alarm service. If all 128 subscribers connected to a particular I/O module subscribed to such service, the I/O module scans each user approximately every two minutes. However, it has been estimated that only approximately 30% of the subscribers connected to a given module will request alarm checking. As a result, the scan time is reduced considerably, to approximately 30 seconds.

All other instructions sent to the transponder from the I/O module must originate as a special request at the central computer. The logic and circuit path from the central computer to a particular transponder and back to the central computer will now be described using an example of a special request. The special request will be to have printed out at the terminal end of the system the accumulated power consumption of user No. 79 connected to the fifth I/O module connected to master microprocessor 26.

All other special requests are handled in a similar manner with the exception that data returned to the computer varies with respect to its length.

The computer operator equates the name of the subscriber with what is known as a SMCT number. This number designated the particular master microprocessor scanner being used (S); the particular module being used (M); the partaicular customer being interrogated (C); and the interrogation code of the transponder on that customer's line (T). This information is placed in the central computer along with a function code, for example the function code 8, designating that it is the accumulator which is to be read. The central computer takes this information and forms an information packet. In addition to the SMCT number and the function number, the computer forms the package using a message index number, a space for a number of data words to be transmitted to the transponder, a number representing the number of data words, security checking and a bit indicating message priority. In this particular example, no data words are being sent. However, if a particular accumulator register in a particular transponder were being loaded, the data word would consist of the information to be loaded into the register of that particular transponder.

The central computer sends, through interface 22 to master microprocessor 26 the interrogation "do you have information to transmit back to the central computer?" If the answer is "yes", then the central computer requests that this information be transmitted from master microprocessor 26 to central computer 10 via data sets DSS1, DS1 and interface 22. The master microprocessor sends the information to the central computer and the central computer immediately checks the information with respect to both security and validity. If the security and validity of the transmitted data is correct, the central computer once again interrogates the master microprocessor 26 enquiring whether information is to be sent back to the central computer. This time, the master microprocessor indicates "no" and the central computer will then indicate to the master microprocessor 26 that data is to be sent thereto. The information in the data package is then sent to the master microprocessor 26. Master microprocessor upon receipt of the information stores it in RAM 58 and decodes it with respect to security and validity. If the information packet was received correctly, the master microprocessor sends a handshake back to the central computer indicating that the information was received correctly. The link is then broken between the master microprocessor and the central computer and the central computer carries out its next instruction, for example sending a special request to another master microprocessor in the system or scanning the master microprocessors to enquire if the data is to be sent back to the central computer.

When the information is decoded and the handshake is sent to the central computer, the information to be transmitted onto the I/O modules is stored in the special request file 38 of master microprocessor 26. The master microprocessor program circulates, scanning the various I/O modules connected thereto. When it is completed, the next scan of the next I/O module say the Rth module, it checks its special request file to see whether any information is to be forwarded on. Since there is a special request to be sent on, i.e. to module No. 5, the master microprocessor skips to I/O module 5 and enquires whether data is to be transmitted back to the master microprocessor 26 from I/O module No. 5. If the answer is "yes" then that information is sent back to master microprocessor 26 and is checked with respect to its security and validity. If the data has been sent correctly, master microprocessor 26 then transmits the data contained in special request file 38 to I/O module 5. Upon completion of this transmission of data, the I/O microprocessor 25 checks the security and validity of the received data and sends a handshake back to master microprocessor 26 indicating that the information has been correcty received. The information is then stored in special request file 60 of the I/O module 30 which represents a typical I/O module and which represents I/O module No. 5. The master microprocessor then carries on its sequential scan going back to the (R+1)the I/O module, i.e. the I/O module following the one it was previously scanning.

The I/O module number 5 then goes back to its normal scan of its 128 customers. After it is finished, the next customer, it checks the special request file to see if a priority bit appears therein. If no such priority bit appears, I/O module No. 5 continues its scan of its 128 customers. If the priority bit did exist, then I/O module No. 5 would process that special request by immediately accessing customer No. 79, and sending the appropriate interrogation instruction thereto. The correct data would then be transmitted back to I/O module No. 5 from subscriber No. 79's 0th transponder. The data would be checked with respect to security and validity. If the data was correct, it would be placed in I/O file 62 of I/O module 5 and the microprocessor 48 would then continue its sequential scanning of its 128 subscribers.

If no priority bit appeared in the special request file, I/O module No. 5 would finish scanning all 128 subscribers, and then go to the special request file and process the special request as in the sequence mentioned above.

If less than 128 subscribers are connected to any given I/O module, only those subscribers connected are scanned, for example, if only two subscribers were connected to an I/O module, they would be the only subscribers scanned and, as a result, the scan rate would increase considerably. This leads to other ramifications which will be discussed below.

The checked information is now contained in I/O file 62 of RAM 58 of I/O module No. 5. I/O module No. 5 raises, in its I/O file, a flag which indicates to master microprocessor 26 that it has information to be transmitted back to the master microprocessor the next time that the master microprocessor scans I/O module No. 5. When that time arises, the interrogation goes out to I/O module No. 5 from master microprocessor 26, "do you have information for me?". The flag in I/O file 62 indicates "yes" and so data contained in I/O file 62 is transmitted to the master microprocessor RAM 36 from I/O module No. 5. Once again, security and validity of the incoming data is checked. If the data is received correctly by master microprocessor 26, a handshake is sent back to I/O module No. 5 and I/O module No. 5 then carries on with its sequential scanning of the 128 customers. The correct information now is stored in RAM 36 of master microprocessor 26 and it is ready for transmission back to the central computer. The central computer sequentially scans all master microprocessors, i.e. in the system described herein, all 16. When it comes to master microprocessor 26, it sends out the interrogation "do you have any data to be transmitted to the central computer?" In this particular instance, the answer would be "yes" and master microprocessor 26 would then send the appropriate data back to the central computer. The central computer would, once again, check the data with respect to its security and validity and if all the data was received correctly, a handshake would go back to the master microprocessor 26 to send it on its scanning routine once again.

Once in the central computer, the received data is placed in an information file and this file is equated with the file originally sent. The combined information is then sent to an output device, for example, a printer.

The microprocessor unit in the I/O module contains certain standard information relating to each customer. The first portion of this information consists of I/O control function words. There are six such words. The first word is broken down into 8 bits. The first bit relates to load shed service. This bit is a 1 if the customer has requested such a service. Bit 2 is the load shed activate bit and is controlled via the central computer. Bit 3 is the alarm service bit and is a 1 if alarm service has been requested by the subscriber. Bit 4 is the alarm service customer arming bit. This bit is a 1 when the customer has armed his alarm service. Bit 5 is a busy override. If this bit is a 1, then the busy override routines take place. If this bit is a 0, the busy overrides do not take place. Bit 6 is a customer scan bit and is used by the telephone companies strictly for diagnosis. Bit 7 is an auto-peak demand load shaving service. Bit 8 defines the type of alarm that the subscriber has subscribed to, i.e. fire or intrusion or combinations of fire and intrusion.

The second word of the I/O control function words is the customer identification word and can range from the number 0 to 255. The third word is the transponder identification word and can range in number from 0 to 63. The fourth word is the transponder transmit function codes and is broken down into two 4 bit nibbles.

The first nibble represents a transmit delay for powering up a transmitter in a transponder. The second nibble represents the transmit baud rate at which the transponder was originally set. The fifth word and the sixth words are working registers and are broken up into 4 bit nibbles.

The first nibble represent the working register for the number of attempted retry passes. The second nibble represents the working register for the number of busy passes for alarm routine before override. The third nibble represents the working register for the number of detect alarm passes and the fourth nibble represents the working register for auto-peak demand load shaving. These four nibbles will be discussed in detail below in conjunction with the constant file.

The constant file pertains to the entire I/O module, as opposed to the function words which, as mentioned above, pertain to each individual customer connected to the I/O module. The data in the constant file must be downloaded to the appropriate I/O module from the central computer.

With respect to this constant file, the first byte consisting of 8 bits relates to the number of retries while on a subscriber telephone line. For example, if this number were set at 3, the I/O module would interrogate the customer's transponder three times, each time reducing the baud rate. If the I/O module still did not get a valid response from the transponder in question, it would place a 1 in the first nibble of the working register. The I/O module would then proceed to scan its 128 subscribers returning to the subscriber in question. Before interrogating the subscriber a second time, the program contained in the I/O module looks at byte 2 of the constant file to see how many retry passes can be performed before reporting an alarm condition. If, for example, byte 2 contained the number 2, then the system would interrogate the subscriber in question three more times, the number set in the first byte of the constant file. If, after this second three time attempt, no valid information was retrieved, the I/O module would prepare an alarm packet of information which would be sent to the central computer.

Byte 3 of the constant file contains the allowable peak demand consumption for load shaving. For example, the number 10 could be entered into byte 3. The number 10 would, of course, represent 10 kilowatts. The I/O module continuously scanning consumption of its 128 customers, when it found a subscriber reaching this predetermined number, would do either a load shaving or an alarm function in the subscriber's home and prepare a peak demand consumption overload information packet to be sent back to the central computer. At the end of the hour, the load shaving and the alarm system would be reset and the next hour of consumption would be monitored with respect to the predetermined number loaded into byte 3. Byte 4 is used in conjunction with the subscribers' function words and relates to the number of allowable busy passes before override as allowed during an alarm routine. For example, if the alarm service was requested in the function word, and the busy override function was set, then the system would bypass the customer a predetermined number of times, i.e. the number of times set into byte 4, before performing a busy override. If the customer arming bit were up in the function word, then the override would be immediate.

Byte 5 has a number set therein equal to the number of allowable passes when an alarm has been detected before reporting to the central computer. This function is used to eliminate many false alarms. For example, if in the subscribers' home the toast burns and the smoke detector is activated, this activation is an invalid fire alarm in the house. Byte 5 can be set so that such a mild problem can be corrected with in the house by the subscriber before a valid alarm is transmitted back to the central computer.

Bytes 6, 7, 8 and 9 relate to the real time day and real time clock and are used to synchronize the transponder, a function necessary in storing peak demand information.

Returning now to the function word, if for example, a subscriber subscribes to load shed service, then the first bit in the first function word is set to a "1". The central computer then sets the second bit. These two bits are "ANDED" and if the result is a "1", load shedding takes place. Once the load shedding function has been validly acknowledged, the second bit returns to a "0" and the load shed is maintained until such time as the load shed is to be removed at which time the second bit will become a "1", "ANDED" with the first bit to activate the load shed relays in accordance with the data contained in the special request file. This format allows the load shed and the alarm service to be operated simultaneously.

The sixth bit scans the customer and is used by the telephone company for looking at its telephone cables. If this bit is a "1", then all telephone subscribers are scanned. If alarms return on these subscribers, the telephone company's computer can quickly equate alarms with bad telephone lines and/or broken cables.

As was mentioned above, when fewer than 128 subscribers are connected to any given I/O module, it is necessary to make changes in the alarm reporting times because of the increased scanning rate, in for example, the alarm systems of the I/O module. Various bits relating the alarm mechanisms in the constant file must be increased due to the increase scan rate so that the same period of time elapses before valid alarms are sent to the central computer. As a result, each I/O module can be tailored depending on the number of subscribers connected thereto. It should be noted that this is not possible with existing prior art systems.

Figure 4:
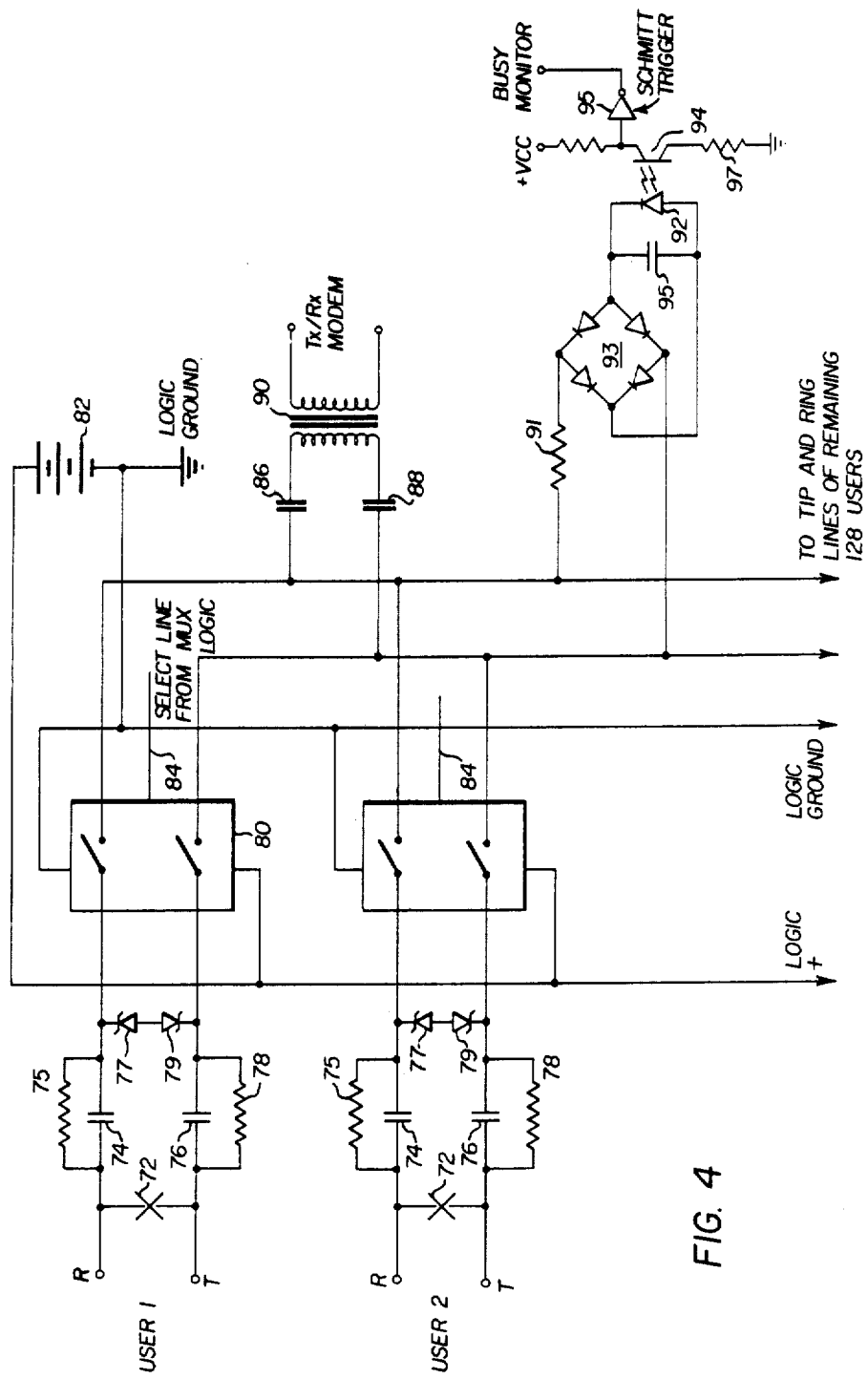
FIG. 4 is a schematic diagram of another embodiment of a portion of the input circuitry to a particular I/O module in accordance with the present invention.

FIG. 4 illustrates another embodiment of the input circuitry to a particular I/O module and in particular another embodiment of a busy detect circuit 68 shown in FIG. 2. In this embodiment it is not necessary to connect any part of the tip and ring circuitry to the central office ground and therefore the tip and ring lines are completely floating. Resistor 75 which is in the order of 75 K ohms is placed across capacitor 74, thereby loosely DC coupling switch 80 to the tip and ring lines of the telephone system. High speed zener diodes 77 and 79 are connected across the tip and ring lines to clip any signals appearing across the lines at approximately 7 volts. The DC voltage on the tip and ring lines passes through both sides of switch 80 and interfaces with the busy detect circuit through resistor 91 which is approximately 10 K ohms. The signal is then passed through a full wave bridge rectifier 93 and capacitor 95. The busy detect circuit is therefore sensitive to the DC voltage across the tip and ring lines and the bridge rectifier 93 makes the diode 92 immune to the polarity of the DC voltage applied to the tip and ring lines. The DC voltage on the tip and ring lines produces a current through photodiode 92. When the voltage across the tip and ring lines is approximately 48 volts the telephone line is in a "not-busy" state. This voltage produces a current through diode 92 which is sufficient to turn on photosensitive transistor 94 which, in turn lowers the voltage at the input to Schmitt trigger 95, which produces a high logic level voltage at its output. If the telephone line becomes busy the DC voltage drops to, from a few volts, to about 35 volts on the tip and ring lines. This reduced voltage is insufficient to activate diode 92 and therefore transistor 94 is turned off producing a low logic level voltage at the output of Schmitt trigger 95. Resistor 97, connected in series with phototransistor 94 forces the transistor to operate as an analog amplifier. The value of resistor 97 can be adjusted so that a particular threshold voltage across the tip and ring lines activates the Schmitt trigger 95. Typically the circuit is set to activate at a tip and ring voltage of 40.

Figure 5:
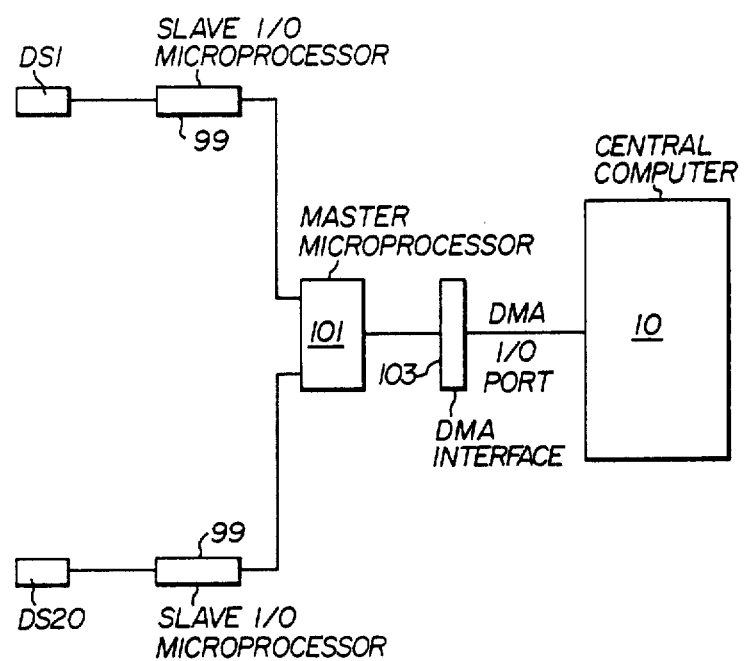
FIG. 5 is a schematic diagram of a data concentrator used in another embodiment of the scanning system according to the present invention.

FIG. 5 shows an embodiment of the system wherein a data concentrator is used to reduce the load on the central computer. The data concentrator is not a necessary addition if one is willing to use a large central computer. However, the cost savings of a data concentrator and a smaller computer far outway the cost of the larger central computer. Additional advantages are also obtained since the central computer 10 is connected to the data concentrator by a very high-speed direct memory access port. As a result, information from the transponders can be feed into the central computer 10 rapidly, thereby interrupting the central computer for very short periods of time. The formation of the information block and the error checking of the signal from the various transponders is carried out by the data concentrator. With this system it is also possible to increase the number of data sets DS connected to the central computer 10 and therefore the number of transponders in service, without increasing the size of the central computer. The embodiment shown in FIG. 5 has been illustrated as handling 20 data sets and therefore 327,680 transponders, however, it should be understood that the present invention is not limited to this number. Each data set DS is connected to a slave I/O microprocessor 99. This slave microprocessor 99 can be the same as that employed in the I/O module 30 in FIG. 2 located in the scanning unit itself. Each slave microprocessor is programmed to formulate the appropriate information block for transmission to the master microprocessor and for verifying the quality of signals received from the master microprocessor. Each slave microprocessor 99 is polled as all other units in the system and only transmits when told that the receiver is available to receive. Each slave microprocessor 99 is connected to a master microprocessor 101 which receives data from the slave microprocessors and transmits to the central computer 10. Special requests from the central computer 10 are handled by master microprocessor 101 and fed to the appropriate slave microprocessor 99 for transmission to the appropriate master microprocessor, I/O module or transponder. The master microprocessor can be the same as the unit 26 shown in FIG. 2. The central computer 10 and the master microprocessor 101 are interconnected via a direct memory access interface 103.

The terms "security" and "validity" checking of the signal have been mentioned. Security relates to the data errors that are produced during transmission. To check security is to check that no bits in the data of the returning signal have been changed. This is done by using parity and other cyclic redundancy technques. The validity portion of the check makes sure that the correct transponder has been accessed. Since the security and validity checks follow from the transponder to the I/O module and to the master microprocessor and the central computer, the signal is not only checked at the transponder but at each transfer stage within the entire system.

The system can consist of a plurality of I/O modules connected to a single master microprocessor. If the system is reduced to this size a central computer is not necessary and appropriate I/O devices may be connected directly to the master microprocessor. In accordance with the embodiment described in detail such a system of reduced size could handle 16,384 subscribers.

Listed below are the computer programs in BASIC language which control the master microprocessor 26 and the I/O module 30, respectively:

```
0001 ..
0002 ................................................
0003 ................................................
0004 ...CODE AND VARIABLE TABLE FOR SCANNER MCP...
0005 ................................................
0006 ................................................
0007 ..
0008 ..REV 3.6, JUNE 6/79
0009 ..
0010 ..
0011
0012
0013
0014           ..REGISTER EQUATES..
0015    TMP5= #00  ..INITIALIZATION PC; RX, TX WORD COUNT
0016  INTVTR=#01  ..INTERUPT VECTOR AND PC FOR INTERUPTS
0017  STKPTR=#02  ..FIRST IN LAST OUT DECREMENTING
0018              .. STACK POINTER
0019  PROCTR=#03  ..MAIN PROGRAM COUNTER
0020    CALL= #04  ..STANDARD SUBROUTINE CALL
0021  RETURN=#05  ..STANDARD SUBROUTINE RETURN
0022    LINK= #06  ..SUBROUTINE RETURN LOCATION;
0023              .. SUBROUTINE PARAMETERS
0024  UPINPT=#07  ..POINTER FOR UART INPUT MESSAGES
0025  UPOUPT=#08  ..POINTER FOR UART OUTPUT MESSAGES
0026  DNINPT=#09  ..POINTER FOR BUS INPUT MESSAGES
0027  DNOUPT=#0A  ..POINTER FOR BUS OUTPUT MESSAGES
0028    TMP1= #0B  ..USERS TEMPORARY REGISTER
0029    TMP2= #0C  ..USERS TEMPORARY REGISTER
0030    TMP4= #0D  ..USERS TEMPORARY REGISTER
0031    BASE= #0E  ..ADDRESSING REGISTER FOR VARIABLES
0032  FLGWRD=#0F  ..MAIN FLOW FLAG WORD
0033    FREE= #02  ..FREE LOCATION; SAME AS STACK POINTER
0034
0035
0036           ORG #0180
0037
0038 VARTAB: ,X'147F'  ..STKPTR
0039         ,X'0000'  ..FLGWRD
0040         ,X'1500'  ..UPINPT
0041         ,X'1650'  ..UPOUPT
0042 CNTOP1: ,X'C0'    ..CONTROL OUTPUT 1
0043 CNTOP2: ,X'00'    ..CONTROL OUTPUT 2
0044 CNTOP3: ,X'00'    ..CONTROL OUTPUT 3
0045 CHANEL: ,X'FF'    ..CHANNEL # OUTPUT TO MUX.
0046 VRTEND: ,A(VARTAB+#60) ..END OF TABLE
0047 INDEX:  ,X'00'    ..MESSAGE INDEX # FOR ERRORS
0048 UPIOLD: ,X'1500'  ..UP-IN-OLD (BUS) PNTR
0049 UPOOLD: ,X'1650'  ..UP-OUT-OLD (UART) PNTR
0050 DNIOLD: ,X'1650'  ..DOWN-IN-OLD (BUS) PNTR
0051 DNOOLD: ,X'1500'  ..DOWN-OUT-OLD (BUS) PNTR
0052 UPINST: ,X'1500'  ..START OF UP-IN-FILE
0053 UPOUST: ,X'1650'  ..START OF UP-OUT-FILE
0054 UPINEN: ,X'1630'  ..END OF UP-IN-FILE
0055 UPOUEN: ,X'1EA0'  ..END OF UP-OUT-FILE
0056 MEMEND: ,X'BFFF'  ..END ADDR FOR RAM TEST
```

```
0057 MEMSTR: ,X'1400'    ..START ADDR FOR RAM TEST
0058 CPUADR: ,X'18'      ..SCANNER MASTER DESIGNATOR (TYPE)
0059 BUSERR: ,X'00'      ..BUS ERROR COUNTER
0060 URTERR: ,X'00'      ..UART ERROR
0061 MAXERR: ,X'03'      ..MAX BUS ERRORS ALLOWED
0062 TMOUT1: ,X'30'      ..FIRST BUS HANDSHAKE TIMEOUT
0063 TMOUT2: ,X'30'      ..BUS TRANSFER VALID TIMEOUT
0064 TMOUT3: ,X'30'      ..SLAVE READY TIMEOUT
0065 TMOUT4: ,X'20'      ..TMOUT SUBROUTINE INNER LOOP CNTR
0066 TMOUT5: ,X'20'      ..TMOUT SUBROUTINE OUTER LOOP CNTR
0067 TMOUT6: ,X'70'      ..UART TIME OUT
0068 DBSIZE: ,X'16'      ..# OF 16 BYTE MES MAX IN DNOU FILE
0069 RTCSEC: ,X'00'      ..REAL TIME CLOCK SECONDS CNTR
0070 RTCMIN: ,X'00'      ..REAL TIME CLOCK MINUTES CNTR
0071 RTCHRS: ,X'00'      ..REAL TIME CLOCK HOURS CNTR
0072 RTCDAY: ,X'00'      ..REAL TIME CLOCK DAYS CNTR
0073 CSWWRD: ,X'00'      ..COMMUNICATIONS STATUS WORD
0074 WDOG:   ,X'A55A0032'   ..# OF BYTES FF-A.0(VRTEND)
0075 FRBYTE: ,X'00'      ..ERROR PARAMATER FOR FRMES
0076 ERRFLG: ,X'00'      ..
0077 PARERR: ,X'00'      ..
0078 ROMSAV: ,X'00'      ..RESULTS OF ROM TEST
0079 RAMSAV: ,X'00'      ..RESULTS OF RAM TEST
0080 URIMSK: ,X'38000000000000000000' ..
0080
0081
0082 ..
0083 ..
0084 ..
0085          URM=#01 ..MODE ??
0086          URMB=#FE
0087          URP=#02 ..PROCIN ??
0088          URPB=#FD
0089          URD=#04 ..COMPLETE ??
0090          URDB=#FB
0091          URME=#08            ..UART ERROR
0092          URMEB=#F7
0093          OUTFUL=#10          ..O/P FILE FULL
0094          OUTFUB=#EF
0095          LAST=#20            ..LAST 7 th BIT
0096          LASTB=#DF
0097          UR1ST=#80
0098          UR2ND=#40
0099          URB=#3F ..CLEAR WORD
0100
0101
0102          LAMESA=#01          ..LAST MES ACK
0103          LAMESB=#FE
0104          SRFULL=#02          ..SR FILE FULL ?
0105          SRFULB=#FD
0106          SRPRES=#04
0107          SRPREB=#FB          ..S/R TO EXECUTE
0108          RTC=#10             ..UPDATE RTC
0109          RTCB=#EF
0110          SCAN=#80            ..SCAN ENABLED
0111          SCANB=#7F
```

```
0112  ..
0113  ..
0114          ROMEND=#0B
0115          TMCON6=#FF
0116          BASEHI=#14
0117          OUTNUM=#05         ..BYTE # O/P TO SELECT SCP
0118          OUTNU1=OUTNUM+#01
0119  ..
0120  ..
0121          UROUPT=UPOUPT
0122          URINPT=UPINPT
0123          UROOLD=UPOOLD
0124          URIOLD=UPIOLD
0125          BSOOLD=DNOOLD
0126          BSIOLD=DNIOLD
0127          BSINPT=DNINPT
0128          BSOUPT=DNOUPT
0129          BSINEN=UPOUEN
0130          BSINST=UPOUST
0131          BSOUEN=UPINEN
0132          BSOUST=UPINST
0133          UROUEN=UPOUEN
0134          UROUST=UPOUST
0135  ..
0136  ..................................
0137  ..START OF SCANNER MCP CODE
0138  ..
0139  ..TEST AND UPDATE REAL TIME CLOCK
0140  ..
0141  ..
0142              ..
0143          ORG #0A00
0144              ..RESET UART DATA READY
0145  MAIN1:  SEX FREE
0146          INP 2
0147          SEX PROCTR        .. ENABLE INTERUPTS
0148          RET
0149          ,#73
0150  MAIN:   GHI FLGWRD        ..FETCH RTC FLAG
0151          B4 SMCP1          ..BRANCH IF 1 HZ. CLOCK LO.
0152          ANI RTC           ..MASK RTC FLAG
0153          LBZ SMCP2
0154          SEP CALL
0155          ,A(RTCUPD)
0156          LBR SMCP2
0157  SMCP1:  GHI FLGWRD        ..SET RTC FLAG HI
0158          ORI RTC
0159          PHI FLGWRD
0160  ..
0161  ..
0162  ..................................
0163  ..TEST FOR UART DONE
0164  ..................................
0165  ..
0166  SMCP2:  GLO FLGWRD        ..FETCH UART
0167          ANI URD           ..DONE FLAG
```

```
0168              BZ SMCP4          ..BRANCH IF NOT DONE
0169              GLO FLGWRD
0170              ANI URM           ..CHECK FOR MODE
0171              LBNZ SMCP3        ..BR IF OUTPUT MODE
0172              SEX FREE
0173              INP 2
0174              ANI #40
0175              BNZ SMCP2C
0176 ..UART INPUT DONE
0177              GLO FLGWRD
0178              ANI URP           ..UART WORD ERROR
0179              BNZ SMCP2C
0180              SEP CALL
0181              ,A(UINPRO)        ..DO INPUT PROTOCAL TESTS
0182              GLO FLGWRD
0183              ANI URME
0184              BNZ SMCP2C        ..BRANCH IF DATA IN ERROR
0185              GLO FLGWRD
0186              ANI URP
0187              BNZ SMCP2A        ..SKIP PROCIN
0188              SEP CALL
0189              ,A(TSTSR)         ..FILE FULL ??
0190              SEP CALL
0191              ,A(PROCIN)        ..PROCESS INPUT MESSAGE
0192              GHI FLGWRD
0193              ANI SRFULL
0194              LBZ SMCP2A
0195 ..SET BIT 7 LOW TO TELL DCU THAT
0196 ..LAST SR IS NOT RECIEVED 'KEEP IN DSCP'
0197              INC UROUPT
0198              INC UROUPT
0199              LDN UROUPT
0200              ANI #7F
0201              STR UROUPT
0202              DEC UROUPT
0203              DEC UROUPT
0204              SEP CALL
0205              ,A(PARITY)
0206              ,A.O(UROOLD)
0207              ,BASEHI
0208              ,#01
0209 SMCP2A:      GLO FLGWRD        ..SET MODE TO OUTPUT
0210              ORI URM
0211              ANI URDB
0212              ANI URPB          ..RESET ERROR FLAG
0213              PLO FLGWRD        ..RESET NOT COMPLETE
0214              LDA UPOUPT
0215              PLO TMP5          ..INITIALIZE
0216              LDN UPOUPT        ..WORD COUNTER
0217              PHI TMP5
0218              DEC UPOUPT
0219              SEX UROUPT        ..INITIATE OUTPUT
0220              OUT 1
0221              DEC TMP5
0222              SEX PROCTR        .. ENABLE INTERUPTS
0223              RET
```

```
0224              ,#73
0225              BR SMCP4
0226 SMCP2C: GLO FLGWRD
0227              ANI URMB        ..RESET INPUT MODE
0228              ANI URDB        ..RESET ERROR FLAG
0229              ANI URB         ..RESET 1ST & 2ND
0230              ANI URFB        ..RESET COMPLETE
0231              ANI URMEB       ..RESET GOOD MES
0232              PLO FLGWRD
0233              LDI A.0(URIOLD+#01)
0234              PLO BASE
0235              LDN BASE
0236              PLO UPINPT
0237              SEX PROCTR
0238              RET
0239              ,#73
0240 ..
0241 ..GROSS TIMEOUT
0242 ..
0243 SMCP4A: GLO FLGWRD
0244              ANI UR2ND
0245              BZ SMCP4
0246 SMCP4B: LDI A.0(TMOUT6)
0247              PLO BASE
0248              PLO TMP2
0249              LDN BASE
0250              SMI #01
0251              STR BASE
0252              BNZ SMCP4
0253              SEX PROCTR
0254              DIS
0255              ,#E3
0256              BR SMCP2C
0257
0258 SMCP3:   SEX PROCTR
0259              INP 2
0260              ANI #84
0261              XRI #84
0262              LBNZ SMCP4
0263              GLO FLGWRD
0264              ANI URMB        ..CHANGE MODE TO I/P
0265              ANI URDB        ..CHANGE UART COMPLETE
0266              PLO FLGWRD
0267              RET
0268              ,#73            ..ENABLE INTERUPTS
0269 ..
0270 ..IS THE SCAN ENABLED ??
0271 ..
0272 SMCP4:   GHI FLGWRD
0273              ANI SCAN
0274              BZ MAIN
0275 ..
0276 ..............................................
0277 ..UPDATE CHANNEL NUMBER AND STROBE ONTO THE BUS
0278 ..............................................
```

```
0279 ..
0280 ..O/P CHANEL NUMBER FROM (CHANEL)
0281 ..CHECKS IF LAST SLAVE (127)
0282 ..TMOUTS ON BUS AND DESELECTS SCP (FF)
0283 ..
0284 ..
0285 ..
0286          SEP CALL
0287          ,A(SCPIN)
0288 ............................................
0289 ..SEARCH UP-IN FILE FOR A SPECIAL REQUEST
0290 ..OUTPUT SPECIAL REQUEST IF IT MATCHES SLAVE NUMBER
0291 ............................................
0292 ..
0293 ..
0294
0295 SMCP8:   GHI FLGWRD
0296          ANI SRPRES
0297          BZ MAIN            ..NONE
0298 ..THIS ROUTINE SEARCHES THE O/P FILE
0299 ..FOR S/R AND O/P'S THE S/R
0300 ..# OF TRIES TO FIND S/R IS DBSIZE
0301 ..S/R PRESENT FLAG IS BIT 7 OF FIRST BYTE IN MES
0302 ..
0303 ..
0304 SMCP9:   SEP CALL
0305          ,A(SROUT)
0306          LBR MAIN
0307 ..
0308 ............................................
0309 ..UPDATE CHANNEL NUMBER AND STROBE ONTO THE BUS
0310 ............................................

0311 ..
0312 ..O/P CHANEL NUMBER FROM (CHANEL)
0313 ..CHECKS IF LAST SLAVE (127)
0314 ..TMOUTS ON BUS AND DESELECTS SCP (FF)
0315 ..CHECKS IF BUFFER CAN HOLD 1024 BYTES
0316 ..IF NOT SETS OUTFUL FLAG
0317 ..
0318 ..
0319 SCPIN:   LDI A.0(CHANEL)    ..FETCH AND INCREMENT
0320          PLO TMP1
0321          GHI BASE
0322          PHI TMP1
0323          SEX TMP1           ..OUTPUT CHANNEL NUMBER
0324          OUT 3
0325          DEC TMP1
0326          LDI A.0(CNTOP1)    ..FETCH CONTROL WORD
0327          PLO BASE           ..AND SET STROBE ADDRESS
0328          LDN BASE
0329          ORI #20
0330          STR BASE
0331          SEX BASE
0332          OUT 5
```

```
0333            DEC BASE            ..RESET STROBE ADDRESS
0334            LDN BASE            ..IN CONTROL WORD AND
0335            ANI #DF             ..OUTPUT
0336            STR BASE
0337            OUT 5
0338            DEC BASE
0339            LDN TMP1
0340            ADI #01
0341            STR TMP1
0342            SDI 127
0343            LBDF SCPIN1
0344            LDI #00
0345            STR TMP1
0346            LBR SCPIN
0347
0348 ..
0349 ..
0350 ..................................
0351 ..POLL SLAVE AND INPUT DATA IF ANY
0352 ..................................
0353 ................
0354 ..
0355 ..
0356 SCPINY: LBR SCPINX
0357 SCPIN1: BN1 SCPINY              ..BRANCH IF NO MESS
0358         LDI A.0(TMOUT3)         ..FETCH TIMEOUT
0359         PLO BASE
0360         LDN BASE
0361         PLO TMP4                ..OUTPUT AVAILABLE AND IF
0362 SCPIN2: DEC TMP4                ..DATA AVAILABLE WAIT FOR
0363         GLO TMP4                ..INPUT BUSY FLAG AND THEN
0364         BZ SCPINX               ..INPUT DATA
0365         BN2 SCPIN2              ..INPUT BUSY?
0366         SEP CALL                ..INPUT DATA,DO CHECKS
0367         ,A(BSIN)                ..CONTINUE ON ERROR
0368 SCPINX: SEP CALL
0369         ,A(DECHK)
0370         SEP RETURN
0371 ..
0372 ..
0373 ..........................................
0374 ..DESLECT SLAVE SUBROUTINE..
0375 ..
0376 ..
0377 DECHK:  SEX PROCTR              ..OUTPUT CHANNEL NUMBER
0378         OUT 3
0379         ,#FF
0380         LDI A.0(CNTOP1)         ..FETCH CONTROL WORD
0381         PLO BASE                ..AND SET STROBE ADDRESS
0382         LDN BASE
0383         ORI #20
0384         STR BASE
0385         SEX BASE
0386         OUT 5
0387         DEC BASE                ..RESET STROBE ADDRESS
0388         LDN BASE                ..IN CONTROL WORD AND
```

```
0389            ANI #DF             ..OUTPUT
0390            STR BASE
0391            OUT 5
0392            SEP RETURN -
0393    ..........................................
0394    ..SEARCH UP-IN FILE FOR A SPECIAL REQUEST
0395    ..OUTPUT SPECIAL REQUEST IF IT MATCHES SLAVE NUMBER
0396    ..........................................
0397    ..THIS ROUTINE SEARCHES THE O/P FILE
0398    ..FOR S/R AND O/P'S THE S/R
0399    ..# OF TRIES TO FIND S/R IS DBSIZE
0400    ..S/R PRESENT FLAG IS BIT 7 OF FIRST BYTE IN MES
0401    ..IF NO S/R IN DBSIZE TRIES THEN
0402    ..MOVES UPIOLD INTO DNOOLD
0403    ..INCREMENTS POINTER IF NO SLAVE
0404    ..
0405    ..
0406 SROUT:      LDI A.0(DBSIZE)
0407            PLO BASE
0408            LDN BASE
0409            PLO TMP1
0410            SEX BASE            ..RESET COUNTER TO SIZE
0411 SROUT2:    LDN DNOUPT           ..GET FIRST WORD
0412            SHL
0413            LBDF SROUT5         ..IF MSB=1 GOT S.R.
0414            DEC TMP1
0415            GLO TMP1            ..TEST IF ALL OR
0416            LBZ SROUT7          ..FILE SEARCHED
0417            SEP CALL
0418            ,A(SRCK)
0419            LBR SROUT2
0420            ..
0421            ..FOUND A S/R ; NOW OUTPUT ONTO BUS
0422            ..
0423 SROUT5:    GLO DNOUPT           ..FETCH MODULE
0424            ADI OUTNUM          ..NUMBER
0425            PLO DNOUPT          ..7TH WORD
0426            SEX DNOUPT
0427            OUT 3
0428            SEQ
0429            LDI A.0(CNTOP1)     ..SET I/O MODE FLAG
0430            PLO BASE            ..TO OUTPUT (LO)
0431            LDN BASE
0432            ANI #7F
0433            STR BASE
0434            SEX BASE
0435            OUT 5
0436            GLO DNOUPT
0437            SMI OUTNU1
0438            PLO DNOUPT
0439            DEC BASE
0440            LDN BASE            ..OUTPUT STROBE HIGH
0441            ORI #20             ..AND THEN LOW AND
0442            STR BASE            ..OUTPUT I/O FLAG (LO)
0443            OUT 5
0444            DEC BASE
```

```
0445            LDN BASE
0446            ANI #DF
0447            STR BASE
0448            OUT 5
0449            SEX FREE        ..IS SCP FULL ??
0450            INP 4
0451            ANI #10
0452            BNZ SROUT8
0453            LDN DNOUPT      ..SET SR FLAG LOW
0454            ANI #7F
0455            STR DNOUPT
0456            SEP CALL        ..OUTPUT DATA ONTO
0457            ,A(BSOUT)       ..BUS
0458 SROUT6:    LDI A.0(CNTOP1) ..SET MODE FLAG
0459            PLO BASE        ..TO INPUT
0460            LDN BASE
0461            ORI #80         ..BIT 7 HIGH
0462            STR BASE
0463            SEX BASE
0464            OUT 5
0465 SROUTX:    SEP RETURN
0466 SROUT8:    SEP CALL
0467            ,A(SRCK)
0468            LBR SROUT6
0469 SROUT7:    GHI FLGWRD
0470            ANI SRPREB
0471            PHI FLGWRD
0472            BR SROUTX
0473 ..
0474 ..
0475 ..THIS ROUTINE CHECKS THE DNOUPT
0476 ..FO END OF FILE AND INCREMENTS IT BY 16
0477 ..BYTES OR RESETS TO THE START
0478 ..
0479 ..
0480 SRCK:      LDI A.0(UPINEN)
0481            PLO BASE
0482            SEX BASE
0483            INC BASE        ..TEST FOR END OF FILE
0484            GLO DNOUPT
0485            SD
0486            DEC BASE
0487            GHI DNOUPT
0488            SDB
0489            LBDF SRCK1
0490            LDI A.0(UPINST) ..AT END OF FILE;RESET
0491            PLO BASE
0492            LDA BASE
0493            PHI DNOUPT      ..BUS OUTPUT POINTER
0494            LDN BASE
0495            PLO DNOUPT
0496            BR SRCK2
0497 SRCK1:     GLO DNOUPT      ..INCREMENT
0498            ADI #10         ..BUS OUTPUT POINTER BY 16
0499            PLO DNOUPT      ..TO NEXT BLOCK OF DATA.
0500            GHI DNOUPT
```

```
0501            ADCI #00
0502            PHI DNOUPT
0503 SRCK2:     LDI A.0(DNOOLD)
0504            PLO BASE
0505            GHI DNOUPT
0506            STR BASE
0507            INC BASE
0508            GLO DNOUPT
0509            STR BASE
0510            SEP RETURN
0511 ..
0512 ..
0513 ..................................
0514 .. SCANNER CODE FOR 1802
0515 ..
0516 ..
0517 ..
0518 ..
0519 ..INPUT FLAGS TO 1802
0520 ..
0521 ..EF1- MODE FLAG FOR IOM/ O/P AVAILABLE FOR MCP
0522 ..EF2- BUSY ON LOW & TRANSFER OK ON LOW
0523 ..EF3- H/S ACTIVE LOW
0524 ..EF4- 1 HERTZ SIGNAL FOR RTC
0525 ..................................
0526 ..................
0527 ..NOT EF1 - HGH BSOUT   LOW BSIN
0528 ..NOT EF2 - LOW BSIN OR TRANSFER OK
0529 .. NOT EF3 NORMALLY HIGH
0530 ..CNTROP1
0531 ..BIT 7 - LOW FOR OUTPUT BSOUT
0532 ..BIT 6 - LOW FOR BSOUT & TRANSFER OK
0533 ..FLAGWORD DEFINITIONS........
0534 ..................................

0535 ..          0       0       UART  - INPUT MODE
0536 ..                  1             - OUTPUT MODE
0537 ..
0538 ..          1       0       NO UART ERROR
0539 ..                  1       UART ERROR SKIP PROCIN
0540 ..
0541 ..          2       0       UART   - NOT COMPLETE
0542 ..                  1              - COMPLETE
0543 ..
0544 ..          3       0       GOOD MES
0545 ..                  1        WAIT FOR GOOD MES

0546 ..
0547 ..          4       0       BUFFER UP OUT FILE
0548 ..                  1       -FULL
0549 ..
0550 ..          5       0       LAST BIT 7 LOW
0551 ..                  1                   HI
0552 ..
```

```
0553 ..        6       0       UART INPUT BYTE - NOT SECOND
0554 ..                1                       - SECOND
0555 ..
0556 ..        7       0                       - NOT FIRST
0557 ..                1                       - FIRST
0558 ..
0559 ..        8       0       LAST MES ACK DATA-NO
0560 ..                1                        -YES
0561 ..
0562 ..        9       0       SR UP IN FILE - NOT FULL
0563 ..                1                     -FULL
0564 ..
0565 ..       10       0       S/R - NONE
0566 ..                1           - YES
0567 ..
0568 ..       11       0       TRANS. IS EXECUTING A - SCAN
0569 ..                1                             - S/R
0570 ..
0571 ..       12       0       REAL TIME CLOCK - DON'T UPDAT
0572 ..                1                       - UPDATE
0573 ..
0574 ..       13       0       BUSY SIGNAL - DON'T OVERRIDE
0575 ..                1                   - OVER RIDE
0576 ..
0577 ..       14       0       COMMAND EXPECTS - A RESPONSE
0578 ..                1                       - NO RESPONSE
0579 ..
0580 ..       15       0       SCAN - NOT ENABLED
0581 ..                1            - ENABLED
0582 ..
0583 ..........................
0584
0585 ..INPUT / OUTPUT.....................
0586 ..>>............................
0587 ..
0588 ..INPUT          1       UART DATA READ
0589 ..
0590 ..INPUT          2       UART STATUS IN & DATA READ RE
0591 ..
0592 ..INPUT          3       BUS DATA INPUT
0593 ..
0594 ..INPUT          4       CONTROL INPUT
0595 ..
0596 ..INPUT          7       SPARE
0597 ..
0598 ..
0599 ..
0600 ..OUTPUT         1       LOAD UART HOLDING REGISTER
0601 ..
0602 ..OUTPUT         2       SPARE
0603 ..
0604 ..OUTPUT         3       BUS DATA OUTPUT
0605 ..
```

```
0606  ..
0607  ..OUTPUT          5          CONTROL OUTPUT
0608  ..OUTPUT          7          SPARE
0609  ..
0610  ..
0611  ..
0612            ..
0613
0614  ............................................
0615  ............................................
0616  .....INITIAL POWER-UP AND WATCH DOG RESTART......
0617  .....MICROPROCESSOR EXECUTION STARTS AT 0000......
0618  ............................................
0619  ............................................
0620
0621
0622
0623  ............................................
0624  ..*NOTE WITHIN INITIALIZATION (ONLY)           ..
0625  ..    DNOUPT(HI) <-> CONTENTS OF M(MEMEND)     ..
0626  ..    DNOUPT(LO) <-> SAVED MESSAGE INDEX #     ..
0627  ..    DNINPT(HI) <-> RESULTS OF RAM TEST       ..
0628  ..    DNINPT(LO) <-> RESULTS OF ROM TEST       ..
0629  ............................................
0630
0631          ORG #0000
0632
0633          DIS                ..DISABLE INTERUPTS
0634          ,#00
0635
0636          ..THIS IS THE INDEX NUMBER
0637          LDI #00            ..LOAD UP THE #00
0638          PLO DNOUPT         ..PUT INTO DNOUPT(LO)
0639
0640  INIT:   SEQ                ..INITIALIZE Q=1
0641
0642  ..INITIALIZE REGISTERS..
0643
0644          LDI A.0(CALLIN)
0645          PLO CALL
0646          LDI A.1(CALLIN)    ..INITIALIZE CALL
0647          PHI CALL
0648
0649          LDI A.0(RETIN)
0650          PLO RETURN
0651          LDI A.1(RETIN)     ..INITIALIZE RETURN
0652          PHI RETURN
0653
0654
0655          LDI A.0(BEGIN)
0656          PLO PROCTR
0657          LDI A.1(BEGIN)     ..INITIALIZE PROGRAM
0658          PHI PROCTR         .. COUNTER
0659
0660
0661  ......................................
```

```
0662 ..DESTRUCTIVE RAM MEMORY TEST.....
0663 ................................
0664
0665 ..ALGORITHM
0666 .. 1) WRITE ZEROES FROM MEMEND -> 00FF
0667 .. 2) RELOCATE POINTERS TO MEMSTART
0668 .. 3) ADDRESSING ONE BYTE AT A TIME
0669 ..       - CHECK THAT THE  BYTE IS STILL 00
0670 ..       - SHIFT ONE BIT THROUGH THE BYTE
0671 ..       - WRITE FF TO THAT BYTE
0672 .. 4) ADVANCE POINTER TO ADDRESS THE NEXT BYTE
0673 .. 5) REPEAT #3 UNTIL AN ERROR IS FOUND
0674 ..    IF NO ERROR IS FOUND IN RAM THEN THE
0675 ..    ERROR MESSAGE WILL CONTAIN THE ADDRESS
0676 ..    WHERE NO RAM EXISTS (IE LOC. 2000)
0677
0678 TSTST:   LDI A.0(MEMEND)   ..FETCH MEMORY END ADDRESS
0679         PLO BASE
0680         LDI A.1(MEMEND)
0681         PHI BASE
0682         LDA BASE          ..FETCH MEMORY END
0683         PHI TMP1
0684         PHI TMP4
0685         LDA BASE
0686         PLO TMP1
0687         PLO TMP4
0688         LDN TMP1
0689         PHI INOUPT        ..SAVE M(A(MEMEND)) IN REG
0690         SEX TMP1
0691
0692 ..WRITE FF's IN MEMORY FROM END DOWN TO 00FF..
0693
0694 TSTME1:  LDI #FF
0695         STXD              ..WRITE ALL ONES
0696         GHI TMP1
0697         BNZ TSTME1        ..BR IF NOT DONE
0698         LDA BASE
0699         PHI TMP1          ..FETCH MEMORY START
0700         LDN BASE
0701         PLO TMP1
0702
0703 ..CHECK FOR FF; WALK THE ONES; AND WRITE 00 LOOP..
0704
0705 TSTME2:  LDN TMP1          ..CHECK THAT THE BYTE
0706         XRI #FF           .. IS STILL ONES
0707         BNZ TSTME4        ..BRANCH IF NOT ALL ONES
0708         LDI #01           ..INITIALIZE THE WALK
0709 TSTME3: PLO TMP2          .. BYTE TO 00000001
0710         STR TMP1          ..WRITE BYTE
0711         GLO TMP2
0712         XOR               ..READ AND TEST BYTE
0713         BNZ TSTME4        ..BR IF THEY DON'T COMPARE
0714         GLO TMP2
0715         SHL               ..SHIFT WALKING BIT
0716         BNF TSTME3        ..BRANCH IF 8 SHIFTS NOT DONE
```

```
0717            LDI #00
0718            PLO TMP2
0719            STR TMP1        ..STORE ALL ONES IN BYTE
0720            LDA TMP1
0721            XRI #00
0722            BZ TSTME2       ..BR TO CONTINUE TEST
0723 TSTME4:    GHI TMP1        ..RESULTS FOR RAM TEST
0724            PHI DNINPT      ..ARE SET ASIDE IN REG
0725            LDI #00
0726            STR TMP4        ..00 -> M(MEMEND)
0727
0728 ..INITIALIZE REGISTERS FROM VARIABLE TABLE..
0729
0730            LDI A.0(VARTAB) ..FETCH START OF
0731            PLO TMP1        .. VARIABLE TABLE
0732            GHI BASE
0733            PHI TMP1
0734            LDA TMP1        ..FETCH AND STORE STACK PNTR
0735            PHI STKPTR
0736            LDA TMP1
0737            PLO STKPTR
0738            LDA TMP1        ..FETCH AND STORE INITIAL
0739            PHI FLGWRD      .. FLAG WORD DATA
0740            SEX FREE
0741            GLO FLGWRD
0742            ANI LAST
0743            STR FREE
0744            LDA TMP1
0745            OR
0746            PLO FLGWRD
0747            SEX TMP1
0748            LDA TMP1
0749            PHI UPINPT      ..INITIALIZE UP-IN POINTER
0750            LDA TMP1
0751            PLO UPINPT
0752            LDA TMP1        ..INITIALIZE UP-OUT POINTER
0753            PHI UPOUPT
0754            LDA TMP1
0755            PLO UPOUPT
0756
0757 ..INITIALIZE OUTPUT PORTS..
0758
0759            OUT 5           ..INITIALIZE CNTOP1
0760            OUT 6           ..INITIALIZE CNTOP2
0761            OUT 7           ..INITIALIZE CNTOP3
0762            OUT 4           ..INITIALIZE CHANNEL #
0763
0764 ..LOAD REMAINDER OF VARIABLE TABLE..
0765
0766            DEC TMP1        ..MOVE TO START
0767            DEC TMP1        ..OF CONTROL
0768            DEC TMP1        ..WORDS
0769            DEC TMP1
0770            GHI BASE        ..SET POINTER IN
0771            PHI TMP2        .. TMP2 AT END ADDRESS
0772            LDI A.0(VRTEND)
```

```
0773            PLO TMP2
0774            LDI BASEHI
0775            PHI BASE            ..INITIALIZE BASE(HI)
0776            GLO TMP1
0777            PLO BASE
0778            SEX TMP2
0779 INIT1:     LDA TMP1            ..TRANSFER ALL OF
0780            STR BASE            ..CONFIG. TABLE TO RAM VAR
0781            INC BASE            .. TABLE
0782            GHI TMP1            ..TEST FOR END OF CONFIG.
0783            XOR                 .. TABLE
0784            BNZ INIT1           ..BRANCH IF MSB'S NOT EQUAL
0785            GLO TMP1
0786            INC TMP2
0787            XOR
0788            DEC TMP2
0789            BNZ INIT1           ..BRANCH IF LSB'S NOT EQUAL
0790
0791
0792 ..ROM PARITY MEMORY TEST..
0793
0794            SEP CALL
0795 BEGIN:     ,A(ROMTST)          ..EXECUTE ROM TEST
0796            LDI A.0(ROMSAV)     ..ADDR ROM SAV LOC
0797            PLO BASE
0798            GLO TMP2            ..FETCH ROM CAL PARITY
0799            STR BASE
0800            INC BASE            ..ADDR RAM SAVE LOC
0801            GHI DNINPT          ..FETCH M(M(MEMEND))
0802            STR BASE
0803
0804
0805
0806 ..SET UP MESSAGE INDEX # FOR ERRORS/ALARMS..
0807
0808            LDI A.0(UPIOLD)
0809            PLO BASE
0810            LDA BASE
0811            PHI TMP4
0812            LDN BASE
0813            PLO TMP4
0814            INC TMP4
0815            INC TMP4
0816            INC TMP4
0817            GLO DNOUPT
0818            STR TMP4
0819
0820
0821 ..FORMAT A WATCH DOG RESTART MESSAGE..
0822
0823            GHI DNOUPT          ..FETCH SAVED M(MEMEND) BYTE
0824            BNZ WDOG1           ..BR IF M(MEMEND) NOT 0
0825            GHI LINK
0826            PHI TMP2            ..HI LINK -> WORD 2
0827            GLO LINK
0828            PLO TMP2            ..LO LINK -> WORD3
```

```
0829            BR WDOG2
0830 WDOG1:     LDI #00
0831            PHI TMP2            ..00 -> WORD 2
0832            PLO TMP2            ..00 -> WORD 3
0833            PLO LINK
0834            LDI #09
0835            PHI LINK
0836 WDOG2:     LDI A.0(FRBYTE)
0837            PLO BASE
0838            LDI #80
0839            STR BASE
0840            LDI A.0(DNIOLD)
0841            PLO TMP1
0842            LDI A.1(DNIOLD)
0843            PHI TMP1
0844            LDA TMP1
0845            PHI DNINPT          ..INITIALIZE
0846            LDA TMP1
0847            PLO DNINPT          ..DNINPT POINTER
0848            LDA TMP1
0849            PHI DNOUPT          ..INITIALIZE
0850            LDA TMP1
0851            PLO DNOUPT          .. DNOUPT POINTER
0852            SEP CALL
0853            ,A(FRMES)           ..FORMAT WATCH DOG
0854            ,#FF                .. RESTART MESSAGE
0855
0856
0857            LDI A.0(INTVCT)
0858            PLO INTVTR
0859            LDI A.1(INTVCT)
0860            PHI INTVTR
0861
0862
0863
0864 ..FORMAT MEMORY SELF TEST MESSAGE..
0865
0866            LDI A.0(FRBYTE)
0867            PLO BASE
0868            LDI #B0
0869            STR BASE
0870            LDI A.0(ROMSAV)
0871            PLO BASE
0872            LDA BASE
0873            PLO TMP2            ..RESULTS OF ROM TEST
0874            LDN BASE
0875            PHI TMP2            ..RESULTS OF RAM TEST
0876            SEP CALL
0877            ,A(FRMES)           ..CALL FORMAT MESSAGE
0878            ,#F0
0879            LBR MAIN1
0880
0881
0882
0883
0884 ..
```

```
0885  ............................................
0886  ..FORMAT A WATCH DOG RESTART MESSAGE
0887  ..
0888           LDI  A.0(WDOG)
0889           PLO  TMP2
0890           LDI  A.1(WDOG)
0891           PHI  TMP2
0892           SEX  TMP1
0893           LDI  A.0(VRTEND+#01)
0894           PLO  BASE
0895           GHI  BASE
0896           PHI  TMP1
0897           LDN  BASE
0898           PLO  TMP1
0899  WD2:     LDA  TMP2
0900           XOR
0901           BNZ  WD1
0902           IRX
0903           GLO  TMP1
0904           XRI  #FF
0905           LBNZ WD2
0906  WD1:     NOP
0907
0908  ............................................
0909           ..CALL SUBROUTINE
0910           ..................
0911           ..
0912           ..
0913           ..
0914  CALOUT:   SEP  PROCTR              ..BRANCH TO SUBROU

0915  CALLIN:  SEX  STKPTR
0916           GHI  LINK                 ..PUSH R (6) TO STACK

0917           STXD                      ..(OLD PROGRAM COUNTE

0918           GLO  LINK
0919           STXD
0920           GHI  PROCTR               ..COPY PROGRAM COUNTE

0921           PHI  LINK                 ..TO STACK
0922           GLO  PROCTR
0923           PLO  LINK
0924           LDA  LINK                 ..FETCH SUBROUTINE AD

0925           PHI  PROCTR               ..TO PROGRAM COUNTER
0926           LDA  LINK
0927           PLO  PROCTR
0928           BR   CALOUT               ..EXIT
0929           ..
0930  ............................................

0931           ..RETURN SUBROUTINE
0932           ..................
0933           ..
0934           ..
```

```
0935 RETOUT: SEP PROCTR        ..RETURN TO MAIN.
0936 RETIN:  GHI LINK           ..COPY OLD PROGRAM
0937         PHI PROCTR         ..COUNTER TO PROGRAM
0938         GLO LINK
0939         PLO PROCTR
0940         SEX STKPTR         ..RESTORE OLD P.C.
0941         INC STKPTR
0942         LDXA
0943         PLO LINK
0944         LDX
0945         PHI LINK
0946         BR RETOUT
0947         ..
0948         ..
0949         ..
0950
0951
0952 ..................................
0953 ..ROM PARITY CHECK SUBROUTINE..........
0954 ..................................
0955
0956 ROMTST: LDI ROMEND         ..END OF ROM CHECK
0957         PHI TMP2           .. IS AT ADDR OFFF
0958         LDI #FF            ..
0959         PLO TMP2           ..
0960         LDI #00            ..START OF ROM CHECK
0961         PHI TMP4           .. IS AT ADDR 0000
0962         PLO TMP4           ..
0963         SEP CALL           ..
0964         ,A(PARCHK)         ..CALCULATE PARITY
0965         ,#01               ..RETURN WITH PARITY
0966         SEP RETURN         .. IN TMP2 (LO)
0967
0968
0969
0970         ..................................

0971         ..CRC PARITY GENERATER
0972         ..................................

0973         ..CALLING SEQUENCE
0974         ..      SEP CALL
0975         ..      ,A(PARITY)
0976         ..      ,ADDRESS LO OF MEMORY FOR FIRST BYTE
0977         ..      ,ADDRESS HI OF MEMORY FOR FIRST BYTE
0978         ..      ,00=INPUT, 01=OUTPUT
0979         ..
0980 ..THIS ROUTINE CALCULATES CRC USING
0981 ..A TABLE THAT IS ONE FULL PAGE LONG
0982 ..ASSUMPTIONS - THE SIZE OF THE MESSAGE
0983 ..       (LSB,MSB) ARE THE FIRST AND
0984 ..       SECOND BYTES OF THE MESSAGE
0985 ..          - THE SIZE INCLUDES THE PARITY BYTE
0986 ..
0987 ..THE IN LINE PARAMETERS ARE
```

```
0988 ..            - LO,HI POINTER TO FIRST BYTE
0989 ..              (INDIRECT ADDRESSING)
0990 ..            - 00 TO COMPARE LAST BYTE AND CALCULATED BYTE

0991 ..              SETTING A ERROR FLAG IF DISAGREE
0992 ..            - 01 TO WRITE PARITY TO LAST BYTE
0993 ..
0994 ..
0995 ..REGISTERS USED   6,B,C,D,E
0996 ..
0997 ..SUBROUTINES CALLED   NONE
0998 ..
0999 ..VARIABLES
1000 ..      PARTAB       START ADDRESS OF TABLE
1001 ..      PARERR       00   OK
1002 ..                   FF   ERROR
1003 ..RETURNS WITH RC   HI 00 OK  FF ERROR
1004 ..                  LO CALCULATED PARITY
1005 ..
1006 ..
1007 ..
1008 ..
1009 PARITY: LDA LINK        ..FETCH ADDRESS
1010         PLO TMP1        ..AND STORE IN TMP1
1011         LDA LINK
1012         PHI TMP1
1013         LDA TMP1        ..FETCH CONTENTS WHICH
1014         PHI TMP4        ..IS THE START ADDRESS OF
1015         LDN TMP1        ..BLOCK AND STORE IN TMP4
1016         PLO TMP4
1017         LDA TMP4        ..FETCH SIZE INTO TMP2
1018         PLO TMP2
1019         LDN TMP4
1020         PHI TMP2
1021         DEC TMP4
1022         DEC TMP2
1023 PARCHK: LDI A.1(PARTAB) ..SET TABLE MSB ADDRESS
1024         PHI TMP1        ..START WITH FF AT 53(DEC)
1025         LDI 53
1026         PLO TMP1
1027         SEX TMP1
1028 PARLOP: LDA TMP4        ..FETCH BYTE OF DATA
1029         XOR             ..XOR WITH TABLE VALUE
1030         PLO TMP1        ..UPDATE LSBS OF DATA POINTER

1031         DEC TMP2        ..DECREMENT BYTE COUNTER.
1032         GLO TMP2
1033         BNZ PARLOP      ..TEST FOR END OF BLOCK
1034         GHI TMP2
1035         BNZ PARLOP
1036         LDN TMP1        ..FETCH RESULT
1037         XRI #FF         ..COMPLIMENT IT
1038         PLO TMP2        ..STORE IN TMP2 FOR RETURN
1039         LDI A.0(PARERR)
1040         PLO BASE
1041         LDI #00         ..SET RETURN PARAMETER
```

```
1042            STR BASE
1043            PHI TMP2        ..TO 0
1044            LDA LINK        ..FETCH MODE FLAG
1045            BZ PARINP       ..BRANCH IF INPUT MODE
1046            GLO TMP2        ..FETCH PARITY AND
1047            STR TMP4        ..WRITE TO END OF BLOCK
1048            SEP RETURN
1049 PARINP:    SEX TMP4        ..INPUT MODE
1050            GLO TMP2        ..FETCH PARITY ERRORS
1051            XOR             ..AND COMPARE
1052            BZ PAREXT       ..EXIT IF NO ERROR(FLAG=0)
1053            LDI #FF         ..SET FLAG ON ERROR
1054            STR BASE
1055            PHI TMP2
1056 PAREXT:    SEP RETURN
1057            ..
1058            ..........................................
1059            ..PARITY LOOK UP TABLE
1060            ..........................................
1061            ..256 BYTES LONG STARTING AT A PAGE BOUNDARY.
1062            ..
1063            PAGE
1064            ..
1065 PARTAB:    ,X'0019322B'
1066            ,X'647D564F'
1067            ,X'C8D1FAE3'
1068            ,X'ACB59E87'
1069            ,X'8990BBA2'
1070            ,X'EDF4DFC6'
1071            ,X'4158736A'
1072            ,X'253C170E'
1073            ,X'0B123920'
1074            ,X'6F765D44'
1075            ,X'C3DAF1E8'
1076            ,X'A7BE958C'
1077            ,X'829BB0A9'
1078            ,X'E6FFD4CD'
1079            ,X'4A537861'
1080            ,X'2E371C05'
1081            ,X'160F243D'
1082            ,X'726B4059'
1083            ,X'DEC7ECF5'
1084            ,X'BAA38891'
1085            ,X'9F86ADB4'
1086            ,X'FBE2C9D0'
1087            ,X'574E657C'
1088            ,X'332A0118'
1089            ,X'1D042F36'
1090            ,X'79604B52'
1091            ,X'D5CCE7FE'
1092            ,X'B1A8839A'
1093            ,X'948DA6BF'
1094            ,X'F0E9C2DB'
1095            ,X'5C456E77'
```

```
1096            ,X'38210A13'
1097            ,X'2C351E07'
1098            ,X'48517A63'
1099            ,X'E4FDD6CF'
1100            ,X'8099B2AB'
1101            ,X'A5BC978E'
1102            ,X'C1D8F3EA'
1103            ,X'6D745F46'
1104            ,X'09103B22'
1105            ,X'273E150C'
1106            ,X'435A7168'
1107            ,X'EFF6DDC4'
1108            ,X'8B92B9A0'
1109            ,X'AEB79C85'
1110            ,X'CAD3F8E1'
1111            ,X'667F544D'
1112            ,X'021B3029'
1113            ,X'3A230811'
1114            ,X'5E476C75'
1115            ,X'F2EBCOD9'
1116            ,X'968FA4BD'
1117            ,X'B3AA8198'
1118            ,X'D7CEE5FC'
1119            ,X'7B624950'
1120            ,X'1F062D34'
1121            ,X'3128031A'
1122            ,X'554C677E'
1123            ,X'F9E0CBD2'
1124            ,X'9D84AFB6'
1125            ,X'B8A18A93'
1126            ,X'DCC5EEF7'
1127            ,X'7069425B'
1128            ,X'140D263F'
1129
1130
1131  ..........................................
1132  ..BSIN...BUS INPUT SUBROUTINE...............
1133  ..........................................
1134
1135  ..MASTER VERSION..
1136
1137            ..ON RETURN TMP2 HI WILL CONTAIN
1138            ..00 SUCESSFUL BUS INPUT
1139            ..01 PARITY ERROR
1140            ..03 TIMED OUT
1141            ..04 TOO MANY WORDS
1142            ..05 HARD ERROR IN TRANSFER VALID
1143            ..FF SENDER NOT REALLY BUSY
1144            ..             (ACTIVE LO)
1145
1146  BSIN:     SEX BSINPT
1147            SEQ
1148            LDI #21
1149            PLO TMP4          ..SET UP MAX WORD COUNT
1150            LDI #04           .. OF 0421(HEX)
1151            PHI TMP4          .. 1060(DEC)
```

```
1152            PHI TMP1            ..SET UP BUSY TMOUT
1153
1154 BSIN0:     B2 BSIN5            ..BR; BUSY, READY TO GO
1155            DEC TMP1
1156            GHI TMP1            ..DEC & CHECK BUSY TMOUT
1157            BNZ BSIN0           ..BR; TMOUT NOT DONE
1158            BR BSITNB           ..ERROR; SENDER NOT BUSY
1159
1160 BSIN1:     DEC TMP1
1161            GLO TMP1
1162            B3 BSIN2            ..BR; GOT Q H/S
1163            BNZ BSIN1           ..BR; CONTINUE TMOUT
1164            BR BSITOU           ..ERROR; TIMED OUT
1165
1166 BSIN2:     INP 3               ..INPUT DATA FROM BUS
1167            REQ                 ..HANDSHAKE BY CLEAR Q
1168            IRX
1169
1170 BSIN3:     BN3 BSIN4           ..WAIT FOR HANDSHAKE
1171            DEC TMP1
1172            GLO TMP1            ..DEC & CHECK TMOUT
1173            BNZ BSIN3           ..BR; WAIT FOR H/S
1174            BR BSITOU           ..BR; TIMED OUT ON H/S
1175
1176 BSIN4:     BN2 BSIN5A          ..BR; LAST WORD IN
1177            SEQ                 ..GOT H/S; SET Q IN RESP.
1178            DEC TMP4            ..DEC WORD COUNT
1179            GLO TMP4            ..CHECK LSB's
1180            BNZ BSIN5           ..BR; LSB's NOT ZERO
1181            GHI TMP4            ..CHECK MSB's OF COUNT
1182            BZ BSITWD           ..BR; TOO MANY WORDS INPUT
1183
1184 BSIN5:     LDI #F0             ..RESET INDIVIDUAL WORD
1185            PLO TMP1            .. TIME OUT
1186            BR BSIN1            ..BR; MORE TO COME
1187
1188 BSIN5A:    SEQ                 ..COMPLETE HANDSHAKE
1189            SEP CALL            ..CHECK PARITY OF MESS.
1190            ,A(PARITY)
1191            ,A.0(BSIOLD)
1192            ,BASEHI
1193            ,#00
1194
1195            LDI A.0(BUSERR)
1196            PLO TMP4            ..ADDR. BUSERR WITH TMP4
1197            GHI BASE
1198            PHI TMP4
1199
1200            GHI TMP2            ..TMP2<>0=PARITY ERROR
1201            LSNZ                ..SKIP IF DNOT 0; ERROR
1202            REQ                 ..RESET Q IF PARITY O.K.
1203            NOP
1204
1205 ..HANDSHAKE TRANSFER VALID; Q LINE DENOTES O.K. ..
1206
1207            LDI A.0(CNTOP1)  ..FETCH CONTROL OUTPUT
```

```
1208            PLO BASE
1209            LDN BASE
1210            ANI #BF             ..SET TRANSFER VALID LO
1211            STR BASE
1212            SEX BASE
1213            OUT 5               ..OUTPUT TRANSFER VALID
1214
1215            LDI #10             ..SET UP GROSS TMOUT
1216            PHI TMP1            .. FOR TRANSFER VALID
1217 BSIN6:     B3 BSIN7            ..BR; RECEIVED HANDSHAKE
1218            DEC TMP1
1219            GHI TMP1            ..DEC & CHECK GROSS TMOUT
1220            BNZ BSIN6           ..BR; CONTINUE TMOUT
1221            SEQ                 ..INDICATE ERROR WITH Q=1
1222 BSIN7:     BQ BSIN7B           ..BR; Q=1 P. ERROR
1223            SEP CALL
1224            ,A(DECHK)           ..DESELECT SLAVE
1225
1226 BSIN7B:    LDI A.0(CNTOP1)     ..RECALL CONTROL 5
1227            PLO BASE
1228            SEX BASE
1229            LDN BASE            ..FETCH TRANSFER VALID
1230            ORI #40             ..AND SET HIGH
1231            STR BASE
1232            OUT 5               ..OUTPUT TRANSFER VALID
1233
1234            LBQ BSIER1          ..BR; Q=1=PARITY ERROR
1235            SEQ                 ..PARITY O.K. SET Q
1236            BR BSIN7A           ..BR; TEST FOR ALARM I/P
1237
1238 ..HARD ERROR RECOVERY..
1239
1240 BSITHE:    LDI #05             ..EXIT; HARD ERROR IN T.V.
1241            LSKP
1242 BSITNR:    LDI #02             ..EXIT; NO RESPONSE
1243            LSKP
1244 BSITOU:    LDI #03             ..EXIT; TIMED OUT
1245            LSKP
1246 BSITWD:    LDI #04             ..EXIT; TOO MANY WORDS
1247            LSKP
1248 BSITNB:    LDI #FF
1249            PHI TMP2
1250            LDI A.0(FRBYTE)
1251            PLO BASE            ..DATA WORD 1 SET TO
1252            LDI #A1             .. A1 FOR NO RETRY
1253            STR BASE
1254            LDI A.0(BSIOLD)
1255            PLO BASE
1256            LDA BASE            ..RESET INPUT POINTER
1257            PHI BSINPT          .. BACK TO OLD
1258            LDN BASE
1259            PLO BSINPT
1260            LBR BSIER2          ..EXIT; NO RETRY
1261
1262 ..LOOK FOR ALARM MESSAGES..
1263
```

```
1264 BSIN7A: LDI A.0(BSIOLD)
1265        PLO BASE
1266        LDA BASE
1267        PHI TMP1
1268        LDN BASE
1269        PLO TMP1
1270        INC TMP1
1271        INC TMP1         ..POINTS AT CW
1272        LDA TMP1
1273        ANI #07          ..MASK BITS
1274        XRI #07
1275        BNZ BSIN8
1276        INC TMP1
1277        INC TMP1
1278        LDI A.0(CHANEL)
1279        PLO BASE
1280        LDN BASE
1281        SMI #01
1282        STR TMP1
1283 ..
1284 .. TEST FOR END OF FILE
1285 ..
1286 BSIN8: LDI A.0(BSINEN)
1287        PLO BASE
1288        SEX BASE
1289        INC BASE
1290        GLO BSINPT       ..TEST FOR END OF FILE
1291        SD
1292        DEC BASE
1293        GHI BSINPT
1294        SDB
1295        BPZ BSIN9        ..BR; NOT AT END
1296        LDI A.0(BSINST)
1297        PLO BASE
1298        LDA BASE         ..AT END;
1299        PHI BSINPT       .. RESET BSINPT TO
1300        STR FREE         .. START OF FILE
1301        DEC FREE
1302        LDN BASE
1303        PLO BSINPT
1304        STR FREE
1305        LDI A.0(UPOOLD+#01)
1306        PLO BASE
1307        LDN BASE
1308        SEX FREE
1309        XOR              ..TEST FOR FILE FULL
1310        INC FREE
1311        BNZ BSIN9        ..BR NOT FULL
1312        DEC BASE
1313        LDN BASE
1314        XOR
1315        BNZ BSIN9        ..BR NOT FULL
1316
1317        GLO FLGWRD
1318        ORI OUTFUL       ..SET FULL FLAG FOR
1319        PLO FLGWRD       .. THE BSIN BUFFER
```

```
1320   ..
1321   ..ADVANCE OLD BUS INPUT POINTER
1322   ..
1323 BSIN9:   LDI A.0(BSIOLD)  ..FETCH OLD POINTER
1324          PLO BASE
1325          GHI BSINPT
1326          STR BASE         ..UPDATED POINTER ->
1327          INC BASE         ..UPDATED OLD POINTER
1328          GLO BSINPT
1329          STR BASE
1330          LDI #00
1331          PHI TMP2         ..SET UP RETURN FLAG
1332          LBR BSIEX3       ..EXIT; NO BSIN ERRORS
1333   ..
1334   ..ERROR RETRY CALCULATION
1335   ..
1336 BSIER1:  SEX TMP4
1337          LDI #01
1338          ADD              ..INC ERROR COUNTER
1339          STR TMP4
1340          LDI A.0(BSIOLD)
1341          PLO BASE
1342          LDA BASE         ..RESET INPUT POINTER
1343          PHI BSINPT       .. BACK TO OLD
1344          LDN BASE
1345          PLO BSINPT
1346          LDI A.0(MAXERR)  ..FETCH MAX ERR ALLOWED
1347          PLO BASE
1348          LDN BASE
1349          SM               ..MAX - COUNTER -> DF; D
1350          LBDF BSIN        ..BR; RETRY AGAIN
1351          LDI #01          ..RETRIES DONE; SET EXIT
1352          PHI TMP2         .. FLAG FOR PARITY ERROR
1353          LDI A.0(FRBYTE)
1354          PLO BASE
1355          LDI #A3          ..A3 FOR BSIN ERROR
1356          STR BASE         .. OF 3 RETRIES
1357
1358 BSIER2:  LDI A.0(CPUADR)  ..FETCH CPU TYPE
1359          PLO BASE
1360          LDN BASE
1361          ANI #08          ..MASK SCP BIT
1362          LBZ BSIEX3       ..EXIT IF SLAVE
1363          LDI #00          ..00 -> TMP2 (LO) FOR
1364          PLO TMP2         .. FRMES DATA WORD 3
1365          SEP CALL
1366          ,A(FRMES)        ..FORMAT THE ERROR
1367          ,#F0
1368
1369 BSIEX3:  SEQ               ..SET Q
1370          LDI A.0(BUSERR)
1371          PLO BASE         ..RESET BUS ERROR
1372          LDI #00          ..COUNTER TO ZERO
1373          STR BASE
1374          SEP RETURN       ..EXIT SUBROUTINE
1375
```

```
1376
1377   ..................................
1378   ..BSOUT..BUS OUTPUT SUBROUTINE......
1379   ..................................
1380
1381   ..MASTER VERSION..
1382
1383           ..ON RETURN TMP2 HI WILL CONTAIN:
1384           ..00-TRANSFER OK
1385           ..01-PARITY ERROR EXIT
1386           ..03-TIMED OUT
1387           ..04-TOO MANY WORDS
1388           ..05-HARD ERROR IN TRANSFER VALID
1389           ..
1390   BSOUT:  LDA BSOUPT         ..STORE SIZE IN TMP1
1391           PLO TMP1
1392           SDI #0F
1393           BM  BSOTWD
1394           LDN BSOUPT
1395           PHI TMP1
1396           BNZ BSOTWD
1397           DEC BSOUPT
1398           LDI A.0(CNTOP1)    ..FETCH CONTROL OUTPUT
1399           PLO BASE           ..WORD
1400           LDN BASE           ..SET BUSY BIT LOW
1401           ANI #BF
1402           STR BASE
1403           SEX BASE
1404           OUT 5              ..OUTPUT BUSY BIT
1405           DEC BASE           ..RESET BUSY BIT
1406           LDN BASE
1407           ORI #40
1408           STR BASE
1409           SEX BSOUPT
1410           BR  BSOUT0         ..START TRANSACTION
1411
1412   ..HARD ERROR RECOVERY..
1413
1414   BSOTHE: LDI #05            ..HARD ERROR IN TR. VALID
1415           LSKP
1416   BSOTOU: LDI #03            ..TIMED OUT
1417           LSKP
1418   BSOTWD: LDI #04            ..TOO MANY WORDS
1419           PHI TMP2
1420           SEX BASE           ..TIMED OUT
1421           OUT 5              ..RESET OUTPUT BUSY
1422           SEQ                ..TO A HIGH
1423           LDI A.0(BSOOLD)
1424           PLO BASE
1425           LDA BASE
1426           PHI BSOUPT         ..RESET OUTPUT POINTER
1427           LDN BASE
1428           PLO BSOUPT
1429           LDI A.0(FRBYTE)
1430           PLO BASE
1431           LDI #91            ..DATA WORD 1 SET TO
```

```
1432            STR BASE            ..91 FOR NO RETRY
1433            LBR BSOEX2          ..NO RESPONSE
1434
1435 BSOUT0:    LDI #40             ..RESET INDIVIDUAL
1436            PLO TMP4            ..  WORD TMOUT
1437
1438            OUT 3               ..OUTPUT DATA TO BUS
1439            REQ                 ..SET Q=0 FOR H/S
1440
1441 BSOUT1:    B3 BSOUT2           ..BR; GOT RESP. H/S
1442            DEC TMP4
1443            GLO TMP4
1444            LBNZ BSOUT1         ..BR; NOT TIMED OUT
1445            LBR BSOTOU          ..ERROR; TIMED OUT
1446
1447 BSOUT2:    DEC TMP1            ..DECREMENT WORD COUNT
1448            GLO TMP1            ..FETCH WORD COUNT
1449            LSNZ                ..LONG SKIP IF CNT NOT 0
1450            SEX BASE
1451            OUT 5               ..OUTPUT BUSY HI; CNT =0
1452            SEQ                 ..SET Q = 1
1453 BSOUT3:    BN3 BSOUT4          ..WAIT FOR HANDSHAKE
1454            DEC TMP4            ..DEC TMOUT
1455            GLO TMP4            ..CHECK TMOUT
1456            BNZ BSOUT3
1457            LBR BSOTOU          ..ERROR; TIMED OUT
1458 BSOUT4:    GLO TMP1
1459            BNZ BSOUT0          ..END OF BLOCK?
1460
1461 ..WORD COUNT EQUALS ZERO; TMOUT TRANSFER VALID..
1462
1463            LDI A.0(TMOUT2)     ..INITIALIZE TRANSFER
1464            PLO BASE            ..  VALID TIMEOUT
1465            LDN BASE
1466            PHI TMP4            ..INITIATE TIME OUT
1467
1468 BSOUT5:    DEC TMP4            ..TIMEOUT TRANSFER VALID
1469            GHI TMP4
1470            B2 BSOUT6           ..BR; REC. H/S TMOUT
1471            BNZ BSOUT5          ..BR; NOT TIMED OUT
1472            BR BSOUT7           ..BR; ERROR FOUND
1473
1474 BSOUT6:    BN3 BSOUT7          ..BR; TRANSFER NOT O.K.
1475            LDI #00             ..00 DENOTES TRNS. O.K.
1476            LSKP
1477 BSOUT7:    LDI #FF             ..FF DENOTES NOT O.K.
1478            STR STKPTR
1479            REQ                 ..ACKNOWLEDGE TRNS. VALID
1480
1481 BSOUT8:    BN2 BSOUT9          ..BR; TRANSFER VALID =1
1482            DEC TMP4
1483            GHI TMP4            ..DEC & CHECK TMOUT
1484            BNZ BSOUT8          ..BR; CONTINUE TMOUT
1485            BR BSOTHE           ..BR; HARD ERROR FOUND
1486
1487 BSOUT9:    LDN STKPTR
```

```
1488            LBNZ BSOER1     ..BR; TRANSFER NOT O.K.
1489            SEP CALL
1490            ,A(DECHK)       ..DESELECT SLAVE
1491            SEQ             ..RELEASE SLAVE
1492 ..
1493 ..TEST FOR END OF FILE
1494 ..
1495            LDI A.0(BSOUEN)
1496            PLO BASE
1497            SEX BASE
1498            INC BASE
1499            GLO BSOUPT
1500            SD
1501            DEC BASE
1502            GHI BSOUPT
1503            SDB
1504            LBDF BSOUTA
1505            LDI A.0(BSOUST)
1506            PLO BASE
1507            LDA BASE
1508            PHI BSOUPT
1509            LDN BASE
1510            PLO BSOUPT
1511 ..
1512 ..ADVANCE OLD POINTER
1513 ..
1514            LDI A.0(BSOOLD)
1515            PLO BASE
1516            GHI BSOUPT
1517            STR BASE
1518            INC BASE
1519            GLO BSOUPT
1520            STR BASE
1521            LBR BSOUTB
1522 BSOUTA:    LDI A.0(BSOOLD)
1523            PLO BASE
1524            INC BASE
1525            LDN BASE        ..MOVE BSOOLD
1526            ADI #10         ..TO NEXT
1527            STR BASE        ..LOCATION
1528            PLO BSOUPT      ..POINTER ALSO
1529            DEC BASE
1530            LDN BASE
1531            ADCI #00
1532            STR BASE
1533            PHI BSOUPT
1534 BSOUTB:    LDI #00         ..EXIT FOR GOOD TRANSFER
1535            PHI TMP2
1536            LBR BSOEXT      ..SET FLAG=0.
1537 BSOER1:    SEX TMP1
1538            SEQ             ..RELEASE SLAVE
1539            LDI A.0(BSOOLD) ..UPDATE
1540            PLO BASE        ..POINTER FOR RESTART
1541            LDA BASE
1542            PHI BSOUPT
1543            LDN BASE
```

```
1544            PLO BSOUPT
1545    ..
1546    ..ERROR RETRY CALCULATION
1547    ..
1548            LDI A.0(BUSERR)
1549            PLO TMP1
1550            GHI BASE
1551            PHI TMP1
1552            LDI #01
1553            ADD             ..INC ERROR COUNT
1554            STR TMP1
1555            LDI A.0(MAXERR) ..FETCH MAX ERROR COPUNT
1556            PLO BASE
1557            LDN BASE
1558            SM              ..MAX - COUNTER -> DF, D.
1559            LBDF BSOUT      ..RETRY IF>3 ATTEMPTS
1560            LDI #01
1561            PHI TMP2
1562            LDI A.0(FRBYTE)
1563            PLO BASE
1564            LDI #93
1565            STR BASE
1566 BSOEX2: LDI A.0(CPUADR)    ..FETCH CPU TYPE
1567            PLO BASE
1568            LDN BASE
1569            ANI #08          ..MASK SCP BIT
1570            LBZ BSOEXT       ..EXIT IF SLAVE
1571            LDI #00
1572            PLO TMP2         ..00-> TMP2(LO)
1573            SEP CALL         ..FORMAT ERROR
1574            ,A(FRMES)        ..MESSAGE
1575            ,#F7
1576 BSOEXT: LDI A.0(BUSERR)
1577            PLO BASE
1578            LDI #00          ..RESET BUS ERROR
1579            STR BASE         .. COUNTER TO ZERO
1580            SEP RETURN       ..EXIT SUBROUTINE
1581            ..
1582            ..
1583            ..
1584            ..
1585            ..........................................
1586            ..INTERUPT ROUTINE...
1587            ........................
1588            ..
1589            ..
1590 INTEXT: SEX STKPTR          ..RESTORE X
1591            LDA STKPTR       ..RESTORE BASE
1592            PLO BASE
1593            LDA STKPTR       ..RESTORE D
1594            LBR INTRET       ..EXIT WITH IE=1
1595 INTDEX: SEX STKPTR          ..RESTORE X
1596            LDA STKPTR
1597            PLO BASE         ..RESTORE BASE
1598            LDA STKPTR       ..RESTORE D
1599            DIS              ..EXIT WITH IE=0
```

```
1600            SKP                 ..SOMETIME ENTRY POINT FOR RO
1601  INTRET:   RET
1602  INTVCT:   DEC STKPTR          ..POP X AND P ONTO STACK
1603            SAV
1604            DEC STKPTR
1605            STR STKPTR          ..POP D TOSTACK
1606            DEC STKPTR
1607            GLO BASE
1608            STR STKPTR          ..POP LO BASE
1609            GLO FLGWRD
1610            ANI URM
1611            LBNZ INTOUT
1612            ..............................
1613            .....DATA INPUT...............
1614            ...INTERUPT HANDLER...........
1615            ..............................
1616            SEX URINPT          ..SET INPUT POINTER
1617            GLO FLGWRD
1618            ANI UR1ST           ..MASK 1ST  WORD FLAG
1619            LBNZ INTVC1         ..BRANCH IF NOT FIRST BYTE
1620            SEX PROCTR
1621            GLO FLGWRD
1622            ORI UR1ST
1623            PLO FLGWRD          ..RESET FIRST BYTE FLAG
1624            INP 1
1625            PLO TMP5            ..STORE LS SIZE
1626            LBZ INTER1
1627            SDI #0F
1628            BM INTER1
1629            GLO TMP5
1630            STR URINPT
1631            BR INTVC2
1632  INTVC1:   GLO FLGWRD
1633            ANI UR2ND           ..2ND BYTE FLAG
1634            BNZ INTVC3
1635            GLO FLGWRD          ..YES
1636            ORI UR2ND
1637            PLO FLGWRD
1638            INP 1
1639            BNZ INTER1
1640            PHI TMP5
1641            DEC TMP5
1642            DEC TMP5            ..DEC. COUNT FOR 1ST 2 BYTES
1643            LDI A.0(TMOUT6)     ..SET GTO COUNTER
1644            PLO BASE
1645            LDI A.1(TMOUT6)
1646            PHI BASE
1647            LDN BASE
1648            DEC FREE
1649            STR FREE
1650            LDI BASEHI
1651            PHI BASE
1652            LDN FREE
1653            STR BASE
1654            INC FREE
```

```
1655 INTVC2: LSKP
1656 INTVC3: INP 1
1657         DEC TMP5
1658         INC URINPT      ..INCREMENT POINTER
1659         SEX FREE
1660         DEC FREE
1661         INP 2           ..INPUT STATUS AND TEST FOR
1662         LDI A.0(URIMSK) ..DATA AVAILABLE
1663         PLO BASE        ..AND ALL ERRORS
1664         LDN BASE
1665         AND
1666         INC FREE
1667         BNZ INTER1
1668 INT1:   GLO TMP5
1669         LBNZ INTEXT
1670         GHI TMP5
1671         LBNZ INTEXT
1672         GLO FLGWRD      ..INPUT DONE
1673         ORI URD         ..SET DONE FLAG BIT
1674         ANI URB         ..RESET IST &2ND BYTES
1675         PLO FLGWRD
1676         LBR INTDEX
1677 INTER1: GLO FLGWRD
1678         ANI URB ..RESET 1ST & 2ND BYTES
1679         ANI URDB
1680         ANI URMEB
1681         ANI URPB
1682         PLO FLGWRD
1683         SEX PROCTR
1684         INP 2
1685         LDI A.0(URIOLD+#01)
1686         PLO BASE
1687         LDN BASE
1688         PLO URINPT
1689         LBR INTEXT
1690         ..
1691         ................................
1692         ......DATA OUTPUT.......
1693         .....INTERUPT HANDLER....
1694         ..........................
1695         ..
1696 INTOUT: SEX UROUPT      ..SET OUTPUT POINTERS
1697         OUT 1           ..OUTPUT DATA
1698 INT2:   DEC TMP5
1699         GLO TMP5        ..TEST FOR OUTPUT COMPLETE
1700         LBNZ INTEXT
1701         GHI TMP5
1702         LBNZ INTEXT
1703         GLO FLGWRD      ..OUTPUT DONE
1704         ORI URD         ..CHANGE TO COMPLETE
1705         PLO FLGWRD
1706         LBR INTDEX
1707         LBR INTEXT
1708         ..
1709         ..
1710         ................................
```

```
1711                ..UPDATE REAL TIME CLOCK AND
1712                ..WATCH DOG OUTPUT SUBROUTINE
1713                ..
1714                ..
1715 RTCUPD: GHI FLGWRD        ..RESET UPDATE FLAG BIT
1716         ANI RTCB
1717         PHI FLGWRD
1718         LDI A.0(RTCSEC) ..FETCH RTC POINTER
1719         PLO TMP1         ..AND POINT AT SECONDS
1720         GHI BASE
1721         PHI TMP1
1722         SEX TMP1
1723         LDI #01          ..INCREMENT SECONDS
1724         ADD              ..REGISTER
1725         STR TMP1
1726         LDI A.0(CNTOP1) ..FETCH,OUT 7 CONTROL
1727         PLO BASE         ..WORD
1728         SEX BASE
1729         LDN TMP1         ..TEST FOR 2 SECOND
1730         ANI #01          ..INTERVALS
1731         LBZ RTCWD1
1732         LDN BASE         ..OUTPUT WATCHDOG
1733         ORI #08 ..CLOCK TO A HIGH
1734         STR BASE
1735         LBR RTCWD2
1736 RTCWD1: LDN BASE
1737         ANI #F7
1738         STR BASE
1739 RTCWD2: SEX BASE
1740         OUT 5
1741         SEX TMP1
1742         LDI 60
1743         SD               ..GREATER OR EQUAL TO 60
1744         LBNF RTCEXT      ..SECONDS ?
1745         LDI #00 ..YES;   RESET SECONDS
1746         STR TMP1
1747         INC TMP1
1748         LDI #01 ..INCREMENT MINUTES
1749         ADD
1750         STR TMP1
1751         LDI 60   ..MINUTES GREATER THAN OR EQUAL
1752         SD       ..TO 60
1753         LBNF RTCEXT
1754         LDI #00 ..YES;   RESET MINUTES
1755         STR TMP1
1756         INC TMP1
1757         LDI #01
1758         ADD
1759         STR TMP1
1760         LDI 24   ..GREATER OR EQUAL TO
1761         SD       .. 24
1762         LBNF RTCEXT
1763         LDI 00   ..RESET HOURS
1764         STR TMP1
1765         INC TMP1
1766         LDI #01
```

```
1767              ADD         ..INCREMENT DAYS
1768              STR TMP1
1769 RTCEXT: SEP RETURN
1770 ..
1771 ..........................................
1772 ..UART INPUT DONE SUBROUTINE
1773 ..PROCESS INPUT BLOCK
1774 ..AND SATISFY THE PROTOCAL FOR
1775 ..UART IN AND OUT
1776 ..........................................
1777 ..
1778 ..
1779 ..DISABLE INTERUPTS AND DO PARITY TESTS
1780 ..
1781 UINPRO: SEP CALL         ..PERFORM PARITY
1782            ,A(PARITY)    ..TEST
1783            ,A.0(URIOLD)
1784            ,BASEHI
1785            ,#00
1786 ..
1787              ..........................................

1788              ..UART INPUT
1789              ..PARITY ERROR , SET NACK BIT
1790              ..
1791              ..
1792              ..
1793 URTPR1:    GHI TMP2          ..FETCH PARITY FLAG
1794           LBZ URTPR6         ..BRANCH IF NO ERROR
1795           GLO FLGWRD
1796           ORI URME
1797           PLO FLGWRD
1798 ..
1799 ..PERFORM ERROR RECOVERY IF MASTER. IE. UP(SCP)
1800 ..
1801 URTPR4: LDI A.0(CPUADR)
1802           PLO BASE
1803           LDN BASE
1804           XRI #20
1805           LBNZ UIN11        ..BRANCH IF SLAVE
1806           LDI A.0(URTERR)   ..SCM IS MASTER OF LINK
1807           PLO BASE          ..FETCH ADDR OF ERROR COUNTER

1808           LDN BASE
1809           ADI #01 ..INCREMENT ERROR COUNT
1810           STR BASE
1811           XRI #03
1812           LBNZ URTPR5       ..BRANCH IF LESS THAN 3 ERRO

1813           PLO TMP2
1814           PHI TMP2
1815           LDI A.0(FRBYTE)
1816           PLO BASE
1817           LDI #A3
1818           STR BASE
1819           SEP CALL
```

```
1820              ,A(FRMES)
1821              ,#F0
1822 URTPR5:   LDI A.0(UROOLD)
1823              PLO BASE
1824              LDA BASE
1825              PHI UROUPT
1826              LDN BASE
1827              PLO UROUPT
1828              LBR UIN11
1829 ..
1830 ................................................
1831 ..UART INPUT
1832 ..NO PARITY ERROR - SET ACK BIT
1833 ................................................
1834 ..
1835 URTPR6: LDI A.0(URIOLD) ..PARITY OK
1836              PLO BASE          ..FETCH THE CONTROL
1837              LDA BASE
1838              PHI TMP2
1839              LDN BASE
1840              PLO TMP2
1841              INC TMP2
1842              INC TMP2
1843 URTPR9: LDI A.0(UROOLD) ..FETCH OLD UART
1844              PLO TMP1          ..ROTPUT POINTER
1845              GHI BASE
1846              PHI TMP1
1847              GLO FLGWRD
1848              ANI LAST
1849              SHL
1850              SHL
1851              STR FREE
1852              SEX FREE
1853              LDN TMP2
1854              ANI #80
1855              XOR
1856              LBNZ URTPR7
1857 URTPRI: GLO FLGWRD
1858              ANI LASTB         ..COMPLEMENTS LAST BIT 7
1859              ORI LAST
1860              STR FREE
1861              SEX FREE
1862              GLO FLGWRD
1863              ANI LAST
1864              XRI LAST
1865              ORI LASTB
1866              AND
1867              PLO FLGWRD
1868              GLO FLGWRD
1869              ANI OUTFUB        ..CLEAR O/P FILE FULL
1870              PLO FLGWRD
1871 URTPR2: SEX BASE
1872              LDI A.0(BSIOLD)
1873              PLO BASE
1874              GHI UROUPT
1875              SM
```

```
1876            BNZ URTPRB
1877            GLO UROUPT
1878            IRX
1879            SM
1880            LBZ URTPRE
1881 URTPRB:    LDI A.0(CPUADR)
1882            LDN TMP2
1883            ANI #40
1884            LBZ URTPRA
1885            LDI A.0(UROUEN)
1886            PLO BASE
1887            SEX BASE
1888            INC BASE
1889            GLO UROUPT
1890            SD
1891            DEC BASE
1892            GHI UROUPT
1893            SDB
1894            LBDF URINTP
1895            LDI A.0(UROUST)
1896            PLO BASE
1897            LDA BASE
1898            PHI UROUPT
1899            LDN BASE
1900            PLO UROUPT
1901            ..IS THERE A MES THERE STILL ??
1902            LBR URTPR2
1903 URINTP:    GHI UROUPT       ..UPDATE OLD UART POINTER
1904            STR TMP1         ..TO NEW LOCATION AS DATA
1905            INC TMP1         ..WAS OUTPUT AND RECEIVED
1906            GLO UROUPT       ..CORRECTLY.
1907            STR TMP1
1908            INC UROUPT
1909            INC UROUPT       ..FETCH CONTROL
1910            LDN UROUPT       ..WORD AND SET ACK BIT
1911            ORI #C0
1912            STR UROUPT
1913 URTPRN:    DEC UROUPT
1914            DEC UROUPT       ..RESET POINTER TO START OF B

1915            SEP CALL
1916            ,A(PARITY)
1917            ,A.0(UROOLD)
1918            ,BASEHI
1919            ,#01
1920            GHI FLGWRD
1921            ANI LAMESB
1922            PHI FLGWRD
1923            LBR URTPRX
1924 ..
1925 URTPRH:    LDN TMP2
1926            ANI #80
1927            LBNZ URTPRI
1928            LDN TMP1
1929            ANI #7F ..CLEAR LAST SR
1930            STR TMP1
```

```
1931            LBR URTPRI
1932 ..
1933 URTPRJ:  DEC TMP1
1934            LDA TMP1
1935            ANI #10
1936            STR TMP1
1937            PLO UROUPT
1938            LDN TMP1
1939            ADCI #00
1940            STR TMP1
1941            PHI UROUPT
1942            LBR URTPR2
1943 ..
1944 URTPRK:  LDI A.0(FRBYTE)
1945            PLO BASE
1946            GLO FLGWRD
1947            ANI LAST
1948            LBNZ URTPRQ
1949            LDI #00
1950            STR BASE
1951            LBR URTPRL
1952 URTPRQ:  LDI #80
1953            STR BASE
1954 URTPRL:  SEP CALL
1955            ,A(FRMES)
1956            ,#00
1957            LBR URTPRX
1958 URTPRM:  INC UROUPT
1959            INC UROUPT
1960            GLO FLGWRD
1961            SHR
1962            SHR
1963            ANI #80
1964            STR FREE
1965            SEX FREE
1966            LDN UROUPT
1967            ANI #7F
1968            OR
1969            STR UROUPT
1970            LBR URTPRN
1971 ..
1972 ..FORMAT  NO DATA IN BUFFER
1973 ..
1974 URTPRE:  LDI A.0(CPUADR)
1975            LDA TMP1
1976            PHI TMP4
1977            LDN TMP1
1978            PLO TMP4
1979            DEC TMP1
1980            INC TMP4
1981            INC TMP4
1982            LDN TMP4
1983            ANI #07
1984            LBZ URT1
1985            GHI UROUPT     ..UPDATE OLD UART POINTER
1986            STR TMP1       ..TO NEW LOCATION AS DATA
```

```
987           INC  TMP1         ..WAS OUTPUT AND RECEIVED
988           GLO  UROUPT       ..CORRECTLY.
989           STR  TMP1
990           LDI  A.0(FRBYTE)
991           PLO  BASE
992           LDI  #80
993           STR  BASE
994           SEP  CALL
995           ,A(FRMES)
996           ,#00
997           LBR  URTPRX
998           ..LAST MES WAS A SCAN ONLY
999  URT1:    LDA  TMP1
1000          PHI  UROUPT
1001          LDN  TMP1
1002          PLO  UROUPT
1003          LBR  URTPRX
1004 URTPR7:  LDI  A.0(UROOLD) ..FETCH OLD ADDRESS
1005          PLO  TMP1
1006          GHI  BASE
1007          PHI  TMP1
1008          LDA  TMP1
1009          PHI  UROUPT       ..RESET OUT POINTER
1010          LDN  TMP1
1011          PLO  UROUPT
1012          LBR  URTPX
1013 URTPRA:  GHI  FLGWRD
1014          ANI  LAMESA
1015          BNZ  URTPRF
1016          GHI  FLGWRD
1017          ORI  LAMESA
1018          PHI  FLGWRD
1019          LBR  URTPRG
1020 URTPRF:  LDI  A.0(UROOLD)
1021          PLO  BASE
1022          LDA  BASE
1023          PHI  UROUPT
1024          LDN  BASE
1025          PLO  UROUPT
1026          LBR  URTPRX
1027 URTPRG:  GLO  UROUPT
1028          SMI  #0A          ..MAKE ROOM FOR ACK MES
1029          PLO  UROUPT
1030          GHI  UROUPT
1031          SMBI #00
1032          PHI  UROUPT
1033 ..CHECK IF UROUPT IS PAST START OF BUFFER
1034          LDI  A.0(UPOUST +#01)
1035          PLO  BASE
1036          SEX  BASE
1037          GLO  UROUPT
1038          SM                ..UPOUPT - UPOUST
1039          DEC  BASE
1040          GHI  UPOUPT
1041          SMB               ..UPOUPT - UPOUST
1042          LBDF URTPRD
```

```
2043            LDI  A.0(UPOUEN)
2044            PLO  BASE
2045            LDA  BASE
2046            PHI  UROUPT
2047            LDN  BASE
2048            PLO  UROUPT
2049  URTPRD:   LDI  A.0(UROOLD)
2050            PLO  BASE
2051            GHI  UROUPT
2052            STR  BASE
2053            INC  BASE
2054            GLO  UROUPT
2055            STR  BASE
2056            GLO  DNINPT
2057            STR  FREE
2058            DEC  FREE
2059            GHI  DNINPT
2060            STR  FREE
2061            LDI  A.0(DNIOLD)
2062            PLO  BASE
2063            GHI  UROUPT
2064            PHI  DNINPT
2065            STR  BASE
2066            INC  BASE
2067            GLO  UROUPT
2068            PLO  DNINPT
2069            STR  BASE
2070            DEC  FREE
2071            LDI  A.0(FRBYTE)
2072            PLO  BASE
2073            LDI  #80
2074            STR  BASE
2075            SEP  CALL
2076            ,A(FRMES)
2077            ,#00
2078            INC  FREE
2079            ..RESTORE DNINPT
2080            LDI  A.0(DNIOLD)
2081            PLO  BASE
2082            LDA  FREE
2083            PHI  DNINPT
2084            STR  BASE
2085            INC  BASE
2086            LDN  FREE
2087            PLO  DNINPT
2088            STR  BASE
2089  URTPRX:   LDI  A.0(URIOLD)
2090            PLO  BASE
2091            LDA  BASE
2092            PHI  TMP2
2093            LDN  BASE
2094            PLO  TMP2
2095            INC  TMP2
2096            INC  TMP2
2097            LDN  TMP2
2098            ANI  #07
```

```
2099            LBNZ URTEX
2100            ..YES SCAN ONLY
2101  URTFX:    GLO FLGWRD
2102            ORI URP              ..SET NO PROCIN
2103            PLO FLGWRD
2104  URTFX1:   LDI A.0(URIOLD)
2105            PLO BASE
2106            LDA BASE
2107            PHI URINPT
2108            LDN BASE
2109            PLO URINPT
2110  URTEX:    SEP RETURN
2111
2112  ..
2113  ..........................................
2114  ..FORMAT MESSAGE SUBROUTINE
2115  ..USING DOWN-IN AS A POINTER, FORMAT A
2116  ..MESSAGE TO UP-OUT BUFFER
2117  ..FORMAT
2118  ..    ,A(FRMES)
2119  ..    ,XX    0X      ACK
2120  ..          FX      ERROR
2121  ..          X0      NO ID
2122  ..          X7      ID FROM DNOOLD
2123  ..          XF      ID FROM UPIOLD
2124  .. FRBYTE     OR FOR CNTR WORD      FIRST ERROR WORD
2125  ..     TMP2 HI                      SECOND ERROR WORD
2126  ..     TMP2 LO                      THIRD ERROR WORD
2127  ..
2128  ..
2129  ..
2130  ..THE MESSAGE FORMATTED STARTS AT THE
2131  ..BYTE R9 IS POINTING AT AND EXITS WITH R9
2132  ..POINTING AT A FREE LOCATION FOR NEXT TIME
2133  ..
2134  ..THE CPU DESINGNATION IS ORED INTO THE CONTROL
2135  ..WORD FOR ERRORS THE 3 LSB ARE SET HIGH
2136  ..ALONG WITH THE 2 MSB  FOR ACKS THE REST OF THE CW I
2137  ..AS A IN LINE PARAMETER
2138  ..
2139  ..IF SMCT ARE AVAILABLE IN DNOOLD OR UPIOLD
2140  ..CHECKS FOR END OF FILE
2141  ..
2142  ..REGISTERS USED    6,9,B,C,D,E
2143  ..SUBROUTINES       PARITY
2144  ..
2145  ..VARIABLES
2146  ..        CPUADR       CPU DESIGNATION
2147  ..        UPIOLD       SMCT FILE
2148  ..        DNOOLD       SMCT OUTPUT FILE
2149  ..        BASEHI       HI ADDRESS OF RE
2150  ..        UPOUEN       END OF FILE
2151  ..        UPOUST       START OF FILE
2152  ..        DNIOLD       OLD POINTER OF MES
2153  ..        FRBYTE PARAMETER
```

```
2154  ..
2155  ..
2156  ..
2157  ..
2158  FRMES:  LDI  A.0(FRBYTE)
2159          PLO  BASE
2160          LDN  BASE
2161          STR  FREE
2162          LDI  A.0(CPUADR)  ..FETCH CPU TYPE
2163          PLO  BASE
2164          ..
2165          ..IS FILE FULL ??
2166          ..
2167          GLO  FLGWRD
2168          ANI  OUTFUL
2169          LBNZ FRMES9
2170          ..CHECK POINTER POSITIONS
2171          SEX  FREE
2172          DEC  FREE
2173          GHI  UPOUPT
2174          STXD
2175          GLO  UPOUPT
2176          STR  FREE
2177          GLO  DNINPT
2178          SM             ..DN - UP
2179          INC  FREE
2180          GHI  DNINPT
2181          SMB            .. DN - UP
2182          INC  FREE
2183          LBDF FRMESS
2184          ..NOW DNINPT < UPOUPT GETTING CLOSE TO
2185          ..A FULL FILE ?? HOW CLOSE ?
2186          XRI  #FF
2187          SMI  #05       ..D - M(R(P)) -> DF, D.
2188          LBDF FRMESS
2189          ..THE BUFFER IS TOO CLOSE TO FULL
2190          GLO  FLGWRD
2191          ORI  OUTFUL
2192          PLO  FLGWRD
2193          LBR  FRMES9
2194  FRMESS: LDA  LINK
2195          PLO  TMP4
2196          ANI  #F0
2197          LBZ  FRMES1
2198          LDI  #0C       ..ERROR MES
2199          STR  DNINPT    ..SIZE 12 WORDS
2200          INC  DNINPT
2201          LDN  BASE
2202          ORI  #C7
2203          LBR  FRMES2
2204  FRMES1: LDI  #0A       ..ACK MES
2205          STR  DNINPT
2206          INC  DNINPT
2207          LDN  FREE
2208          SEX  BASE
2209          OR             ..FOR CONTROL WORD
```

```
2210 FRMES2:  INC DNINPT
2211          INC DNINPT
2212          STR DNINPT
2213          DEC DNINPT
2214          LDI #00
2215          STR DNINPT
2216          INC DNINPT
2217          INC DNINPT
2218          GLO TMP4
2219          ANI #08
2220          BZ FRMES3
2221          LDI A.0(UPIOLD)     ..FETCH START ADDRESS
2222          LSKP
2223 FRMES3:  LDI A.0(DNOOLD)
2224          PLO BASE            ..OF S/R FILE
2225          LDA BASE
2226          PHI TMP1
2227          LDN BASE
2228          PLO TMP1
2229          INC TMP1
2230          INC TMP1            ..POINT TO MESS. INDEX
2231          INC TMP1
2232          LDI #05             ..COUNTER FOR 6  BYTES TO
2233          PLO BASE            ..TRANSFER
2234 FRMES4:  GLO TMP4
2235          ANI #0F
2236          LBNZ FRMES5         ..BRANCH IF DATA NOT ZEROS
2237          LDI #00             ..ZERO DATA
2238          SKP
2239 FRMES5:  LDA TMP1            ..TRANSFER UP-IN DATA
2240          STR DNINPT
2241          INC DNINPT
2242          DEC BASE            ..DECREMENT AND TEST COUNTER
2243          GLO BASE
2244          LBNZ FRMES4         ..BRANCH IF NOT DONE
2245          GLO TMP4
2246          ANI #F0
2247          LBNZ FRMES6
2248          LDI #00
2249          STR DNINPT
2250          INC DNINPT
2251          LBR FRMES7
2252 FRMES8:  DEC DNINPT          ..T
2253          DEC DNINPT          ..C
2254          DEC DNINPT          ..M
2255          LDI A.0(CHANEL)
2256          PLO BASE
2257          LDN BASE            ..FETCH THE CHANNEL #
2258          SMI #01
2259          STR DNINPT
2260          INC DNINPT
2261          INC DNINPT
2262          INC DNINPT
2263          LBR FRMESA          ..BR TO CONTINUE
2264 FRMES6:  LDN FREE            ..ERROR MES
2265          STR DNINPT
```

```
2266            ANI #F0              ..MASK ERROR TYPE
2267            XRI #A0              ..CHECK FOR BSIN ERR
2268            LBZ FRMESB           ..BR; ADD IN CHANNEL #
2269 FRMESA:    INC DNINPT
2270            GHI TMP2
2271            STR DNINPT
2272            INC DNINPT
2273            GLO TMP2
2274            STR DNINPT
2275            INC DNINPT
2276 FRMES7:    SEP CALL
2277            ,A(PARITY)           ..CALC. AND WRITE PARITY
2278            ,A.0(DNIOLD)
2279            ,BASEHI
2280            ,#01
2281 FRMES8:    LDI A.0(UPOUEN)      ..A FETCH END OF FILE
2282            PLO BASE
2283            INC DNINPT
2284            SEX BASE
2285            INC BASE
2286            GLO DNINPT
2287            SD
2288            DEC BASE
2289            GHI DNINPT
2290            SDB
2291            BPZ FRMES9
2292            LDI A.0(UPOUST)      ..AT END
2293            PLO BASE             ..UPDATE POINTER
2294            LDA BASE             ..TO START OF FILE
2295            PHI DNINPT
2296            LDN BASE
2297            PLO DNINPT
2298 FRMES9:    LDI A.0(DNIOLD)      ..UPDATE OLD BUS INPUT
2299            PLO BASE             ..POINTER WITH NEW BUS
2300            GHI DNINPT
2301            STR BASE
2302            GLO DNINPT
2303            INC BASE
2304            STR BASE
2305            SEP RETURN           ..EXIT SUBROUTINE
2306 ..
2307 ..
2308 ..........................................
2309 ..PROCESS INPUT COMMANDS
2310 ..EXECUTE CPU COMMANDS IF CPU TYPE MATCHES
2311 ..SENDS ACK WITH MSMCT AFTER COMMAND EXECUTED
2312 ..IF CPU TYPE DOES NOT MATCH THEN PASSES MESSAGE BY
2313 ..IF NO COMMAND EXISTS THEN SENDS CODE ERROR
2314 ..
2315 ..ASSUMES - MAXIMUM MESSAGE SIZE OF 16 BYTES
2316 ..        - IF A FORMER MESSAGE IS PRESENT THEN BIT 7
2317 ..          OF FIRST BYTE IN QUEUE IS HIGH
2318 ..        - IF FILE ONLY HAS ROOM FOR SR TO ITSELF
2319 ..          THEN BIT 4 OF RF IS HIGH THE LAST SR
```

```
2320 ..                   IS CLEARED THERFORE NOT ALLOWING
2321 ..                     A COMMUNICATION FREEZE UP
2322 ..
2323 ..SETS UP POINTER TO NEXT FREE LOCATION SO
2324 ..
2325 ..UPIOLD (HI,LO)    POINTS AT START OF MESSAGE
2326 ..UPINPT    (R7)    POINTS AT END OF MESSAGE
2327 ..CPUADR            DESIGNATION OF CPU
2328 ..UPINEN  (HI,LO)   END OF FILE
2329 ..UPINST  (HI,LO)   START OF FILE
2330 ..REG E    HI POINTS TO BASE PAGE CONTAINING VARIABL

2331 ..
2332 PROCIN: LDI A.O(UPIOLD)   ..FETCH MESS. ADDRESS
2333         PLO BASE
2334         LDA BASE
2335         PHI TMP2
2336         LDN BASE
2337         PLO TMP2
2338         LDI A.O(CPUADR)        ..FETCH CPU TYPE
2339         PLO BASE
2340         SEX BASE
2341         INC TMP2
2342         INC TMP2          ..FETCH CONTROL WORD
2343         LDN TMP2
2344         ANI #38           ..MASK DESTINATION BITS
2345         XOR
2346         LBZ PROCD         ..BRANCH IF   CPUADR
2347         ..CHECK FOR SR FULL
2348         GHI FLGWRD
2349         ANI SRFULL
2350         LBNZ UIN11
2351         GHI FLGWRD
2352         ORI SRPRES        ..SET S/R FLAG
2353         PHI FLGWRD
2354 PROCP1: LDI A.O(UPIOLD)
2355         PLO BASE
2356         LDA BASE
2357         PHI TMP2
2358         LDN BASE
2359         PLO TMP2
2360         LDN TMP2
2361         ORI #80
2362         STR TMP2
2363 PROCP2: LDI A.O(UPINEN)
2364         PLO BASE
2365 PROCP3: SEX BASE
2366         INC BASE
2367         GLO UPINPT
2368         SD
2369         DEC BASE
2370         GHI UPINPT
2371         SDB
2372         LBDF PROCP4       ..END OF FILE
2373         LDI A.O(UPINST)
2374         PLO BASE
```

```
2375            LDA BASE
2376            PHI UPINPT      ..RESET POINTER
2377            LDN BASE
2378            PLO UPINPT
2379            LBR PROCP5
2380 ..INCREMENT POINTER
2381 PROCP4:    LDI A.0(UPIOLD)
2382            PLO BASE
2383            INC BASE
2384            LDN BASE
2385            ADI #10         ..MOVE TO NEXT
2386            STR BASE        ..LOCATION
2387            PLO UPINPT
2388            DEC BASE
2389            LDN BASE
2390            ADCI #00
2391            STR BASE
2392            PHI UPINPT
2393            LBR PROCP6
2394 ..
2395 ..ADVANCE OLD POINTER
2396 ..
2397 PROCP5:    SEX BASE
2398            LDI A.0(UPIOLD)
2399            PLO BASE
2400            INC BASE
2401            GLO UPINPT      ..UPDATE POINTER
2402            STXD
2403            GHI UPINPT      ..FROM UART IN
2404            STXD
2405 ..CHECK IF SR FROM BEFORE
2406 PROCP6:    LDN UPINPT
2407            ANI #80
2408            LBNZ PROCP2
2409            SEP RETURN
2410 ..
2411 ..
2412 ..BREAKDOWN COMMANDS INTO 2 TYPES
2413 ..DIAGNOSTIC AND DOWNLOAD
2414 ..
2415 PROCD:     LDN TMP2        ..FETCH CONTROL WORD
2416            ANI #07         ..MASK COMMAND TYPE
2417            PLO TMP1        ..AND STORE
2418            GLO TMP2        ..INCREMENT POINTER TO
2419            ADI #06         ..FIRST DATA WORD
2420            PLO TMP2
2421            GHI TMP2
2422            ADCI #00        ..DO DOUBLE PRECISION ADD
2423            PHI TMP2
2424            LDN TMP2
2425            PHI TMP1        ..STORE FIRST DATA WORD
2426            GHI FLGWRD
2427            ANI SRFULB      ..CLEAR FLAG IF PROCESSED
2428            PHI FLGWRD
2429            GLO TMP1
2430            XRI #03
```

```
2431            LBZ PROCD8          ..BRANCH FOR DOWNLOAD COMMAN

2432            GLO TMP1
2433            XRI #04
2434            LBZ PROCD1          ..BRANCH ON DIAGNSTIC COMMAN

2435            GLO TMP1
2436            XRI #00 .. BR IF SCAN ONLY
2437            LBZ UIN11
2438 PROCFE:    GLO TMP1            ..USE CONTROL WORD
2439            PHI TMP2            ..AS 2ND DATA BYTE
2440            GHI TMP1            ..USE INTRUCTION
2441            PLO TMP2            ..AS 3RD DATA BYTE
2442            LDI A.O(FRBYTE)
2443            PLO BASE
2444            LDI #CO
2445            STR BASE
2446            SEP CALL
2447            ,A(FRMES)           ..FORMAT ERROR
2448            ,#FF
2449            LBR UIN11
2450 ..
2451 ..
2452 ..TMP1    LO      3 LSB'S OF CONTROL WORD
2453 ..        HI      FIRST DATA WORD
2454 ..TMP2            POINTS AT 1ST DATA WORD
2455 ..............................................
2456 ..START OF DECODEING DIAGNOSTIC TYPE COMMANDS
2457 ..............................................
2458            ..UART INPUT...................
2459            ..ENABLE REDUNDANT MCP..........
2460            ..DISABLE BUS OF THIS MCP...........
2461            ............................
2462            ..
2463            ..
2464 PROCD1:   GHI TMP1
2465            XRI #05
2466            LBNZ PROCD2
2467            LDI A.O(CNTOP2) ..ENABLE REDUNDANT
2468            PLO BASE            ..MCP - TURNOFF MCP
2469            LDN BASE
2470            ORI #01
2471            STR BASE
2472            SEX BASE
2473            OUT 6
2474            LBR UINACK
2475            ..
2476            ..........................................

2477            ..UART INPUT...............
2478            ..DURN OFF REDUNDANT MCP
2479            ..ENABLE MCPS BUS
2480            ..
2481            ..
2482 PROCD2:   GHI TMP1
2483            XRI #04
```

```
2484            LBNZ PROCD3         ..BRANCH IF NOT ENABLE MCP

2485            LDI A.0(CNTOP2)
2486            PLO BASE
2487            LDN BASE            ..FETCH ENABLE BIT
2488            ANI #FE ..AND RESET IT.
2489            STR BASE
2490            SEX BASE
2491            OUT 6               ..OUTPUT CONTROL BIT.
2492            LBR UINACK
2493   ................................................

2494            ..UART INPUT..................
2495            ..SELF TEST MCP...............
2496            ..
2497            ..
2498 PROCD3:    GHI TMP1            ..TEST FOR SELF-TEST
2499            XRI #06             ..MCP COMMAND
2500            LBNZ PROCD4
2501            SEP CALL            ..SELF TEST MCP
2502            ,A(ROMTST)
2503            LDI A.0(FRBYTE)
2504            PLO BASE
2505            LDI #B0
2506            STR BASE
2507            SEP CALL
2508            ,A(FRMES)
2509            ,#FF
2510            LBR UIN11
2511   ................................................
2512            ..UART INPUT
2513            ..REFLECT COMMAND
2514   ................................................

2515 PROCD4:    GHI TMP1
2516            XRI #07
2517            LBNZ PROCD5         ..BRANCH IF NOT REFLECT COMMA

2518            LBR UINACK          ..BRANCH TO ACK ONLY
2519 ..
2520 ................................................
2521 ..TURN ON SCAN COMMAND
2522 ................................................
2523 ..
2524 PROCD5:    GHI TMP1            ..MASK FOR NEXT COMMAND
2525            XRI #00
2526            LBNZ PROCD6         ..BRANCH IF NOT TURN ON
2527            GHI FLGWRD
2528            ORI SCAN            ..SET TURN ON FLAG
2529            PHI FLGWRD
2530            LBR UINACK
2531 ..
2532 ................................................
2533 ..TURN OFF SCAN COMMAND
2534 ................................................
```

```
2535  ..
2536  PROCD6: GHI TMP1              ..MASK FOR NEXT COMMAND
2537          XRI #01
2538          LBNZ PROCD7           ..BRANCH IF NOT TURN OFF
2539          GHI FLGWRD
2540          ANI SCANB             ..CLEAR TURN ON FLAG
2541          PHI FLGWRD
2542          LBR UINACK
2543  ..
2544  ..
2545  ............................................
2546  ..INITILIZE
2547  ............................................
2548  ..
2549  ..
2550  PROCD7: GHI TMP1
2551          XRI #09
2552          LBNZ PROCFE
2553          GLO TMP2
2554          SMI #05
2555          PLO TMP2
2556          LDN TMP2              ..INDEX NUMBER
2557          PLO DNOUPT
2558          LDI A.0(INIT)
2559          PLO TMP5
2560          LDI A.1(INIT)
2561          PHI TMP5
2562          SEX PROCTR
2563          DIS
2564          ,#00
2565  ..
2566  ..
2567  ............................................
2568  ..DECODE DOWNLOAD COMMANDS
2569  ............................................
2570  ..
2571  ..
2572  ..
2573  ............................................
2574  ..UPDATE REAL TIME CLOCK
2575  ............................................
2576  ..
2577  ..
2578  PROCD8: GHI TMP1
2579          XRI #03
2580          LBNZ PROCFE
2581          INC TMP2
2582          LDI A.0(RTCSEC)
2583          PLO BASE
2584          LDI #04
2585          PLO TMP1
2586  UIN6A:  LDA TMP2
2587          STR BASE
2588          INC BASE
2589          DEC TMP1
2590          GLO TMP1
```

```
2591            BNZ UIN6A
2592            LBR UINACK
2593   ..
2594   ..EXIT ROUTINE
2595   ..ACKNOWLEDGE SPECIAL REQUEST
2596   ..
2597   UINACK: LDI A.O(FRBYTE)
2598            PLO BASE
2599            LDI #42
2600            STR BASE
2601            SEP CALL
2602            ,A(FRMES)       ..FORMATE AN ACKNOWLEDGE
2603            ,#0F            ..KEEP DATA
2604   ..
2605   ..................................
2606   ..EXIT ROUTINE
2607   ..BACKUP POINTER FOR NEXT S/R
2608   ..THIS S/R WAS WRONG OR EXECUTED IS DONE WITH
2609   ..
2610   ..................................
2611   UIN11:  LDI A.O(UPIOLD)
2612           PLO BASE
2613           LDA BASE
2614           PHI UPINPT
2615           LDN BASE
2616           PLO UPINPT
2617   UIN13:  SEP RETURN
2618   ..
2619   ..
2620   ..TESTS FOR ROOM IN FILE FOR 2 OR MORE SR'S
2621   TSTSR:  LDI #FF
2622           PLO TMP2
2623           LDI A.O(UPINST)
2624           PLO BASE
2625           GHI FLGWRD
2626           ORI SRFULL
2627           PHI FLGWRD
2628           LDA BASE
2629           PHI TMP4
2630           LDN BASE
2631           PLO TMP4        ..TMP4 CONTAINS POINTER
2632           SEX BASE
2633           ..CHECK FOR SR
2634   TSTSR1: LDN TMP4
2635           ANI #80
2636           LBZ TSTSR3
2637           ..YES INCREMENT POINTER
2638   TSTSR2: GLO TMP4
2639           ADI #10
2640           PLO TMP4
2641           GHI TMP4
2642           ADCI #00
2643           PHI TMP4
2644           ..TEST FOR END OF FILE
2645           LDI A.O(UPINEN + #01)
2646           PLO BASE
```

```
2647            GLO TMP4
2648            SD          ..EN - PT
2649            DEC BASE
2650            GHI TMP4
2651            SDB         .. EN - PT
2652            LBDF TSTSR1
2653            LBR TSTSRX
2654 TSTSR3:    INC TMP2
2655            GLO TMP2
2656            LBZ TSTSR2
2657            GHI FLGWRD
2658            ANI SRFULB
2659            PHI FLGWRD
2660 TSTSRX:    SEP RETURN
2661
2662 ..
2663 ..
2664 END
0001
0002 ................................................
0003 ................................................
0004 ..........SCANNER SLAVE SOFTWARE.............
0005 ................................................
0006 ................................................
0007
0008
0009
0010           ..REV 3-B, JUNE 22/79
0011
0012
0013
0014           ..REGISTER EQUATES..
0015
0016    TMP5=  #00  ..INITIALIZATION PC; RX, TX WORD COUNT
0017    INTVTR=#01  ..INTERUPT VECTOR AND PC FOR INTERUPTS
0018    STKPTR=#02  ..FIRST IN LAST OUT DECREMENTING
0019                .. STACK POINTER
0020    PROCTR=#03  ..MAIN PROGRAM COUNTER
0021    CALL=  #04  ..STANDARD SUBROUTINE CALL
0022    RETURN=#05  ..STANDARD SUBROUTINE RETURN
0023    LINK=  #06  ..SUBROUTINE RETURN LOCATION;
0024                .. SUBROUTINE PARAMETERS
0025    UPINPT=#07  ..POINTER FOR BUS INPUT MESSAGES
0026    UPOUPT=#08  ..POINTER FOR BUS OUTPUT MESSAGES
0027    DNINPT=#09  ..POINTER FOR UART INPUT MESSAGES
0028    DNOUPT=#0A  ..POINTER FOR UART OUTPUT MESSAGES
0029    TMP1=  #0B  ..USERS TEMPORARY REGISTER
0030    TMP2=  #0C  ..USERS TEMPORARY REGISTER
0031    TMP4=  #0D  ..USERS TEMPORARY REGISTER
0032    BASE=  #0E  ..ADDRESSING REGISTER FOR VARIABLES
0033    FLGWRD=#0F  ..MAIN FLOW FLAG WORD
0034    FREE=  #02  ..FREE LOCATION; SAME AS STACK POINTER
0035    TMP3=  #09  ..TEMPORARY REGISTER WHEN NOT USING UART
0036    TMP6=  #0A  ..TEMPORARY REGISTER WHEN NOT USING UART
0037
0038
```

```
0039            ORG #0FA0
0040
0041 VARTAB:  ,X'1F9F'    ..STKPTR
0042          ,X'0000'    ..FLGWRD
0043 CNTOP1:  ,X'C0'      ..CONTROL OUTPUT 1
0044 CNTOP2:  ,X'00'      ..CONTROL OUTPUT 2
0045 CNTOP3:  ,X'00'      ..CONTROL OUTPUT 3
0046 CHANEL:  ,X'FF'      ..CHANNEL # OUTPUT TO MUX.
0047 INDEX:   ,X'00'      ..MESSAGE INDEX # FOR ERRORS
0048 UPIOLD:  ,X'1900'    ..UP-IN-OLD (BUS) PNTR
0049 PROOLD:  ,X'1900'    ..PROCESS OLD (BUSIN) PNTR
0050 UPOOLD:  ,X'1A30'    ..UP-OUT-OLD (BUS) PNTR
0051 FRMOLD:  ,X'1A30'    ..FORMAT OLD (BUSOUT) PNTR
0052 DNIOLD:  ,X'1A10'    ..DOWN-IN-OLD (UART) PNTR
0053 DNOOLD:  ,X'1A00'    ..DOWN-OUT-OLD (UART) PNTR
0054 UPINST:  ,X'1900'    ..START OF UP-IN-FILE
0055 UPOUST:  ,X'1A30'    ..START OF UP-OUT-FILE
0056 UPINEN:  ,X'19F0'    ..END OF UP-IN-FILE
0057 UPOUEN:  ,X'1F4F'    ..END OF UP-OUT-FILE
0058 MEMEND:  ,X'1FFF'    ..END ADDR FOR RAM TEST
0059 MEMSTR:  ,X'1400'    ..START ADDR FOR RAM TEST
0060 CPUADR:  ,X'10'      ..SCANNER SLAVE DESIGNATOR (TYPE)
0061 BUSERR:  ,X'00'      ..BUS ERROR COUNTER
0062 MAXERR:  ,X'03'      ..MAX BUS ERRORS ALLOWED
0063 TMOUT1:  ,X'00'      ..TMOUT SUBROUTINE INNER LOOP CNTR
0064 TMOUT2:  ,X'00'      ..TMOUT SUBROUTINE OUTER LOOP CNTR
0065 TMOUT3:  ,X'30'      ..FIRST BUS HANDSHAKE TIMEOUT
0066 TMOUT4:  ,X'3510'    ..BUS TRANSFER OK TIMEOUT
0067 TMOUT5:  ,X'20'      ..MASTER READY TIMEOUT
0068 DBSPTR:  ,X'1400'    ..DATA BASE POINTER
0069 DBSSTR:  ,X'1400'    ..START OF DATA BASE FILE
0070 DBSEND:  ,X'1400'    ..END OF CURRENT DATA BASE
0071 RTCSEC:  ,X'00'      ..REAL TIME CLOCK SECONDS CNTR
0072 RTCMIN:  ,X'00'      ..REAL TIME CLOCK MINUTES CNTR
0073 RTCHRS:  ,X'00'      ..REAL TIME CLOCK HOURS CNTR
0074 RTCDAY:  ,X'00'      ..REAL TIME CLOCK DAYS CNTR
0075 DNLDA1:  ,X'02'      ..ERROR RETRY MAXIMUM
0076 DNLDA2:  ,X'02'      ..ERROR PASS MAXIMUM
0077 DNLDA3:  ,X'02'      ..ALLOWABLE P.D. FOR SHAVING
0078 DNLDA4:  ,X'02'      ..BUSY PASSES MAXIMUM
0079 DNLDA5:  ,X'02'      ..ALARM PASSES MAXIMUM
0080 DNLDB1:  ,X'02'      ..MASS LOAD SHED PASSES MAX
0081 DNLDB2:  ,X'02'      ..P.D. SHAVE CONTROL POINTS
0082 DNLDB3:  ,X'00'      ..SPARE
0083 DNLDB4:  ,X'00'      ..SPARE
0084 DNLDB5:  ,X'00'      ..SPARE
0085 DNLDC1:  ,X'00'      ..CHANNEL NUMBER
0086 DNLDC2:  ,X'00'      ..CUSTOMER I.D. NUMBER
0087 DNLDC3:  ,X'13'      ..TXD, BDR
0088 DNLDC4:  ,X'A5'      ..FUNCTION WORD
0089 DNLDC5:  ,X'1F'      ..RELAY DOWNLOAD WORD
0090 BAUDRT:  ,X'00'      ..TEMPORY BAUDRATE DUMP
0091 RXERRW:  ,X'00'      ..RECEIVE ERROR WORD
0092 ERWRD1:  ,X'80'      ..ERROR WORD 1
0093 RETRY:   ,X'00'      ..ERROR RETRY COUNTER
0094 SRERR:   ,X'0003'    ..S/R ERROR COUNT AND MAX
```

```
0095 NCOUNT:  ,X'00'      ..PASSES THRU DATA BASE
0096 CSWWRD:  ,X'00'      ..COMMUNICATIONS STATUS WORD
0097 SUBMSK:  ,X'E5'      ..SUBSCRIBERS MASK
0098 NSCAN:   ,X'0001'    ..# OF SCANS BEFORE S/R EXECUTED
0099 SRCNT:   ,X'00'      ..# OF S/R TO PROCESS
0100 SRMAX:   ,X'0E'      ..MAX # OF S/R ALLOWED ON FILE
0101 SRTRY:   ,X'00'      ..COUNT OF S/R RETRIES
0102 WRDCNT:  ,X'0000'    ..# OF RX WORDS EXPECTED
0103 RLMASK:  ,X'01'      ..RELAY MASK BYTE
0104 BPDUMP:  ,X'0000'    ..BASE PAGE DUMP VARIABLES
0105 BYTE0:   ,X'00'      ..BYTE COUNTER FOR UP-OUT-FILE
0106 TM1:     ,X'01'      ..TMOUT FOR INDIVIDUAL RX WORDS
0107 TM2:     ,X'04'      ..MODEM WARMUP TMOUT
0108 TM3:     ,X'10'      ..TX UART INT TMOUT
0109 TM4:     ,X'04'      ..LAST WORD OUT TMOUT
0110 TM5:     ,X'06'      ..CARRIER DETECT TMOUT
0111 TM6:     ,X'16'      ..RX UART INT TMOUT
0112                      ..ABOVE TM(N) ARE TMOUTS MULTIPLES OF 30MS
0113 TM7:     ,X'25'      ..BUSY DETECT TIMEOUT
0114
0115 ..POINTER EQUATES..
0116
0117          UROUPT=DNOUPT
0118          URINPT=DNINPT
0119          UROOLD=DNOOLD
0120          URIOLD=DNIOLD
0121          BSOOLD=UPOOLD
0122          BSIOLD=UPIOLD
0123          BSINPT=UPINPT
0124          BSOUPT=UPOUPT
0125          BSOUEN=UPOUEN
0126          BSOUST=UPOUST
0127          BSINEN=UPINEN
0128          BSINST=UPINST
0129
0130 ..........................................
0131 ..........................................
0132 ..PARAMETERS AND DEFINITIONS FOR SLAVE SCANNER..
0133 ..........................................
0134 ..........................................
0135
0136 ..  DATA BASE FORMAT (FOR EACH CUSTOMER)
0137
0138 ..  1  CHANNEL NUMBER
0139 ..  2  TRANSPONDER I.D.
0140 ..  3  CUSTOMER I.D.
0141 ..  4  TXDELAY & BAUDRATE
0142 ..  5  SUBSRIBERS FUNCTION WORD
0143 ..  6  EXPECTED RELAY STATUS
0144 ..  7  ERROR PASS COUNTER
0145 ..  8  BUSY PASS COUNTER
0146 ..  9  ALARM PASS COUNTER
0147 .. 10  SPARE
0148
0149 .. SUBSRIBER'S FUNCTION WORD ..
0150
```

```
0151 .. BIT
0152 ..  0 - LOAD SHED SERVICE - SUBSCRIPTION
0153 ..  1 - LOAD SHED WORK BIT
0154 ..  2 - ALARM SERVICE - SUBSCRIPTION
0155 ..  3 - DISABLE ERROR REPORTING
0156 ..  4 - BUSY OVERRIDE FLAG
0157 ..  5 - SCAN CUSTOMER - TELCO DIAGNOSTICS
0158 ..  6 - AUTO LOAD SHAVING - SUBSCRIPTION
0159 ..  7 - INTRUSION ALARM SERVICE - SUBSCRIPTION
0160
0161
0162 .. POSSIBLE ERROR DATA FOR SLAVE SCANNER ..
0163
0164 .. ERROR TYPE          WORD1  WORD2   WORD3
0165 ..............................................
0166 ..TRNSP FRAMING ERR    0_      00      00
0167 ..TRNSP PARITY ERR     1_      00      00
0168 ..TRNSP LINE CROSS     2_     TX CID  RX CID
0169 ..TRNSP SECURITY ERR   3_      TID    TXD,BDR
0170 ..TRNSP POWER LOST     4_      00      00
0171 ..TRNSP BAD RELAY      5_    EXP.STAT. RX STAT.
0172 ..TRNSP NO RESPONSE    6_      00      00
0173 .. NO RESP. S/R BUSY   6_      00      FF
0174 ..TRNSP ALARM DATA     7_    STAT.WORD 00
0175 ..SCP WATCH DOG ERR    8_    LINK(HI) LINK(LO)
0176 .. INITIAL POWER-UP    8_      00      00
0177 .. INITIALIZE CMND.    8_      XX      XX
0178 ..                     9_
0179 ..                     A_
0180 ..SCP SELF TEST        B_    RAM TEST ROM TEST
0181 .. SELF TEST CMND.     B-      00     ROM TEST
0182 ..CODE ERROR           C_    3LSB CW  1st D.BYTE
0183 ..OUTSTANDING SHEDS    D_    # UNSHED  00
0184 ..                     E_
0185 ..UART ERROR           F_      MASK    00
0186 .. TRNSP CONT TX       F_      00      01
0187 .. NO TX INTERUPT      F_      00      02
0188 .. NO RX INTERUPT      F_      00      03
0189
0190
0191 ..FOR THE SCANNER IN THE SCAN MODE
0192 ..THE TRANSPONDER REPLIES WITH 9 WORDS
0193
0194 ..WORD 1                       FF   ALERT CODE
0195 ..WORD 2                       XX   TRNSP I.D. (00-1F)
0196 ..WORD 3                       XX   CUSTOMER I.D. (00-FF)
0197 ..WORD 4     TX DELAY 0-F      YY   BAUD RATE 0-3
0198 ..WORD 5     ALARM INPUTS      ZZ   STATUS INPUTS
0199 ..WORD 6     TIME CLK 0-5      UU   TIME CLK 0-9
0200 ..WORD 7                       WW   CURRENT VALUE P.D.ACC
0201 ..WORD 8                       XX   BLOCK PARITY
0202 ..WORD 9                       EE   ETX CODE
0203
0204
0205 ..DATA FORMAT FROM THE SCANNER TO THE
0206 ..TRANSPONDER CONSISTS OF 5 BYTES
```

```
0207
0208 ..WORD 1         ALERT CODE (FF)
0209 ..WORD 2         TID CODE (0-1F)
0210 ..WORD 3         INSTRUCTION CODE (21 or 52)
0211 ..WORD 4         DATA WORD (TXD,BDR)
0212 ..WORD 5         BLOCK PARITY
0213
0214 ..INPUT FLAGS TO 1802 MICROPROCESSOR..
0215
0216 ..EF1- MODE FLAG FOR SLAVE (HI IS INPUT)
0217 ..EF2- BUSY ON LOW
0218 ..EF3- HANDSHAKE ACTIVE ON LOW
0219 ..EF4- 1 HERTZ SIGNAL FOR RTC/WATCHDOG
0220
0221 ..FLAGWORD DEFINITIONS..
0222
0223 ..BIT..STATE..ASSIGNMENT..................
0224 .. 0      0  DO NOT RESET TMOUT
0225 ....      1  RESET TMOUT
0226 .. 1      0  RESPONSE FROM SCAN
0227 ....      1  RESPONSE FROM S/R
0228 .. 2      0  LOAD SHED - NOT IN PROGRESS
0229 ....      1            -     IN PROGRESS
0230 .. 3      0  RX WORD COUNT KNOWN
0231 ....      1  PEAK DEMAND RESPONSE/COUNT UNKOWN
0232
0233 .. 4      0
0234 ....      1
0235 .. 5      0  SCAN OR S/R RESPONSE
0236 ....      1  SPECIAL FUNCTION RESPONSE
0237 .. 6      0  UP-OUT-FILE HAS ROOM FOR MESS.
0238 ....      1  UP-OUT-FILE IS FULL
0239 .. 7      0  NORMAL SCAN; EXECUTE 21 INST.
0240 ....      1  ALARM DETECTED; EXECUTE 52 INST.
0241
0242 .. 8      0  TMOUT NOT INITIALIZED / COMPLETE
0243 ....      1  TMOUT INITIALIZED / NOT COMPLETE
0244 .. 9      0
0245 ....      1
0246 ..10      0  RESPONSE - FROM SCAN
0247 ....      1           - FROM LOAD SHED
0248 ..11      0  NO TRNSP. S/R AVAILABLE
0249 ....      1  TRNSP. S/R ON FILE READY FOR PROCESS
0250
0251 ..12      0  RTC - DO NOT UPDATE
0252 ....      1      - UPDATE
0253 ..13      0  SCAN - NOT ENABLED
0254 ....      1       - ENABLED
0255 ..14      0  COMMAND EXPECTS - RESPONSE
0256 ....      1                  - NO RESPONSE
0257 ..15      0  ADVANCE TO NEXT CUSTOMER
0258 ....      1  RETRY SAME CUSTOMER
0259
0260
0261
0262
```

```
0263 ..........................................
0264 ..........................................
0265 .....INITIAL POWER-UP AND WATCH DOG RESTART......
0266 .....MICROPROCESSOR EXECUTION STARTS AT 0000.....
0267 ..........................................
0268 ..........................................
0269
0270
0271
0272 ..........................................
0273 ..*NOTE WITHIN INITIALIZATION (ONLY)         ..
0274 ..   DNOUPT(HI) <-> CONTENTS OF M(MEMEND)    ..
0275 ..   DNOUPT(LO) <-> SAVED MESSAGE INDEX #    ..
0276 ..   DNINPT(HI) <-> RESULTS OF RAM TEST      ..
0277 ..   DNINPT(LO) <-> RESULTS OF ROM TEST      ..
0278 ..........................................
0279
0280            ORG #0000
0281
0282            DIS                ..DISABLE INTERUPTS
0283            ,#00               ..X->0, P->0
0284
0285            GHI TMP5           ..LOAD UP THE #00
0286            PLO DNOUPT         ..PUT INTO DNOUPT(LO)
0287
0288 INIT:      SEQ                ..INITIALIZE Q=1
0289
0290            OUT 5              ..INITIALIZE BUS SO THAT
0291            ,#C0               .. THE MASTER WILL NOT HANG
0292
0293
0294 ..INITIALIZE REGISTERS..
0295
0296            LDI A.0(CALLIN?

0297            PLO CALL
0298            LDI A.1(CALLIN? ..INITIALIZE CALL

0299            PHI CALL
0300
0301            LDI A.0(RETIN?

0302            PLO RETURN
0303            LDI A.1(RETIN?  ..INITIALIZE RETURN

0304            PHI RETURN
0305
0306
0307            LDI A.0(BEGIN)
0308            PLO PROCTR
0309            LDI A.1(BEGIN)  ..INITIALIZE PROGRAM
0310            PHI PROCTR      .. COUNTER
0311
0312
0313 ......................................
0314 ..DESTRUCTIVE RAM MEMORY TEST......
```

```
0315   ..........................
0316
0317   ..ALGORITHM
0318   .. 1) WRITE FF's FROM MEMEND -> 00FF
0319   .. 2) RELOCATE POINTERS TO MEMSTART
0320   .. 3) ADDRESSING ONE BYTE AT A TIME
0321   ..      - CHECK THAT THE BYTE IS STILL FF
0322   ..      - SHIFT ONE BIT THROUGH THE BYTE
0323   ..      - WRITE 00 TO THAT BYTE
0324   .. 4) ADVANCE POINTER TO ADDRESS THE NEXT BYTE
0325   .. 5) REPEAT #3 UNTIL AN ERROR IS FOUND
0326   ..      IF NO ERROR IS FOUND IN RAM THEN THE
0327   ..      ERROR MESSAGE WILL CONTAIN THE ADDRESS
0328   ..      WHERE NO RAM EXISTS (IE LOC. 2000)
0329
0330            LDI  A.0(MEMEND)  ..FETCH MEMORY END ADDRESS
0331            PLO  BASE
0332            LDI  A.1(MEMEND)
0333            PHI  BASE
0334            LDA  BASE         ..FETCH MEMORY END
0335            PHI  TMP1
0336            PHI  TMP4
0337            LDA  BASE
0338            PLO  TMP1
0339            LDN  TMP1
0340            PHI  DNOUPT       ..SAVE M(M(MEMEND)) IN REG
0341            SEX  TMP1
0342
0343   ..WRITE FF'S IN MEMORY FROM END DOWN TO 00FF..
0344
0345   TSTME1: LDI  #FF
0346            STXD              ..WRITE ALL FF's
0347            GHI  TMP1
0348            BNZ  TSTME1       ..BR IF NOT DONE
0349            LDA  BASE
0350            PHI  TMP1         ..FETCH MEMORY END
0351            LDN  BASE
0352            PLO  TMP1
0353
0354   ..CHECK FOR FF; WALK THE ONES; AND WRITE 00 LOOP..
0355
0356   TSTME2: LDN  TMP1          ..CHECK THAT THE BYTE
0357            XRI  #FF          .. IS STILL FF
0358            BNZ  TSTME4       ..BRANCH IF NOT ALL ZEROES
0359            LDI  #01          ..INITIALIZE THE WALK
0360   TSTME3: PLO  TMP2          .. BYTE TO 00000001
0361            STR  TMP1         ..WRITE BYTE
0362            GLO  TMP2
0363            XOR               ..READ AND TEST BYTE
0364            BNZ  TSTME4       ..BR IF THEY DON'T COMPARE
0365            GLO  TMP2
0366            SHL               ..SHIFT WALKING BIT
0367            BNF  TSTME3       ..BR; 8 SHIFTS NOT DONE
0368            LDI  #00
0369            PLO  TMP2
0370            STR  TMP1         ..STORE ALL 0's IN BYTE
```

```
0371            LDA TMP1
0372            XRI #00
0373            BZ TSTME2           ..BR TO CONTINUE TEST
0374 TSTME4:    GHI TMP1            ..RESULTS FOR RAM TEST
0375            PHI DNINPT          ..ARE SET ASIDE IN REG
0376
0377
0378
0379 ..INITIALIZE REGISTERS..
0380
0381            LDI A.0(VARTAB)     ..FETCH START OF
0382            PLO TMP1            .. VARIABLE TABLE
0383            GHI BASE
0384            PHI TMP1
0385            LDA TMP1            ..FETCH AND STORE STACK PNTR
0386            PHI STKPTR
0387            LDA TMP1
0388            PLO STKPTR
0389            LDA TMP1            ..FETCH AND STORE INITIAL
0390            PHI FLGWRD          .. FLAG WORD DATA
0391            LDA TMP1
0392            PLO FLGWRD
0393
0394 ..INITIALIZE OUTPUT PORTS..
0395
0396            OUT 5               ..INITIALIZE CNTOP1
0397            OUT 6               ..INITIALIZE CNTOP2
0398            OUT 7               ..INITIALIZE CNTOP3
0399            OUT 4               ..INITIALIZE CHANNEL #
0400
0401 ..LOAD REMAINDER OF VARIABLE TABLE..
0402
0403            DEC TMP1            ..MOVE TO START
0404            DEC TMP1            ..OF CONTROL
0405            DEC TMP1            ..WORDS
0406            DEC TMP1
0407            GHI BASE            ..SET POINTER IN
0408            PHI TMP2            .. TMP2 AT END ADDRESS
0409            GHI TMP4
0410            PHI BASE            ..INITIALIZE BASE(HI)
0411            GLO TMP1
0412            PLO BASE
0413 INIT1:     LDA TMP1            ..TRANSFER ALL OF
0414            STR BASE            ..CONFIG. TABLE TO RAM VAR
0415            INC BASE            .. TABLE
0416            GLO TMP1
0417            XRI #FF             ..TEST FOR END OF TABLE
0418            BNZ INIT1           ..BRANCH IF LSB'S NOT EQUAL
0419
0420
0421 ..ROM PARITY MEMORY TEST..
0422
0423            SEP CALL
0424 BEGIN:     ,A(ROMTST)          ..EXECUTE ROM TEST
0425            GLO TMP2            ..FETCH CALCULATED PARITY
0426            PLO DNINPT          ..SET ASIDE
```

```
0427
0428
0429
0430    ..SET UP MESSAGE INDEX # FOR ERRORS/ALARMS..
0431
0432            LDI A.0(INDEX)      ..FETCH LO ADDR OF INDEX
0433            PLO BASE
0434            GLO DNOUPT
0435            STR BASE            ..STORE TO M(INDEX)
0436
0437
0438    ..FORMAT A WATCH DOG RESTART MESSAGE..
0439
0440            GHI DNOUPT          ..FETCH SAVED M(MEMEND) BYTE
0441            BNZ WDOG1           ..BR IF M(MEMEND) NOT 0
0442            GHI LINK
0443            PHI TMP2            ..HI LINK -> WORD 2
0444            GLO LINK
0445            PLO TMP2            ..LO LINK -> WORD3
0446            BR WDOG2
0447 WDOG1:     LDI #00
0448            PHI TMP2            ..00 -> WORD 2
0449            PLO TMP2            ..00 -> WORD 3
0450 WDOG2:     SEP CALL
0451            ,A(FRMES)           ..FORMAT WATCH DOG
0452            ,#F0                .. RESTART MESSAGE
0453
0454
0455    ..FORMAT MEMORY SELF TEST MESSAGE..
0456
0457            LDI A.0(ERWRD1)
0458            PLO BASE
0459            LDI #B0
0460            STR BASE            ..B0 -> WORD 1
0461            GHI DNINPT          ..RESULTS OF RAM TEST
0462            PHI TMP2            ..    -> WORD 2
0463            GLO DNINPT          ..RESULTS OF ROM TEST
0464            PLO TMP2            ..    -> WORD 3
0465            SEP CALL
0466            ,A(FRMES)           ..CALL FORMAT MESSAGE
0467            ,#F0
0468
0469
0470
0471    ...................................
0472    ..........MAIN ROUTINE.............
0473    ...................................
0474
0475
0476    ..MAIN FLOW..
0477
0478 MAIN:      GLO FLGWRD
0479            ANI #DD             ..RESET S/R & S/F RESPONSE
0480            PLO FLGWRD
0481            SEP CALL            ..CHECK BUS ACCESS;
0482            ,A(MAINBS)          .. UPDATE REAL TIME CLK
```

```
0483            LDI A.0(SRCNT)    ..FETCH S/R COUNT
0484            PLO BASE          ..TEST IF ANY S/R
0485            LDN BASE          .. AVAIL. FOR PROCESS
0486            BZ MAIN2          ..BR; NO S/R
0487            GLO FLGWRD
0488            ANI #04           ..THIS WILL PREVENT ANY
0489            BNZ MAIN2         .. PROCINS DURING LOAD SHED
0490            SEP CALL
0491            ,A(PROCIN)        ..PROCESS BUS INPUT MESS.
0492
0493 MAIN2:     GHI FLGWRD
0494            ANI #20           ..TEST FOR SCAN ENABLED
0495            LBNZ MAIN10       ..BR; ENABLED
0496            GHI FLGWRD        ..TEST FOR TRNSP.
0497            ANI #08           .. S/R AVAILABLE
0498            BZ MAIN           ..BR; NO TRNSP. S/R
0499
0500 ..EXCUTE TRANSPONDER SPECIAL REQUEST..
0501
0502 MAIN2A:    GLO FLGWRD
0503            ANI #40           ..CHECK IF S/R POSSIBLE
0504            BNZ MAIN          ..BR; UP-OUT-FILE IS FULL
0505 MAIN2D:    SEP CALL
0506            ,A(IOSR)          ..FORMAT S/R FOR TRNSP.
0507            GHI TMP1
0508            BZ MAIN3          ..BR; NO PROBLEMS
0509            LDI A.0(ERWRD1)
0510            PLO BASE
0511            GHI TMP1
0512            XRI #0F
0513            BNZ MAIN2B        ..BR; FORMAT ILL INST.
0514            LDI #60           ..FORMAT CUST. BUSY
0515            STR BASE          ..60 -> WORD 1
0516            LDI #00
0517            PHI TMP2          ..00 -> WORD 2
0518            LDI #FF
0519            PLO TMP2          ..FF -> WORD 3
0520            BR MAIN2C         ..BR TO FORMAT MESSAGE
0521
0522 MAIN2B:    LDI #C0           ..FORMAT CODE ERROR
0523            STR BASE          ..C0 -> WORD 1
0524            LDI A.0(PROOLD)
0525            PLO BASE
0526            LDA BASE
0527            PHI TMP4
0528            LDN BASE
0529            PLO TMP4
0530            INC TMP4
0531            INC TMP4
0532            LDN TMP4
0533            ANI #07
0534            PHI TMP2          ..STORE CONTROL WORD
0535            GLO TMP4
0536            ADI #06           ..OFFSET FOR DATA
0537            PLO TMP4
0538            GHI TMP4
```

```
0539            ADCI #00            ..DOUBLE PREC. ADD
0540            PHI TMP4
0541            LDN TMP4
0542            PLO TMP2            ..STORE 1st DATA BYTE
0543
0544 MAIN2C:    SEP CALL
0545            ,A(FRMES)           ..FORMAT MESS
0546            ,#FF                ..CLEAR OUT LAST S/R
0547            LBR MAIN            ..BR FOR NEXT CMND.
0548
0549 MAIN3:     GLO FLGWRD
0550            ANI #08             ..TEST FOR P.D. S/R
0551            LBZ MAIN3A          ..BR; NOT P.D. S/R
0552            LDI A.0(BYTE0)      ..FETCH BYTE COUNT
0553            PLO BASE
0554            LDN BASE
0555            LBNZ MAIN           ..NOT ABLE TO EXECUTE YET
0556            LDI A.0(UPOUST)
0557            PLO BASE
0558            LDA BASE
0559            PHI TMP2
0560            LDN BASE
0561            PLO TMP2
0562            SEX BASE
0563            LDI A.0(FRMOLD+#01)
0564            PLO BASE
0565            GLO TMP2            ..RESET FRMOLD PNTR
0566            STXD
0567            GHI TMP2
0568            STR BASE
0569            LDI A.0(UPOOLD+#01)
0570            PLO BASE
0571            GLO TMP2            ..RESET UP-OUT-OLD PNTR
0572            STXD
0573            GHI TMP2
0574            STR BASE
0575
0576 MAIN3A:    SEP CALL
0577            ,A(CONSTX)          ..CHECK IF OK TO TX
0578            GLO TMP2
0579            BZ MAIN4                    ..BR; OK TO TX
0580            SEP CALL
0581            ,A(FRMES)           ..FORMAT ERROR MESS
0582            ,#FF                ..CLEAR OUT LAST S/R
0583            LBR MAIN            ..BR FOR NEXT CMND.
0584
0585 MAIN4:     SEP CALL
0586            ,A(IOTX)            ..TRANSMIT TO TRNSP.
0587            GLO TMP2            ..TEST FOR TX OK
0588            BZ MAIN5            ..BR IF OK
0589            SEP CALL
0590            ,A(FRMES)           ..FORMAT ERROR MESS
0591            ,#FF                ..CLEAR LAST S/R
0592            LBR MAIN            ..BR FOR NEXT CMND.
0593
0594 MAIN5:     GHI FLGWRD
```

```
0595            ANI #40          ..TEST FOR NO RESP. CMND.
0596            BZ MAIN6         ..BR IF RESP. EXPECTED
0597            GHI FLGWRD
0598            ANI #BF          ..CLEAR NO RESP. EXP. FLG
0599            PHI FLGWRD
0600            SEP CALL
0601            ,A(FRMES)        ..FORMAT ACKNOWLEDGE
0602            ,#0F             ..CLEAR S/R FLAG
0603            LBR MAIN         ..BR FOR NEXT CMND.
0604
0605 MAIN6:     SEP CALL
0606            ,A(IORX)         ..RECEIVE FROM TRNSP.
0607            GLO TMP2
0608            LBNZ MAIN8       ..BR IF RX ERRORS
0609            GLO FLGWRD
0610            ANI #20          ..TEST FOR S/F RESP.
0611            BZ MAIN7A        ..BR IF NOT S/F RESP.
0612            GLO FLGWRD
0613            ANI #DF          ..RESET S/F FLAG
0614            PLO FLGWRD
0615            LDI A.0(BPDUMP)  ..FETCH BASE PAGE DUMP
0616            PLO BASE
0617            LDA BASE         ..RESTORE DNINPT TO
0618            PHI DNINPT       .. PEAK DEMAND RESP. QUE
0619            LDN BASE
0620            PLO DNINPT
0621 MAIN6A:    SEP CALL
0622            ,A(PROSR)        ..PROCESS S/R RESP.
0623
0624 MAIN7:     LDI A.0(SRTRY)
0625            PLO BASE
0626            LDN BASE
0627            LDI #00          ..RESET S/R RETRIES
0628            STR BASE
0629            LBR MAIN         ..BR FOR NEXT CMND.
0630
0631 MAIN7A:    GLO FLGWRD
0632            ANI #08          ..TEST FOR P.D. RESPONSE
0633            BZ MAIN6A        ..BR IF NOT P.D. RESPONSE
0634            GLO FLGWRD
0635            ORI #20          ..SET S/F RESP. FLAG
0636            PLO FLGWRD
0637            LDI A.0(BPDUMP)  ..FETCH BASE PAGE DUMP
0638            PLO BASE
0639            DEC DNINPT       ..ADDR END OF MESSAGE
0640            GHI DNINPT       ..SAVE DNINPT FOR P.D.
0641            STR BASE         .. MESSAGE, WHICH WILL
0642            INC BASE         .. BE PROCESSED AFTER
0643            GLO DNINPT       .. A P.D. RESET HAS BEEN
0644            STR BASE         .. EXECUTED
0645            GLO FLGWRD
0646            ANI #F7          ..RESET P.D. FLAG
0647            PLO FLGWRD
0648            LBR MAIN2D       ..BR TO FORMAT S/F
0649                             .. RESET PEAK DEMAND
0650
```

```
1651 MAIN8:  GLO FLGWRD
1652         ANI #F7         ..RESET P.D. FLAG
1653         PLO FLGWRD
1654         LDI A.0(DNLDA1) ..FETCH RETRY MAX.
1655         PLO BASE
1656         LDN BASE
1657         PLO TMP2        ..SET ASIDE
1658         LDI A.0(SRTRY)  ..FETCH RETRY COUNT
1659         PLO BASE
1660         SEX BASE
1661         GLO TMP2
1662         XOR             ..COMPARE MAX WITH CNT
1663         BZ MAIN9        ..BR; RETRIES DONE
1664         LDN BASE
1665         ADI #01         ..INC RETRY COUNT
1666         STR BASE
1667         GHI FLGWRD
1668         ORI #80         ..SET RETRY FLAG
1669         PHI FLGWRD
1670         LBR MAIN2A      ..BR TO RETRY S/R
1671
1672 MAIN9:  SEP CALL
1673         ,A(RXERR)       ..PROCESS RECEIVE ERRORS
1674         SEP CALL
1675         ,A(FRMES)       ..FORMAT ERROR MESS.
1676         ,#FF            ..CLEAR LAST S/R
1677         BR MAIN7        ..RESET RETRIES, BR MAIN
1678
1679 ..SCAN ENABLED..
1680
1681 MAIN10: GHI FLGWRD      ..TEST FOR TRNSP.
1682         ANI #08         .. S/R AVAILABLE
1683         BZ MAIN13       ..BR; NO TRNSP. S/R
1684
1685 MAIN11: LDI A.0(NSCAN)
1686         PLO BASE
1687         LDN BASE
1688         BZ MAIN12       ..BR IF NSCAN = 0
1689         SMI #01
1690         STR BASE
1691         BR MAIN13       ..BR, N SCANS NOT DONE
1692 MAIN12: INC BASE        ..N SCANS DONE
1693         LDN BASE        ..FETCH N SCAN CONSTANT
1694         DEC BASE
1695         STR BASE        ..RESET N SCAN COUNT
1696         LBR MAIN2A      ..EXECUTE S/R
1697
1698 ..SCAN TRANSPONDER..
1699
1700 MAIN13: SEP CALL
1701         ,A(IOSCAN)      ..FORMAT SCAN FOR TRNSP.
1702         LDI A.0(CHANEL) ..FETCH ADDR(LO)
1703         STR FREE        ..SET ASIDE
1704         SEX FREE
1705         GLO BASE        ..COMPARE BASE LO
1706         XOR             .. TO DETERMINE BUSY
```

```
0707            BNZ MAIN14       ..BR; CUSTOMER NOT BUSY
0708            GHI FLGWRD
0709            ANI #7F          ..RESET RETRY FLAG
0710            PHI FLGWRD
0711            LBR MAIN         ..RETURN TO MAIN
0712
0713 MAIN14:    SEP CALL
0714            ,A(CONSTX)
0715            GLO TMP2
0716            BZ MAIN15        ..BR; OK TO TX
0717            SEP CALL
0718            ,A(FRMES)        ..FORMAT ERROR MESS.
0719            ,#F0             ..NO SMCT NUMBERS
0720            BR MAIN13        ..ADVANCE TO NEXT CUS.
0721
0722 MAIN15:    SEP CALL
0723            ,A(IOTX)         ..TRANSMIT TO TRNSP.
0724            GLO TMP2         ..TEST FOR TX OK
0725            BZ MAIN16        ..BR IF OK
0726            SEP CALL
0727            ,A(FRMES)        ..FORMAT ERROR MESS
0728            ,#F0
0729            LBR MAIN         ..BR MAIN
0730
0731 MAIN16:    SEP CALL
0732            ,A(IORX)         ..RECEIVE FROM TRNSP.
0733            GLO TMP2
0734            LBNZ MAIN18      ..BR IF RX ERRORS
0735            SEP CALL
0736            ,A(IOSEC)        ..DO SECURITY CHECK
0737            GLO TMP4
0738            BNZ MAIN19       ..BR IF SECURITY ERRORS
0739            SEP CALL
0740            ,A(PROSCN)
0741
0742 MAIN17:    GHI FLGWRD
0743            ANI #80          ..TEST FOR RETRY
0744            LBNZ MAIN13      ..BR IF RETRY
0745            LBR MAIN         ..BR FOR NEXT CNMD.
0746
0747 MAIN18:    SEP CALL
0748            ,A(RXERR)        ..PROCESS RECEIVE ERRORS
0749
0750 MAIN19:    SEP CALL
0751            ,A(IOERPR)       ..PROCESS ERRORS
0752            LBR MAIN17       ..BR TO TEST RETRY
0753
0754
0755
0756
0757
0758 ......................................
0759 ..MAINBS SUBROUTINE.................
0760 ......................................
0761
0762 ..ACCESS BUS AND UPDATE CLOCK SUBROUTINE..
```

```
0763
0764 ..TEST AND UPDATE REAL TIME CLOCK..
0765
0766 MAINBS: GHI FLGWRD
0767         BN4 MAINB1      ..BR ON CLK LO
0768         ANI #10         ..MASK RTC FLG
0769         BZ MAINB2
0770         SEP CALL
0771         ,A(RTCUPD)
0772         BR MAINB2
0773 MAINB1: ORI #10         ..SET RTC FLG HI
0774         PHI FLGWRD
0775
0776 ..TEST FOR SCP HAVING BUS ACCESS..
0777
0778 MAINB2: SEX FREE
0779         INP 4           ..INPUT SELECT LINE
0780         SHL
0781         BNF MAINBY      ..BR IF NO MASTER
0782         LDI A.0(CNTOP1) ..FETCH CONTROL WORD
0783         PLO BASE
0784         LDN BASE
0785         B1  MAINB6      ..BR IF IN BUS I/P MODE
0786         BR  MAINB5      ..BR FOR BUS OUT
0787
0788 ..BUS INPUT MODE..
0789
0790 MAINB6: ANI #20         .. 1101 1111
0791         BNZ MAINBY      ..BRANCH IF SR FILE FULL
0792         LDI A.0(TMOUT5)
0793         PLO BASE
0794         LDN BASE
0795         PLO TMP1        ..INITIALIZE TIMEOUT
0796 MAINB3: DEC TMP1
0797         GLO TMP1        ..WAIT FOR NOT BUSY
0798         B2  MAINB4      ..MASTER READY ??
0799         BNZ MAINB3      ..NO WAIT
0800 MAINBY: SEP RETURN      ..TIMED OUT
0801 MAINB4: SEP CALL
0802         ,A(BSIN)
0803         GHI TMP2
0804         BNZ MAINBY      ..BR IF BAD DATA
0805         LDI A.0(SRCNT)  ..FETCH S/R COUNT
0806         PLO BASE
0807         LDN BASE
0808         ADI #01         ..INC S/R COUNTER
0809         STR BASE
0810         INC BASE        ..ADDRESS SRMAX
0811         SEX BASE
0812         SM              ..SRCNT-SRMAX
0813         BNF MAINBX      ..BR; SR FILE NOT FULL
0814         LDI A.0(CNTOP1) ..FETCH CONTROL O/P 1
0815         PLO BASE
0816         LDN BASE
0817         ORI #20         ..SET S/R FILE FULL
0818         STR BASE
```

```
0819            OUT 5
0820 MAINBX: SEP RETURN          ..EXIT SUBROUTINE
0821
0822 ..BUS OUTPUT MODE..
0823
0824 MAINB5: SHL                 ..
0825         BDF MAINBX          ..BR IF NO DATA AVAIL
0826         GLO FLGWRD
0827         ANI #08             ..TEST FOR P.D.
0828         BNZ MAINB8          ..BR AROUND TEST IF P.D.
0829         LDI A.0(BYTEO)      ..FETCH BYTE COUNT
0830         PLO BASE            ..
0831         LDN BASE            ..
0832         BZ MAINB7           ..BR; NO DATA AVAIL
0833 MAINB8: SEP CALL            ..
0834         ,A(BSOUT)           ..O/P DATA TO BUS
0835         LDI A.0(BYTEO)      ..FETCH OUTPUT BYTE COUNTER
0836         PLO BASE            ..
0837         LDN BASE            ..CHECK IF ZERO
0838         BNZ MAINBZ          ..BR; STAY IN O/P MODE
0839 MAINB7: LDI A.0(CNTOP1)     ..THE BUFFER IS EMPTY !!
0840         PLO BASE            ..
0841         GLO FLGWRD          ..
0842         ANI #40             ..IF UP-OUT IS FULL
0843         BNZ MAINBZ          .. BR; STAY IN BUS-OUT MODE
0844         LDN BASE            ..
0845         ORI #80             ..SET MODE FOR BSIN
0846         SEX BASE            ..
0847         STR BASE            ..
0848         OUT 5               ..
0849 MAINBZ: SEP RETURN          ..EXIT SUBROUTINE
0850
0851
0852
0853 ......................................
0854 ..ROM PARITY CHECK SUBROUTINE.........
0855 ......................................
0856
0857 ROMTST: LDI #0F             ..END OF ROM CHECK
0858         PHI TMP2            .. IS AT ADDR OFFF
0859         LDI #FF             ..
0860         PLO TMP2            ..
0861         LDI #00             ..START OF ROM CHECK
0862         PHI TMP4            .. IS AT ADDR 0000
0863         PLO TMP4            ..
0864         SEP CALL            ..
0865         ,A(PARCHK)          ..CALCULATE PARITY
0866         ,#01                ..RETURN WITH PARITY
0867         SEP RETURN          .. IN TMP2 (LO)
0868
0869
0870
0871 ......................................
0872 ..BUS INPUT SUBROUTINE................
0873 ......................................
0874
```

```
)875 ..SLAVE VERSION..
)876
)877
)878 BSIN:     LDI A.0(BSIOLD)   ..RESET BUS-IN-PNTR
)879          PLO BASE          .. TO THE START
)880          LDA BASE          .. OF MESSAGE SLOT
)881          PHI BSINPT        ..
)882          LDN BASE          ..
)883          PLO BSINPT        ..
)884          SEX BSINPT        ..SET X TO INPUT FILE
)885          LDI #10           ..SET UP MAX WORD COUNT
)886          PLO TMP4          ..MAX = 16 WORDS FOR SLAVE
)887          PHI TMP2          ..INITIALIZE EXIT FLAG
)888          PHI TMP1          ..INITIALIZE BUSY TMOUT
)889
)890 BSIN0:    B2 BSIN5          ..BR; BUSY, READY TO GO
)891          DEC TMP1          ..
)892          GHI TMP1          ..DEC & CHECK BUSY TMOUT
)893          BNZ BSIN0         ..BR; TMOUT NOT DONE
)894          SEP RETURN        ..EXIT; MASTER NOT SET BUSY
)895
)896 BSIN1:    DEC TMP1          ..
)897          GLO TMP1          ..DEC & CHECK TMOUT
)898          B3 BSIN2          ..BR; GOT Q H/S
)899          BNZ BSIN1         ..BR; CONTINUE TMOUT
)900          BR BSIN4A         ..ERROR; TIMED OUT
)901
)902 BSIN2:    INP 3             ..INPUT DATA FROM BUS
)903          REQ               ..H/S BY RESETING Q
)904          IRX               ..POINT TO NEXT I/P LOC.
)905
)906 BSIN3:    BN3 BSIN4         ..BR; GOT Q H/S
)907          DEC TMP1          ..
)908          GLO TMP1          ..DEC & CHECK TMOUT
)909          BNZ BSIN3         ..BR; CONTINUE TMOUT
)910          BR BSIN4A         ..ERROR; TIMED OUT
)911
)912 BSIN4:    BN2 BSIN5A        ..BR; LAST WORD IN
)913          SEQ               ..GOT H/S; SET Q IN RESP.
)914          DEC TMP4          ..
)915          GLO TMP4          ..DEC & CHECK WORD COUNT
)916 BSIN4A:   LBZ BSIERR        ..EXIT; TOO MANY WORDS I/P
)917
)918 BSIN5:    LDI #70           ..RESET INDIVIDUAL WORD
)919          PLO TMP1          .. HANDSHAKE TIME OUT
)920          BR BSIN1          ..BR TO I/P MORE
)921
)922 BSIN5A:   SEQ
)923          SEP CALL          ..CHECK PARITY OF BLOCK
)924          ,A(PARITY)        ..
)925          ,A.0(BSIOLD)      ..
)926          ,#1F              ..
)927          ,#00              ..
)928          LDI A.0(BUSERR)   ..TMP4 ADDRESSES BUSERR
)929          PLO TMP4          ..
)930          GHI BASE          ..
```

```
0931            PHI TMP4                ..
0932
0933            LDI #F0                 ..SET UP GROSS TMOUT
0934            PHI TMP1
0935            GHI TMP2                ..TMP2<>0=PARITY ERROR
0936            LSNZ                    ..SKIP IF D NOT 0; ERROR
0937            REQ                     ..RESET Q IF PARITY O.K.
0938            NOP                     ..1802 HAS LIMITED INSTR.
0939
0940 ..HANDSHAKE TRANSFER VALID; Q LINE DENOTES O.K. ..
0941
0942            LDI A.0(CNTOP1) ..FETCH CONTROL OUTPUT
0943            PLO BASE                ..
0944            LDN BASE                ..CLEAR TRANSFER OK BIT
0945            ANI #BF                 ..SET TRANSFER VALID LO
0946            STR BASE                ..
0947            SEX BASE                ..
0948            OUT 5                   ..OUTPUT TRANSFER VALID
0949
0950 BSIN6:     B3 BSIN7                ..BR; RECEIVED HANDSHAKE
0951            DEC TMP1                ..
0952            GHI TMP1                ..DEC & CHECK GROSS TMOUT
0953            BNZ BSIN6               ..BR; CONTINUE TMOUT
0954                                    ..HARD ERROR FOUND!
0955 BSIN7:     DEC BASE                ..
0956            LDN BASE                ..RESET TRANSFER VALID
0957            ORI #40                 .. TO A "ONE"
0958            STR BASE                ..
0959            OUT 5                   ..OUTPUT TRANSFER VALID
0960
0961            GHI TMP1                ..CHECK IF TIMED OUT
0962            LBZ BSIERR              ..BR; TIMED OUT IN H/S
0963 BSIN7A:    BN3 BSIN7B              ..BR; REC. Q H/S HI
0964            DEC TMP1                ..WAIT FOR Q FROM
0965            GHI TMP1                .. MASTER TO GO HI
0966            BNZ BSIN7A              ..BR; NOT TIMED OUT
0967            LBR BSIERR              ..BR; TIMED OUT IN H/S
0968
0969 BSIN7B:    LBQ BSIERR              ..BR; Q=1= PARITY ERROR
0970            SEQ                     ..PARITY O.K. SET Q
0971
0972 ..TEST FOR END OF FILE..
0973
0974            LDI A.0(BSINEN+#01)
0975            PLO BASE                ..
0976            SEX BASE                ..
0977            GLO BSINPT              ..
0978            SD                      ..
0979            DEC BASE                ..
0980            GHI BSINPT              ..
0981            SDB                     ..
0982            BDF BSIN8               ..BRANCH IF NOT END OF FILE
0983            LDI A.0(BSINST+#01) ..RESET POINTER
0984            PLO TMP1                ..
0985            GHI BASE                ..
0986            PHI TMP1                ..
```

```
0987          LDI A.0(BSIOLD+#01)
0988          PLO BASE          ..RESET OLD POINTER
0989          LDN TMP1          ..
0990          STXD              ..
0991          DEC TMP1          ..
0992          LDN TMP1          ..
0993          STR BASE          ..
0994          BR BSIEXT         ..
0995 BSIN8:   LDI A.0(BSIOLD+#01)
0996          PLO BASE          ..
0997          LDN BASE          ..
0998          ADI #10           ..
0999          STXD              ..
1000          LDN BASE          ..
1001          ADCI #00          ..INC POINTER TO NEXT SR
1002          STR BASE          ..
1003          BR BSIEXT
1004 BSIERR:  SEQ               ..SET Q FOR RESTART
1005          SEX TMP4          ..
1006          LDI #01           ..
1007          PHI TMP2          ..EXIT ERROR
1008          ADD               ..INCREMENT ERROR WORD
1009          STR TMP4          ..AND IF LESS
1010          LDI A.0(MAXERR)   ..THAN MAXIMUM
1011          PLO BASE          ..
1012          LDN BASE          ..
1013          XOR               ..RETRY AGAIN
1014          LBNZ BSIN         ..RETRY INPUT AGAIN
1015 BSIEXT:  LDI #00           ..CLEAR ERROR COUNT
1016          STR TMP4          ..
1017          SEP RETURN        ..EXIT SUBROUTINE
1018
1019
1020
1021 ...........................................
1022 ..BSOUT SUBROUTINE.........................
1023 ...........................................
1024
1025 ..SLAVE VERSION..
1026
1027
1028 BSOUT:   LDI A.0(BSOOLD)
1029          PLO BASE
1030          LDA BASE
1031          PHI BSOUPT        ..RESET POINTER TO START
1032          LDN BASE
1033          PLO BSOUPT
1034          LDA BSOUPT        ..PUT SIZE IN TMP1
1035          PLO TMP1
1036          LDN BSOUPT
1037          PHI TMP1
1038          DEC BSOUPT        ..START WITH 1st WORD
1039
1040          LDI A.0(CNTOP1)   ..FETCH CONTROL OUTPUT
1041          PLO BASE          ..WORD
1042          LDN BASE          ..SET BUSY BIT LOW
```

```
1043            ANI #BF
1044            STR BASE
1045            SEX BASE
1046            OUT 5              ..OUTPUT BUSY BIT
1047            DEC BASE
1048            LDN BASE
1049            ORI #40            ..SET BUSY BIT HI
1050            STR BASE
1051            SEX BSOUPT
1052
1053 BSOUT0:    LDI #80            ..RESET INDIVIDUAL
1054            PLO TMP4           .. WORD TMOUT
1055
1056            OUT 3              ..OUTPUT DATA TO BUS
1057            REQ                ..SET Q=0 FOR H/S
1058            DEC TMP1           ..DEC WORD COUNT
1059            GLO TMP1
1060            BNZ BSOUT1
1061            GHI TMP1           ..CHECK WORD CNT HI
1062            BNZ BSOUT1         ..BR; NOT LAST WORD
1063
1064            SEX BASE
1065            OUT 5              ..OUTPUT BUSY HI
1066
1067 BSOUT1:    B3 BSOUT2          ..BR; GOT RESP. H/S
1068            DEC TMP4
1069            GLO TMP4           ..DEC & CHECK TMOUT
1070            BNZ BSOUT1         ..BR; CONTINUE TMOUT
1071
1072            SEQ                ..SET Q BEFORE EXIT
1073 BSOUTE:    SEX BASE
1074            OUT 5              ..SET BUSY HI
1075            SEP RETURN         ..EXIT; TIMED OUT
1076
1077 BSOUT2:    SEQ                ..SET Q=1
1078 BSOUT3:    BN3 BSOUT4         ..BR; GOT RESP. H/S
1079            DEC TMP4           ..DEC TMOUT
1080            GLO TMP4           ..FETCH TMOUT
1081            BNZ BSOUT3         ..BR; CONTINUE TMOUT
1082            BR BSOUTE          ..EXIT; TIMED OUT
1083
1084 BSOUT4:    GLO TMP1           ..CHECK WORD COUNT LO
1085            BNZ BSOUT0         ..BR; COUNT LO NOT ZERO
1086            GHI TMP1           ..CHECK WORD COUNT HI
1087            BNZ BSOUT0         ..BR; COUNT HI NOT ZERO
1088
1089 ..WORD COUNT EQUALS ZERO; H/S TRANSFER VALID..
1090
1091            LDI #25            ..INITIALIZE HARD ERROR
1092            PHI TMP4           .. TIMEOUT
1093            PLO BASE           .. TIMEOUT
1094
1095 ..HANDSHAKE TRANSFER O.K./NOT O.K. ..
1096
1097 BSOUT5:    B2 BSOUT6          ..BR; TRANSFER VALID =0
1098            DEC TMP4
```

```
099             GHI TMP4            ..DEC & CHECK TMOUT
100             BNZ BSOUT5          ..BR; CONTINUE TMOUT
101             BR  BSOERR          ..BR; HARD ERROR FOUND!
102
103 BSOUT6:     BN3 BSOUT7          ..BR; TRANSFER NOT O.K.
104             LDI #00             ..00 DENOTES TRNS. O.K.
105             LSKP
106 BSOUT7:     LDI #FF             ..FF DENOTES NOT O.K.
107             STR STKPTR
108             REQ                 ..RESET Q IN RESPONSE
109
110 BSOUT8:     BN2 BSOUT9          ..BR; TRANSFER VALID =1
111             DEC TMP4
112             GHI TMP4            ..DEC & CHECK TMOUT
113             BNZ BSOUT8          ..BR; CONTINUE TMOUT
114             BR  BSOERR          ..BR; ERROR FOUND
115 BSOUT9:     LDN STKPTR
116             BNZ BSOERR          ..BR; TRANSFER NOT O.K.
117             SEQ
118
119 ..TEST FOR END OF FILE..
120
121             LDI A.0(BSOOLD)
122             PLO BASE
123             LDA BASE
124             PHI TMP1
125             LDN BASE
126             PLO TMP1
127             GLO FLGWRD
128             ANI #08             ..CHECK FOR P.D.
129             BZ  BSOUTA          ..BR; NO P.D. ON TAP
130             GLO FLGWRD
131             ANI #F7             ..RESET P.D. FLAG
132             PLO FLGWRD
133             BR  BSOUTB          ..RESET POINTERS
134 BSOUTA:     LDI A.0(BYTE0)      ..DECREMENT BYTE COUNT
135             PLO BASE            .. BY THE MESSAGE SIZE
136             LDN TMP1
137             SD                  ..M(R(X))-D -> DF,D.
138             STR BASE
139 BSOUTB:     LDI A.0(BSOUEN+#01)
140             PLO BASE
141             SEX BASE
142             GLO BSOUPT
143             SD
144             DEC BASE
145             GHI BSOUPT
146             SDB
147             BDF BSOUTC
148             LDI A.0(BSOUST)     ..RESET PNTR TO START
149             PLO BASE
150             LDA BASE
151             PHI BSOUPT
152             LDN BASE
153             PLO BSOUPT
154 BSOUTC:     LDI A.0(BSOOLD+#01)         ..ADVANCE OLD PNTR
```

```
1155            PLO BASE
1156            GLO BSOUPT
1157            STXD
1158            GHI BSOUPT
1159            STR BASE
1160            GLO FLGWRD
1161            ANI #BF         ..SET FLAG FOR ROOM AVAIL..
1162            PLO FLGWRD      ..IN THE UP-OUT-FILE
1163            SEP RETURN      ..EXIT SUBROUTINE
1164
1165 ..ERROR RECOVERY..
1166
1167 BSOERR: SEQ                ..SET Q FOR RESTART
1168            SEX TMP1
1169            LDI A.0(BUSERR) ..FETCH ERROR COUNT
1170            PLO TMP1
1171            GHI BASE
1172            PHI TMP1
1173            LDI #01
1174            ADD             ..INCREMENT ERROR COUNT
1175            STR TMP1        ..TEST FOR THIRD TRY.
1176            LDI A.0(MAXERR) ..FETCH MAX ERROR COUNT
1177            PLO BASE
1178            LDN BASE
1179            SM              ..MAX - CNTR -> DF, D
1180            BDF BSOUT       ..RETRY IF < 3 ATTEMPTS
1181            LDI #00         ..RESET BUS ERROR CNTR
1182            STR TMP1
1183            SEP RETURN      ..EXIT SUBROUTINE
1184
1185 ..........................................
1186 ..PROCIN SUBROUTINE........................
1187 ..........................................
1188
1189          ..COMMAND TYPE -> TMP1 LO
1190            ..FIRST DATA WORD -> TMP1 HI
1191
1192 ..PROCESS INPUT COMMANDS..
1193
1194 PROCIN: LDI A.0(PROOLD) ..FETCH MESS ADDR
1195            PLO BASE
1196            LDA BASE
1197            PHI TMP2
1198            LDN BASE
1199            PLO TMP2
1200            INC TMP2
1201            INC TMP2
1202            LDN TMP2        ..FETCH CONTROL WORD
1203            ANI #07         ..MASK CMND TYPE
1204            PLO TMP1        .. AND STORE
1205            GLO TMP2
1206            ADI #06         ..INC POINTER TO
1207            PLO TMP2        .. FIRST DATA WORD
1208            GHI TMP2
1209            ADCI #00        ..DO DOUBLE PRECISION ADD
1210            PHI TMP2
```

```
1211            LDN TMP2
1212            PHI TMP1             ..STORE FIRST DATA WORD
1213
1214 ..TEST FOR COMMAND TYPE..
1215
1216            GLO TMP1
1217            XRI #00
1218            LBZ PRO1             ..BR IF SCAN ONLY CMND
1219            GLO TMP1
1220            XRI #01
1221            BNZ PRO7             ..BR IF NOT TRNSP CMND
1222            GHI FLGWRD           ..TRANS COMMAND BIT3
1223            ORI #08
1224            PHI FLGWRD
1225            SEP RETURN
1226 PRO7:      GLO TMP1
1227            XRI #02
1228            BNZ PRO8             ..BR IF NOT MACRO CNMD
1229            GHI TMP1             ..GET 1ST DATA WORD
1230            ANI #0F
1231            XRI #05              ..BR IF NOT LOAD SHED
1232            LBNZ PRO5
1233            GHI FLGWRD
1234            ANI #20              ..CHECK FOR SCAN ENABLED
1235            LBZ PRO5             ..BR; CODE ERR, NOT ENABLED
1236            GLO FLGWRD
1237            ORI #04              ..SET LOAD SHED IN PROGRESS
1238            PLO FLGWRD
1239            LDI A.0(DNLDB1)
1240            PLO BASE
1241            LDN BASE
1242            PLO TMP3
1243            LDI A.0(NCOUNT)
1244            PLO BASE             ..INITIALIZE #PASSES
1245            GLO TMP3             ..FOR THE LOAD SHED
1246            LBZ PRO5             ..BR; CODE ERR IF B1=0
1247            STR BASE
1248            LDA TMP2             ..FETCH RELAY INSTR. WORD
1249            SHR
1250            SHR
1251            SHR
1252            SHR
1253            STR FREE
1254            SEX FREE
1255            LDN TMP2             ..FETCH RELAY DATA WORD
1256            SHL
1257            SHL
1258            SHL
1259            SHL
1260            OR                   ..RECOMBINE THE BYTE
1261            STR TMP3             ..SET NEW RELAY WORD ASIDE
1262            SEP CALL
1263            ,A(IOSET)            ..SET UP WORK BITS IN
1264            ,#FF                 .. DATA BASE FOR LOAD SHED
1265            SEP RETURN
1266 PRO8:      GLO TMP1
```

```
1267            XRI #03
1268            BZ PRO3             ..BR IF DOWNLOAD CMND
1269            GLO TMP1
1270            XRI #04
1271            BZ PRO4             ..BR IF DIAGNOSTIC CMND
1272            LBR PRO5            ..BR FOR CODE ERROR
1273
1274   ..PROCESS DOWNLOAD COMMANDS..
1275
1276  PRO3:     GHI TMP1            ..TEST FOR LOAD
1277            XRI #03             .. REAL TIME CLOCK
1278            BNZ PRO3A           .. COMMAND
1279            INC TMP2
1280            LDI A.0(RTCSEC)
1281            PLO BASE
1282            LDA TMP2
1283            STR BASE            ..STORE SECONDS
1284            INC BASE
1285            LDA TMP2
1286            STR BASE            ..STORE MINUTES
1287            INC BASE
1288            LDA TMP2
1289            STR BASE            ..STORE HOURS
1290            INC BASE
1291            LDN TMP2
1292            STR BASE            ..STORE DAYS
1293            LBR PRO1            ..BR TO ACK AND EXIT
1294  PRO3A:    GHI TMP1            ..TEST FOR DNLD A
1295            XRI #01             .. PARAMETERS CMND
1296            BNZ PRO3B           ..BR IF NOT DNLD CMND
1297            LDI A.0(DNLDA1)     ..FETCH START OF GROUP A
1298  PRO3A2:   PLO BASE
1299            INC TMP2
1300            LDI #05             ..SET UP COUNTER FOR
1301            PLO TMP1            .. 5 WORDS
1302  PRO3A1:   LDA TMP2
1303            STR BASE
1304            INC BASE
1305            DEC TMP1
1306            GLO TMP1
1307            BNZ PRO3A1          ..BR IF 5 WORDS NOT DONE
1308            LBR PRO1            ..BR TO ACK AND EXIT
1309  PRO3B:    GHI TMP1            ..TEST FOR DNLD B
1310            XRI #02             .. PARAMETERS CMND
1311            BNZ PRO3C           ..BR IF NOT DNLD CMND
1312            LDI A.0(DNLDB1)     ..FETCH START OF GROUP B
1313            BR PRO3A2           ..BR TO TRANSFER 5 WORDS
1314  PRO3C:    GHI TMP1
1315            XRI #00             ..TEST FOR CUS PAR DNLD
1316            LBNZ PRO5           ..BR TO FORMAT CODE ERROR
1317            DEC TMP2            ..ADDR WORD #8
1318            DEC TMP2            .. FOR CUSTOMER NUMBER
1319            SEX TMP2
1320            LDI A.0(DBSSTR)     ..FETCH START OF D.B.
1321            PLO BASE
1322            LDA BASE
```

```
1323            PHI  TMP4
1324            LDN  BASE
1325            PLO  TMP4
1326  PRO3C3:   LDI  A.0(DBSEND)
1327            PLO  BASE
1328            SEX  BASE
1329            GHI  TMP4
1330            SD                    ..END - PNTR
1331            BNZ  PRO3C2
1332            INC  BASE
1333            GLO  TMP4
1334            SD                    ..END - PNTR
1335            BZ   PRO3C4           ..BR IF AT END
1336  PRO3C2:   SEX  TMP2
1337            LDA  TMP4             ..FETCH CHANNEL # OF D.B.
1338            XOR                   ..COMPARE CHANNELS
1339            BNZ  PRO3C5           ..BR; NO CHANNEL MATCH
1340            IRX                   ..ADDR TID OF S/R
1341            LDN  TMP4             ..FETCH TID OF D.B.
1342            XOR                   ..COMPARE TID'S
1343            INC  TMP2
1344            BZ   PRO3C1           ..BR IF MATCH FOUND
1345            DEC  TMP2
1346            DEC  TMP2
1347  PRO3C5:   DEC  TMP4
1348            GLO  TMP4
1349            ADI  #0A              ..OFFSET TO NEXT CUS
1350            PLO  TMP4             .. DATA BASE
1351            GHI  TMP4
1352            ADCI #00              ..DOUBLE PRECISION ADD
1353            PHI  TMP4
1354            BR   PRO3C3           ..BR BACK TO LOOK FOR MATCH
1355  PRO3C4:   LDN  BASE
1356            ADI  #0A
1357            STXD
1358            LDN  BASE
1359            ADCI #00
1360            STR  BASE
1361            LDN  TMP2             ..STORE CHANNEL NUMBER
1362            STR  TMP4
1363            INC  TMP4
1364            LDI  A.0(DNLDC1)
1365            PLO  BASE
1366            LDA  TMP2
1367            STR  BASE             ..CHANNEL NO. -> DNLDC1
1368            LDA  TMP2
1369            STR  TMP4             ..STORE TID.
1370  PRO3C1:   INC  TMP2             ..ADDR DATA WORD 2
1371            INC  TMP4
1372            LDA  TMP2             ..FETCH DATA WORD 2
1373            STR  TMP4             ..DATA WORD 2 -> CID
1374            INC  TMP4             ..ADDR TXD,BDR IN D.B.
1375            LDA  TMP2             ..FETCH DATA WORD 3
1376            STR  TMP4             ..DATA WORD 3->TXD,BDR
1377            INC  TMP4
1378            LDA  TMP2             ..DATA WORD 4->FUNC.WORD
```

```
1379              STR TMP4            ..STORE FUNCTION WORD
1380              INC BASE            ..ADDR DNLDC2
1381              INC TMP4
1382              LDN TMP2            ..FETCH DATA WORD 5
1383              STR TMP4            ..STORE TO DATA BASE
1384              STR BASE            ..STORE TO DNLDC2
1385              LDI #00
1386              INC TMP4
1387              STR TMP4            ..STORE ERROR PASS CNTR
1388              INC TMP4
1389              STR TMP4            ..STORE BUSY PASS CNTR
1390              INC TMP4
1391              STR TMP4            ..STORE ALARM CNTR
1392              LDN TMP2            ..FETCH DATA WORD 5
1393              STR BASE            ..DATA WORD 5->DNLDC2
1394              LBR PRO1            ..BR TO ACK AND EXIT
1395
1396    ..PROCESS DIAGNOSTIC COMMANDS..
1397
1398 PRO4:        GHI TMP1
1399              XRI #01             ..TEST FOR DISABLE SCAN
1400              LBNZ PRO4A          ..BR IF NOT DISABLE CMND
1401              GHI FLGWRD
1402              ANI #DF             ..DISABLE SCAN
1403              PHI FLGWRD
1404              LDI A.0(CNTOP1)
1405              PLO BASE
1406              LDN BASE
1407              ANI #FB             ..DISABLE MODEM
1408              STR BASE
1409              SEX BASE
1410              OUT 5
1411              SEX PROCTR
1412              DIS                 ..DISABLE INTERUPTS
1413              ,#E3                ..X->0; P->3
1414              LDI A.0(CHANEL)
1415              PLO BASE
1416              OUT 4               ..DE-SELECT CUSTOMER LINE
1417              BR PRO1             ..BR TO ACK AND EXIT
1418 PRO4A:       GHI TMP1
1419              XRI #00             ..TEST FOR ENABLE CMND
1420              BNZ PRO4B           ..BR IF NOT ENABLE CMND
1421              LDI A.0(DBSEND)     ..FETCH DATA BASE END
1422              PLO BASE
1423              LDA BASE
1424              XRI #14
1425              BNZ PRO4F           ..FORMAT CODE ERR; NO D.B.
1426              LDN BASE
1427              BZ PRO5             ..FORMAT CODE ERR; NO D.B.
1428 PRO4F:       GHI FLGWRD
1429              ORI #20             ..ENABLE SCAN FLAG
1430              PHI FLGWRD
1431              BR PRO1             ..BR TO EXIT
1432 PRO4B:       GHI TMP1
1433              XRI #06             ..TEST FOR SELF TEST CMND
1434              BNZ PRO4C           ..BR IF NOT SELF TEST
```

```
1435              SEP CALL
1436              ,A(ROMTST)        ..DO ROM MEMORY CHECK
1437              LDI A.0(ERWRD1)
1438              PLO BASE
1439              LDI #B0           ..B0 DENOTES SELFTEST
1440              BR PRO5A          ..FORMAT RESULT
1441 PRO4C:       GHI TMP1
1442              XRI #07           ..TEST FOR REFLECT CMND
1443              BNZ PRO4D         ..BR IF NOT REFLECT CMND
1444              BR PRO1           ..BR TO ACKNOWLEDGE
1445 PRO4D:       GHI TMP1
1446              XRI #08           ..TEST FOR AUTO BOOT CMND
1447              BNZ PRO4E         ..BR IF NOT AUTO BOOT
1448              INC TMP2          ..ADDR SECOND DATA WORD
1449              LDI A.0(DNLDC2)   ..FETCH DNLDC2
1450              PLO BASE
1451              LDA TMP2
1452              STR BASE          ..CID ->DNLDC2
1453              INC BASE
1454              LDA TMP2
1455              STR BASE          ..TXD,BDR ->DNLDC3
1456              INC BASE          ..ADDR DNLDC4
1457              LDA TMP2
1458              STR BASE          ..FUNC WORD -> DNLDC4
1459              INC BASE          ..ADDR DNLDC5
1460              LDA TMP2
1461              STR BASE          ..RLY DNLD WRD->DNLDC5
1462              SEP CALL
1463              ,A(GENDB)         ..GENERATE DATA BASE
1464              BR PRO1           ..BR TO ACK AND EXIT
1465 PRO4E:       GHI TMP1
1466              XRI #09           ..TEST FOR INITIALIZE
1467              BNZ PRO5          ..BR TO FORMAT CODE ERROR
1468              DEC BASE
1469              LDA BASE
1470              PHI TMP2
1471              LDN BASE
1472              PLO TMP2
1473              INC TMP2
1474              INC TMP2
1475              INC TMP2          ..ADDR MESSAGE INDEX #
1476              LDN TMP2
1477              PLO DNOUPT
1478              LDI A.0(INIT)     ..FETCH ADDR(LO) INIT
1479              PLO TMP5
1480              LDI A.1(INIT)     ..FETCH ADDR(HI) INIT
1481              PHI TMP5          ..RESTART PROGRAM
1482              SEX TMP5
1483              SEP TMP5          .. AT ADDR(INIT)
1484
1485 ..FORMAT ACKNOWLEDGE..
1486
1487 PRO1:        SEP CALL
1488              ,A(FRMES)
1489              ,#0F              ..ACK ONLY WITH SMCT
1490              SEP RETURN        ..EXIT SUBROUTINE
```

```
1491
1492  ..FORMAT CODE ERROR..
1493
1494  PRO5:     GHI TMP1
1495            PLO TMP2          ..1st D.BYTE -> WORD 3
1496            GLO TMP1
1497            PHI TMP2          ..3 LSB C.W. -> WORD 2
1498            LDI A.O(ERWRD1)
1499            PLO BASE
1500            LDI #CO
1501  PRO5A:    STR BASE          ..CO -> WORD 1
1502            SEP CALL
1503            ,A(FRMES)
1504            ,#FF
1505
1506
1507            SEP RETURN        ..EXIT SUBROUTINE
1508
1509
1510  ........................
1511  ..FRMES / FRMCHK SUBROUTINE..........
1512  ........................
1513
1514  ..FRMES IS THE COMPLETE FORMAT MESSAGE SUBROUTINE..
1515
1516  ..FRMCHK IS LAST PART OF FRMES WHERE A CLEAN-UP..
1517  .. OF THE BUS FILES IS DONE ..
1518
1519            ..FRMES CALL SEQUENCE
1520            ..      SEP CALL
1521            ..      ,A(FRMES)
1522            ..      ,#XX     X0= SMCT NOT AVAIL
1523            ..               XF= SMCT AVAIL
1524            ..               0X= ACK
1525            ..               FX= ERROR
1526            ..  ERWRD1  TYPE OF ERROR
1527            ..  TMP2(HI) WORD 2
1528            ..  TMP2(LO) WORD 3
1529
1530            ..FRMCHK CALL SEQUENCE
1531            ..      SEP CALL
1532            ..      ,(FRMCHK)
1533            ..      ,#XF     XF FOR CLEAR
1534
1535  FRMES:    GLO FLGWRD
1536            ANI #40           ..TEST FOR UP-OUT FULL
1537            BZ FRM3           ..BR IF O.K. TO WRITE
1538            INC LINK
1539            SEP RETURN        ..EXIT NO MESS WRITTEN
1540  FRM3:     LDI A.O(FRMOLD)
1541            PLO BASE
1542            LDA BASE
1543            PHI TMP4
1544            LDN BASE
1545            PLO TMP4          ..NOW TMP4 HOLDS THE PNTR
1546  FRMMES:   INC TMP4
```

```
1547            LDI #00          ..2nd WORD
1548            STR TMP4
1549            DEC TMP4
1550            LDI A.0(CPUADR)  ..FETCH CPU TYPE
1551            PLO BASE
1552            LDN LINK
1553            ANI #F0
1554            BZ FRMES1        ..BR IF ACK MESS
1555            LDI #0C          ..ERROR MESSAGE
1556            STR TMP4         .. SIZE OF 13 WORDS
1557            INC TMP4         ..SECOND WORD
1558            LDN BASE
1559            ORI #07          ..UNSOLICITED ERROR
1560            BR FRMES2
1561 FRMES1:    LDI #0A          ..ACK MESSAGES
1562            STR TMP4         .. ONLY 11 WORDS
1563            INC TMP4
1564            LDI #02          ..CONTROL WORD FOR ACK
1565            SEX BASE
1566            OR               ..OR FOR CONTROL WORD
1567 FRMES2:    INC TMP4
1568            STR TMP4
1569            INC TMP4
1570            LDN LINK
1571            ANI #0F
1572            BNZ FRMES3
1573            LDI A.0(INDEX)   ..FETCH INDEX # FOR ERROR
1574            PLO BASE
1575            LDN BASE
1576            STR TMP4         ..STORE TO MESSAGE FILE
1577            LDI #00
1578            STR BASE         ..PUT 00-> M.I.# RAM LOC.
1579            INC TMP4
1580            STR TMP4         ..PUT 00-> S of SMCT
1581            INC TMP4
1582            STR TMP4         ..PUT 00-> M of SMCT
1583            INC TMP4
1584            BR FRMES6        ..BR TO FETCH C & T
1585 FRMES3:    LDI A.0(PROOLD)  ..FETCH START ADDRESS
1586            PLO BASE         .. OF S/R FILE
1587            LDA BASE
1588            PHI TMP1
1589            LDN BASE
1590            PLO TMP1
1591            INC TMP1
1592            INC TMP1
1593            INC TMP1         ..POINT TO MESS INDEX
1594            LDI #03          ..CNTR FOR 3 BYTES
1595            PLO BASE         .. TO TRANSFER
1596 FRMES4:    LDA TMP1         ..TRANSFER UP IN DATA
1597            STR TMP4
1598            INC TMP4
1599            DEC BASE         ..DECREMENT AND TEST CNTR
1600            GLO BASE
1601            BNZ FRMES4       ..BR IF NOT DONE
1602            LDA TMP1
```

```
1603            STR TMP4
1604            INC TMP4            ..TRANSFER C & T
1605            LDA TMP1            .. FROM UP-IN FILE
1606            STR TMP4
1607            INC TMP4
1608            LDN LINK
1609            ANI #F0             ..TEST FOR ERROR MESS
1610            LBNZ FRMES7         ..BR IF ERROR MESS
1611            LDI A.0(CSWWRD)
1612            PLO BASE
1613            LDN BASE
1614            STR TMP4
1615            LDI #00
1616            STR BASE
1617            INC TMP4
1618            LBR FRMES5
1619 FRMES6:    LDI A.0(DBSPTR)
1620            PLO BASE
1621            LDA BASE
1622            PHI TMP1
1623            LDN BASE
1624            PLO TMP1            ..TRANSFER C & T
1625            LDA TMP1            .. FROM DATA BASE
1626            STR TMP4            .. TO ERROR MESSAGE FILE
1627            INC TMP4
1628            LDN TMP1
1629            STR TMP4
1630            INC TMP4
1631 FRMES7:    LDI A.0(ERWRD1)
1632            PLO BASE
1633            LDN BASE
1634            STR TMP4            ..ERROR WORD 1
1635            INC TMP4
1636            GHI TMP2
1637            STR TMP4            ..ERROR WORD 2
1638            INC TMP4
1639            GLO TMP2
1640            STR TMP4            ..ERROR WORD 3
1641            INC TMP4
1642 FRMES5:    SEP CALL            ..CALC. PARITY AND
1643            ,A(PARITY)          .. WRITE IT
1644            ,A.0(FRMOLD)
1645            ,#1F
1646            ,#01
1647            INC TMP4            ..POINT TO NEXT LOC.
1648 FRMCHK:    LDI A.0(CNTOF1)
1649            PLO BASE
1650            LDN BASE
1651            ANI #7F             ..SET MODE FOR BUS O/P
1652            STR BASE            .. MESS READY TO O/P
1653            SEX BASE
1654            OUT 5               ..OUTPUT TO CONTROL PNT.
1655            LDI A.0(FRMOLD)
1656            PLO BASE
1657            LDA BASE
1658            PHI TMP1
```

```
1659           LDN BASE
1660           PLO TMP1
1661           GLO FLGWRD
1662           ANI #08            ..TEST FOR P.D. RESP.
1663           BNZ FRM5           ..BR; SET FULL FLAG
1664           LDI A.O(BYTEO)
1665           PLO BASE
1666           SEX BASE
1667           LDN TMP1
1668           ADD
1669           STR BASE
1670           SDI #EO
1671           BDF FRM4           ..BR D > or = 0
1672 FRM5:     GLO FLGWRD
1673           ORI #40            ..SET UP-OUT FLAG FULL
1674           PLO FLGWRD
1675  ..........................................
1676           ..TEST FOR END OF FILE
1677 FRM4:     LDI A.O(UPOUEN+#01)
1678           PLO BASE
1679           SEX BASE
1680           GLO TMP4
1681           SD
1682           DEC BASE
1683           GHI TMP4
1684           SDB
1685           BDF FRM1           ..BR IF NOT AT END OF FILE
1686           LDI A.O(UPOUST)   ..INITILIZE TO START OF FILE
1687           PLO BASE
1688           LDA BASE
1689           PHI TMP4
1690           LDN BASE
1691           PLO TMP4
1692 FRM1:     LDI A.O(FRMOLD+#01)      ..STORE NEW VALUE
1693           PLO BASE
1694           GLO TMP4
1695           STXD
1696           GHI TMP4
1697           STR BASE
1698           LDA LINK
1699           ANI #OF            ..TEST FOR SMCT AVAIL
1700           BZ FRM2            ..BR IF SMCT NOT AVAIL
1701           SEP CALL
1702           ,A(CLEAR)          ..CLEAR LAST S/R
1703 FRM2:     SEP RETURN         ..EXIT SUBROUTINE
1704
1705
1706  ..................................
1707  ..CLEAR SUBROUTINE................
1708  ..................................
1709
1710  ..CLEAR OUT LAST S/R FROM UP-IN-FILE..
1711
1712 CLEAR:     LDI A.O(PROOLD)
1713           PLO TMP1
1714           GHI BASE
```

```
1715            PHI TMP1         ..ADDR. PROOLD -> TMP1
1716            LDA TMP1
1717            PHI TMP2
1718            LDN TMP1
1719            PLO TMP2         ..MEM PROOLD -> TMP2
1720            INC TMP2         ..PUSH OVER END FOR TEST
1721
1722 ..TEST FOR END OF FILE..
1723
1724            LDI A.0(UPINEN+#01)
1725            PLO BASE
1726            SEX BASE
1727            GLO TMP2
1728            SD
1729            DEC BASE
1730            GHI TMP2
1731            SDB
1732            BDF CL1
1733            LDI A.0(UPINST+#01) ..ADVANCE TO START
1734            PLO BASE
1735            LDN BASE
1736            STR TMP1
1737            DEC TMP1
1738            DEC BASE
1739            LDN BASE
1740            STR TMP1
1741            BR CL2
1742
1743 ..ADVANCE POINTER..
1744
1745 CL1:       GLO TMP2
1746            ADI #0F
1747            STR TMP1
1748            DEC TMP1
1749            GHI TMP2
1750            ADCI #00
1751            STR TMP1
1752
1753 ..DECREMENT S/R COUNTER..
1754
1755 CL2:       LDI A.0(SRCNT)
1756            PLO BASE
1757            LDN BASE
1758            SMI #01
1759            STR BASE
1760            GHI FLGWRD
1761            ANI #F7          ..CLEAR TRNSP S/R FLAG
1762            PHI FLGWRD
1763            LDI A.0(CNTOP1)
1764            PLO BASE
1765            LDN BASE
1766            ANI #DF          ..AFTER A CLEAR
1767            STR BASE         .. SET S/R FILE
1768            SEX BASE         .. NOT FULL
1769            OUT 5
1770            SEP RETURN
```

```
1771
1772
1773
1774
1775   ........................................
1776   ..CRC PARITY GENERATOR..................
1777   ........................................
1778
1779           ..CALLING SEQUENCE
1780           ..      SEP CALL
1781           ..          ,A(PARITY)
1782           ..          ,ADDRESS LO OF MEMORY FOR FIRST BYTE
1783           ..          ,ADDRESS HI OF MEMORY FOR FIRST BYTE
1784           ..          ,00=INPUT(CHECKS), 01=OUTPUT(WRITES)
1785           ..*NOTE ENTRY POINT FOR ROM PARITY CHECK
1786           .. IS AT LABLE "PARCHK".
1787
1788   PARITY: LDA LINK          ..FETCH ADDRESS
1789           PLO TMP1          ..AND STORE IN TMP1
1790           LDA LINK
1791           PHI TMP1
1792           LDA TMP1          ..FETCH CONTENTS WHICH
1793           PHI TMP4          ..IS THE START ADDRESS OF
1794           LDN TMP1          ..BLOCK AND STORE IN TMP4
1795           PLO TMP4
1796           LDA TMP4          ..FETCH SIZE INTO TMP2
1797           PLO TMP2
1798           LDN TMP4
1799           PHI TMP2
1800           DEC TMP4
1801           DEC TMP2
1802   PARCHK: LDI A.1(PARTAB)   ..SET TABLE MSB ADDRESS
1803           PHI TMP1          ..START WITH FF AT 53(DEC)
1804           LDI 53
1805           PLO TMP1
1806           SEX TMP1
1807   PARLOP: LDA TMP4          ..FETCH BYTE OF DATA
1808           XOR               ..XOR WITH TABLE VALUE
1809           PLO TMP1          ..UPDATE LSBS OF DATA PNTR
1810           DEC TMP2          ..DECREMENT BYTE COUNTER.
1811           GLO TMP2
1812           BNZ PARLOP        ..TEST FOR END OF BLOCK
1813           GHI TMP2
1814           BNZ PARLOP
1815           LDN TMP1          ..FETCH RESULT
1816           XRI #FF           ..COMPLIMENT IT
1817           PLO TMP2          ..STORE IN TMP2 FOR RETURN
1818           LDI #00           ..SET RETURN PARAMETER
1819           PHI TMP2          ..TO 0
1820           LDA LINK          ..FETCH MODE FLAG
1821           BZ PARINP         ..BRANCH IF INPUT MODE
1822           GLO TMP2          ..FETCH PARITY AND
1823           STR TMP4          ..WRITE TO END OF BLOCK
1824           SEP RETURN
1825   PARINP: SEX TMP4          ..INPUT MODE
1826           GLO TMP2          ..FETCH PARITY ERRORS
```

```
1827            XOR                 ..AND COMPARE
1828            BZ FAREXT           ..EXIT IF NO ERROR(FLAG=0)
1829            LDI #FF             ..SET FLAG ON ERROR
1830            PHI TMP2
1831 FAREXT:    SEP RETURN
1832
1833
1834
1835 ........................................
1836 ..UPDATE REAL TIME CLOCK AND........
1837 ..WATCH DOG OUTPUT SUBROUTINE.......
1838 ........................................
1839
1840 RTCUPD:    GHI FLGWRD          ..RESET UPDATE FLAG BIT
1841            ANI #EF
1842            PHI FLGWRD
1843            LDI A.0(RTCSEC)     ..FETCH RTC POINTER
1844            PLO TMP1            ..AND POINT AT SECONDS
1845            GHI BASE
1846            PHI TMP1
1847            SEX TMP1
1848            LDI #01             ..INCREMENT SECONDS
1849            ADD                 ..REGISTER
1850            STR TMP1
1851            LDI A.0(CNTOP1)     ..FETCH,OUT 7 CONTROL
1852            PLO BASE            ..WORD
1853            SEX BASE
1854            LDN TMP1            ..TEST FOR 2 SECOND
1855            ANI #01             ..INTERVALS
1856            BZ RTCWD1
1857            LDN BASE            ..OUTPUT WATCHDOG
1858            ORI #08             ..CLOCK TO A HIGH
1859            STR BASE
1860            BR RTCWD2
1861 RTCWD1:    LDN BASE
1862            ANI #F7
1863            STR BASE
1864 RTCWD2:    SEX BASE
1865            OUT 5
1866
1867 ..UPDATE SECONDS HOLDING REGISTER..
1868
1869 RTCCHK:    LDN TMP1             ..FETCH SECONDS
1870            ANI #0F
1871            XRI #0A
1872            LBNZ RTCEXT         ..BR; 1's NOT PAST 9
1873            LDN TMP1            ..RESET 1's, TEST 10's
1874            ANI #F0
1875            ADI #10
1876            STR TMP1
1877            XRI #60
1878            LBNZ RTCEXT         ..BR; 10's NOT PAST 60
1879            STR TMP1            ..RESET 10's
1880            INC TMP1
1881
1882 ..UPDATE MINUTES HOLDING REGISTER..
```

```
1883
1884            LDN TMP1            ..FETCH MINUTES
1885            ADI #01             ..INCREMENTS 1's
1886            STR TMP1
1887            ANI #0F
1888            XRI #0A
1889            BNZ RTCEXT          ..BR; 1's NOT PAST 9
1890            LDN TMP1            ..RESET 1's, TEST 10's
1891            ANI #F0
1892            ADI #10
1893            STR TMP1
1894            XRI #60
1895            BNZ RTCEXT          ..BR; 10's NOT PAST 60
1896            STR TMP1            ..RESET 10's
1897 RTCEXT:    SEP RETURN
1898
1899
1900
1901
1902 ....................................
1903 ..CONSTX SUBROUTINE.................
1904 ....................................
1905
1906 ..CONSTANT TX TEST SUBROUTINE..
1907 ..TESTS:   1) LAST WORD RX BEFORE TX POSSIBLE
1908 ..         2) TRANSPONDER CONTINUALLY TXING
1909
1910 CONSTX:    GHI FLGWRD
1911            ANI #80             ..TEST FOR RETRY
1912            BZ CON4             ..BR IF NOT RETRY
1913 CON1:      GHI TMP5
1914            BNZ CON1A
1915            GLO TMP5
1916            BZ CON3             ..BR; ALL WORDS IN
1917 CON1A:     DEC TMP5            ..DECREMENT WORD COUNT
1918            GHI FLGWRD
1919            ANI #FE             ..SET TMOUT NOT INITIAL.
1920            PHI FLGWRD
1921 CON2:      SEP CALL
1922            ,A(TMOUT)
1923            ,A.0(TM1)
1924            GHI FLGWRD
1925            ANI #01             ..TEST COMPLETE/INCOMPLETE
1926            BNZ CON2            ..BR IF TMOUT NOT DONE
1927            BR CON1             ..BR TO CHECK WORD COUNT
1928 CON3:      GHI FLGWRD
1929            ANI #7F             ..CLEAR RETRY FLAG
1930            PHI FLGWRD
1931 CON4:      SEX FREE
1932            INP 4               ..TEST FOR CARRIER PRESENT
1933            ANI #20
1934            BNZ CON5            ..BR; OK TO TX; NO CARRIER
1935            SEP CALL
1936            ,A(TMOUT)           ..TMOUT 1 WORD TIME
1937            ,A.0(TM1)
1938            GHI FLGWRD
```

```
1939              ANI #01              ..CHECK TMOUT COMPLETE
1940              BNZ CON4
1941              LDI A.0(ERWRD1)
1942              PLO BASE
1943              LDI #F0              ..F0 ->WORD1
1944              STR BASE
1945              LDI #00              ..00 ->WORD2
1946              PHI TMP2
1947              LDI #01              ..01 ->WORD3
1948              LSKP                 ..EXIT; NOT OK
1949 CON5:        LDI #00              ..EXIT; OK
1950              PLO TMP2
1951              SEP RETURN           ..EXIT SUBROUTINE
1952
1953
1954
1955
1956 ..................................
1957 ..TMOUT SUBROUTINE................
1958 ..................................
1959
1960 ..THIS SUBROUTINE DELAYS IN MULTIPLES OF 50ms
1961
1962              ..CALL INSTRUCTIONS
1963
1964 ..       SEP CALL
1965 ..       ,A(TMOUT)
1966 ..       ,#XX        XX = 01 FOR 50ms
1967 ..                        02 FOR 100ms
1968 ..                        03 FOR 150ms
1969 ..                        04 FOR 200ms; ETC.
1970
1971 ..  ON ENTRY   FLGWRD BIT 0   0 = NOT INITIALIZED
1972 ..                            1 = ALREADY INITIALIZED
1973
1974 ..  ON EXIT;   FLGWRD BIT 0   0 = TMOUT COMPLETE
1975 ..                            1 = NOT COMPLETE
1976
1977
1978 ..FIRST TEST IF ALREADY INITIALIZED..
1979
1980 TMOUT:       GHI FLGWRD
1981              ANI #01
1982              BNZ TIM1             ..BR IF ALREADY INITIALIZED
1983
1984 ..INITIALIZE TMOUT SUBROUTINE..
1985
1986              LDI A.0(TMOUT1)
1987              PLO BASE
1988.             LDI #97              ..50ms INNER LOOP
1989              STR BASE
1990              INC BASE             ..ADDR TMOUT2
1991              LDN LINK             ..FETCH DELAY MULTIPLE
1992              PLO TMP2
1993              GHI BASE
1994              PHI TMP2
```

```
1995           LDN TMP2
1996           STR BASE
1997           GHI FLGWRD
1998           ORI #01           ..SET INITIALIZED
1999           PHI FLGWRD
2000
2001  ..TIME OUT LOOP..
2002
2003  TIM1:    INC LINK          ..REMOVE DELAY MULTIPLE
2004           SEP CALL
2005           ,A(MAINBS)        ..ACCESS BUS
2006           LDI A.0(TMOUT1)
2007           PLO BASE
2008           LDN BASE
2009           SMI #01           ..DECREMENT AND
2010           STR BASE          .. STORE INNER LOOP
2011           BNZ TIM2          ..BR; INNER LOOP NOT DONE
2012           LDI #97           ..RESTORE INNER LOOP
2013           STR BASE
2014           INC BASE
2015           LDN BASE          ..FETCH OUTER LOOP
2016           SMI #01           ..DECREMENT AND
2017           STR BASE          .. STORE OUTER LOOP
2018           BNZ TIM2          ..BR; OUTER LOOP NOT DONE
2019
2020  ..LOOP TIMED OUT..
2021
2022           GHI FLGWRD
2023           ANI #FE           ..SET TIME OUT COMPLETE
2024           PHI FLGWRD
2025
2026  TIM2:    SEP RETURN        ..RETURN FROM TMOUT
2027
2028
2029  ....................................
2030  ..TXINT..TRANSMIT INTERUPT ROUTINE..
2031  ....................................
2032
2033           LDXA
2034           RET               ..RETURN WITH INT ENABLED
2035  TXINT:   DEC STKPTR
2036           SAV               ..SAVE X & P
2037           DEC STKPTR
2038           STR STKPTR        ..SAVE D
2039           GLO TMP5
2040           BZ TXINT1         ..BR IF DONE
2041           SEX INOUPT
2042           OUT 1
2043           SEX STKPTR
2044           DEC TMP5          ..DEC WORD COUNT
2045           BR TXINT-2        ..BR SINCE NOT DONE
2046  TXINT1:  LDXA              ..RESTORE D
2047           DIS               ..RETURN WITH INT DISABLED
2048
2049  ....................................
2050  ..IOTX..UART TRANSMIT SUBROUTINE.......
```

```
2051  ........................................
2052
2053 IOTX:    LDI A.0(TXINT)   ..SET INTERUPT VECTOR
2054         PLO INTVTR       .. TO TXINT
2055         LDI A.1(TXINT)
2056         PHI INTVTR
2057         GHI FLGWRD
2058         ANI #FE
2059         PHI FLGWRD
2060         LDI #04          ..RESET WORD COUNTER
2061         PLO TMP5         .. FOR 5 WORDS
2062         LDI A.0(DNOOLD)
2063         PLO BASE
2064         LDA BASE
2065         PHI DNOUPT       ..RESET DNOUPT FOR TX
2066         LDN BASE
2067         PLO DNOUPT
2068         LDI A.0(CNTOP1)
2069         PLO BASE
2070         LDN BASE
2071         ORI #04          ..ENABLE MODEM
2072         STR BASE
2073         SEX BASE
2074         OUT 5
2075 IOTX1:  SEP CALL
2076         ,A(TMOUT)
2077         ,A.0(TM2)        ..DELAY FOR MODEM WARMUP
2078         GHI FLGWRD
2079         ANI #01          ..TEST; TMOUT DONE
2080         BNZ IOTX1        ..BR; TMOUT NOT DONE
2081         SEX DNOUPT
2082         OUT 1            ..START TX SEQUENCE
2083         SEX PROCTR
2084         INP 2            ..CLEAR UART
2085         RET              ..ENABLE INTERUPTS
2086         ,#A3
2087 IOTX2:  LSIE             ..WAIT FOR INT DISABLED
2088         BR IOTX4         ..BR; INT DISABLED
2089         SEP CALL
2090         ,A(TMOUT)
2091         ,A.0(TM3)        ..TMOUT ON UART INT.
2092         GHI FLGWRD
2093         ANI #01          ..TEST; TMOUT COMPLETE
2094         BNZ IOTX2        ..BR; TMOUT NOT DONE
2095 IOTX3:  PHI TMP2         ..00 -> TMP2(HI), WORD 2
2096         SEX PROCTR
2097         DIS              ..DISABLE INTERUPTS
2098         ,#03
2099         LDI A.0(ERWRD1)
2100         PLO BASE
2101         LDI #F0          ..F0 -> WORD 1
2102         STR BASE
2103         LDI #02          ..02 -> WORD 2
2104         BR IOTX6+1       ..BR TO EXIT
2105
2106 IOTX4:  GHI FLGWRD
```

```
2107            ANI #FE             ..RESET TMOUT INIT.
2108            PHI FLGWRD
2109 IOTX5:     SEX FREE
2110            INP 2               ..LAST WORD OUT?
2111            ANI #04             ..CHECK FOR TSRE HI
2112            BNZ IOTX6           ..BR ON TSRE HI
2113            SEP CALL
2114            ,A(TMOUT)
2115            ,A.0(TM4)
2116            GHI FLGWRD
2117            ANI #01
2118            BNZ IOTX5           ..BR IF TMOUT NOT DONE
2119            BR IOTX3            ..TIMED OUT; FORMAT ERROR
2120
2121 IOTX6:     LDI #00             ..LAST WORD OUT
2122            PLO TMP2            ..TX SUCCESSFUL
2123            LDI A.0(CNTOP1)     ..FETCH CONTROL O/P 1
2124            PLO BASE
2125            LDN BASE
2126            ANI #FB             ..DISABLE MODEM
2127            STR BASE
2128            SEX BASE
2129            OUT 5               ..OUTPUT TO PORT
2130            SEP RETURN          ..EXIT SUBROUTINE
2131
2132
2133
2134
2135 ........................................
2136 ..RXINT..RECEIVE INTERUPT ROUTINE.....
2137 ........................................
2138
2139            INC DNINPT
2140            GLO FLGWRD
2141            ORI #01             ..SET FLAG FOR RESET TMOUT
2142            PLO FLGWRD
2143            DEC TMP5            ..DECREMENT WORD COUNT
2144            SEX STKPTR
2145            LDXA
2146            PLO BASE            ..RESTORE BASE LO
2147            LDXA                ..RESTORE D
2148            RET                 ..RETURN WITH INT ENABLED
2149 RXINT:     DEC STKPTR
2150            SAV                 ..SAVE X & P
2151            DEC STKPTR
2152            SEX STKPTR
2153            STXD                ..SAVE D
2154            GLO BASE
2155            STR STKPTR          ..SAVE BASE LO
2156            SEX DNINPT
2157            INP 1               ..INPUT DATA
2158            SEX BASE
2159            GLO FLGWRD
2160            ANI #FE             ..MAKE SURE ITS LO
2161            PLO FLGWRD
2162            LDI A.0(WRDCNT)     ..ADDR WORD COUNT
```

```
2163            PLO BASE
2164            GHI TMP5
2165            XOR                 ..TEST MSB FOR 1st WORD
2166            BNZ RXINT1          ..BR; NOT 1st WORD
2167            INC BASE
2168            GLO TMP5
2169            XOR                 ..TEST LSB FOR 1st WORD
2170            BNZ RXINT1          ..BR; NOT 1st WORD
2171            SEX PROCTR
2172            INP 2               ..CLEAR AND INPUT ERRORS
2173            ANI #38             ..MASK FOR UART ERR BITS
2174            LBNZ RXINT-5        ..BR; ERR FOUND ON 1st WORD
2175            LDN DNINPT          ..FETCH FIRST WORD
2176            XRI #FF             ..CHECK FOR FF
2177            LBNZ RXINT-5        ..BR; VALID FF NOT FOUND
2178
2179 RXINT1:    SEX DNINPT
2180            IRX
2181            INP 2               ..CLEAR AND INPUT ERRORS
2182            ANI #38             ..MASK FOR UART ERRORS
2183            BZ RXINT2           ..BR; NO ERROR FOUND
2184            STR DNINPT          ..STORE MASK OF ERRORS
2185            LDI A.0(RXERRW)     ..FETCH RECEIVE ERROR WORD
2186            PLO BASE
2187            LDI #20             ..20 TO DENOTE UART ERROR
2188            STR BASE
2189            BR RXINT4           ..EXIT INT ROUTINE; ERRORS
2190
2191 RXINT2:    DEC DNINPT
2192            LDN DNOUPT          ..RECALL LAST B.P. CALC.
2193            XOR                 ..RECALCULATE B.P.
2194            STR DNOUPT          ..STORE TO UNUSED LOC.
2195            GHI TMP5
2196            XRI #00             ..TEST MSB FOR 00
2197            LBNZ RXINT-11       ..BR; NOT ZERO
2198            GLO TMP5
2199            XRI #01             ..TEST FOR LAST WORD
2200            BNZ RXINT3          ..BR; NOT LAST WORD
2201            LDN DNINPT
2202            XRI #EE             ..TEST LAST WORD FOR EE
2203            BZ RXINT4-1         ..BR; VALID ETX FOUND
2204            LDI A.0(RXERRW)
2205            PLO BASE
2206            LDI #40             ..40 TO DENOTE INVALID ETX
2207            STR BASE
2208            BR RXINT4           ..EXIT WITH ERRORS
2209
2210 RXINT3:    GLO TMP5
2211            XOR #02
2212            LBNZ RXINT-11       ..BR; NOT 2nd LAST WORD
2213            LDN DNOUPT
2214            LBZ RXINT-11        ..BR; B.P. OK
2215            LDI A.0(RXERRW)
2216            PLO BASE
2217            LDI #10             ..10 TO DENOTE B.P. ERR
2218            STR BASE
```

```
2219            SKP
2220            DEC TMP5            ..DEC WORD COUNT
2221 RXINT4:    SEX STKPTR
2222            LDXA
2223            PLO BASE            ..RESTORE BASE LO
2224            LDXA                ..RESTORE D
2225            DIS                 ..RETURN WITH INT DISABLED
2226
2227
2228
2229
2230 ..........................................
2231 ..IORX...UART RECEIVE ROUTINE................
2232 ..........................................
2233
2234 IORX:      GHI FLGWRD
2235            ANI #FE             ..SET TMOUT NOT INIT.
2236            PHI FLGWRD
2237            LDI A.0(WRDCNT)     ..SET WORD COUNTER
2238            PLO BASE
2239            LDA BASE
2240            PHI TMP5
2241            LDN BASE
2242            PLO TMP5
2243            LDI A.0(RXINT)      ..SET INTVTR TO RXINT
2244            PLO INTVTR
2245            LDI A.1(RXINT)
2246            PHI INTVTR
2247            GLO FLGWRD
2248            ANI #20             ..TEST FOR S/F RESP.
2249            BNZ RX1B            ..BR IF S/F RESP.
2250            GLO FLGWRD
2251            ANI #02             ..TEST FOR S/R RESPONSE
2252            BNZ RX1A            ..BR IF S/R RESP.
2253 RX1B:      LDI A.0(DNIOLD)
2254            PLO BASE
2255            LDA BASE
2256            PHI DNINPT          ..RESET DNINPT
2257            LDN BASE
2258            PLO DNINPT
2259            BR RX1
2260 RX1A:      LDI A.0(FRMOLD+#01)
2261            PLO BASE
2262            LDN BASE
2263            ADI #07             ..OFFSET DUMP LOCATION
2264            PLO DNINPT
2265            DEC BASE
2266            LDN BASE            ..S/R ARE DUMPED DIRECTLY
2267            ADCI #00            .. INTO THE UP-OUT-FILE
2268            PHI DNINPT
2269 RX1:       INP 4               ..CHECK FOR CARRIER DETECT
2270            ANI #20             ..CARRIER IS ACTIVE LOW
2271            BZ RX2              ..BR IF CARRIER DETECTED
2272            SEP CALL
2273            ,A(TMOUT)           ..TIME OUT ON CARRIER
2274            ,A.0(TM5)
```

```
2275            GHI FLGWRD
2276            ANI #01              ..TEST IF DONE
2277            BNZ RX1              ..BR IF TMOUT NOT DONE
2278            LDI A.0(RXERRW)
2279            PLO BASE             ..LOAD RX ERROR WORD
2280            LDI #80              .. WITH TMOUT ON CARRIER
2281            STR BASE             ..SAVE FOR NO RESP.
2282            LBR RX7              ..DESELECT CUSTOMER; EXIT
2283
2284 ..CARRIER DETECTED..
2285
2286 RX2:       GHI FLGWRD
2287            ANI #FE              ..REINITIALIZE TMOUT
2288            PHI FLGWRD
2289            GLO FLGWRD
2290            ANI #FE              ..INITIALIZE THE INITIALIZE
2291            PLO FLGWRD
2292            SEX PROCTR
2293            INP 2                ..CLEAR RX BUFFER
2294            RET                  ..ENABLE INTERUPTS
2295            ,#93
2296
2297 ..WAIT FOR INTERUPT..
2298
2299 RX3:       LSIE
2300            LBR RX5
2301            GLO FLGWRD
2302            ANI #01              ..TEST; REINITIALIZE?
2303            BZ RX4               ..BR IF NOT TO BE INIT.
2304            GHI FLGWRD
2305            ANI #FE              ..SET TMOUT FLG; INIT.
2306            PHI FLGWRD
2307 RX4:       SEP CALL             ..TIME OUT ON INTERUPTS
2308            ,A(TMOUT)            .. BEFORE AND BETWEEN
2309            ,A.0(TM6)
2310            GHI FLGWRD
2311            ANI #01
2312            BNZ RX3              ..BR; TMOUT NOT DONE
2313
2314 ..TIMED OUT BEFORE/BETWEEN INTERUPTS..
2315
2316            SEX PROCTR
2317            DIS                  ..DISABLE INTERUPTS
2318            ,#03
2319            GLO FLGWRD
2320            ANI #08              ..TEST FOR P.D. RESP.
2321            LBZ RX4A             ..BR; NOT P.D. RESP.
2322 RX4B:      DEC DNINPT
2323            DEC DNINPT
2324            LDA DNINPT
2325            XRI #EE              ..TEST FOR END OF TX
2326            BZ RX4C              ..BR; VALID EE FOUND
2327            LDN DNINPT
2328            XRI #EE              ..CHECK AGAIN
2329            BNZ RX4A             ..BR; INVALID EE FOUND
2330 RX4C:      LDI #00
```

```
2331            LBR RX7              ..BR TO EXIT
2332  RX4A:     LDI A.0(RXERRW)
2333            PLO BASE
2334            LDI #40              ..SAVE FOR INT ERROR
2335            STR BASE
2336            PLO TMP2
2337            LBR RX8              ..EXIT SUBROUTINE; ERRORS
2338
2339  ..INTERUPTS DISABLED..TEST FOR ERRORS..
2340
2341  RX5:      GLO FLGWRD
2342            ANI #08              ..TEST P.D. FLAG
2343            LBNZ RX4B            ..BR; CHECK P.D. RESP.
2344            GHI TMP5             ..TEST WORD COUNT
2345            LBNZ RX6
2346            GLO TMP5
2347            BZ RX7               ..BR; SINCE RX OK
2348  RX6:      LDI A.0(RXERRW)
2349            PLO BASE             ..LOAD RX ERROR WORD
2350            LDI #20              .. WITH UART ERROR
2351            STR BASE
2352  RX7:      PLO TMP2
2353  RX8:      LDI A.0(CHANEL)
2354            PLO BASE
2355            SEX BASE
2356            OUT 4                ..DE-SELECT CUSTOMER LINE
2357            SEP RETURN           ..EXIT SUBROUTINE
2358
2359
2360
2361  .............................
2362  ..IOSR SUBROUTINE.............
2363  .............................
2364
2365  ..FORMAT S/R FOR TRANSPONDER..
2366
2367     ..ON RETURN: RX WORD COUNT -> MEMORY(WRDCNT)
2368     ..             TMP1(HI)   00 VALID INSTRUCTION
2369     ..                        FF ILL. INSTRUCTION
2370
2371  IOSR:     LDI A.0(DNOOLD)
2372            PLO BASE
2373            LDA BASE
2374            PHI DNOUPT           ..RESET DNOUPT
2375            LDN BASE
2376            PLO DNOUPT
2377            LDI #FF
2378            STR DNOUPT
2379            INC DNOUPT
2380            LDI A.0(PROOLD)      ..FETCH START OF S/R MESS.
2381            PLO BASE
2382            LDA BASE
2383            PHI TMP3
2384            LDN BASE
2385            ADI #06              ..OFFSET BY 6
2386            PLO TMP3             ..FOR CHANNEL NO.
```

```
2387        GHI TMP3
2388        ADCI #00
2389        PHI TMP3
2390        SEX TMP3
2391        OUT 4               ..OUTPUT CHANNEL NO.
2392        SEP CALL
2393        ,A(TMBUSY)          ..DO BUSY DETECT TMOUT
2394        GLO TMP4
2395        BZ IOSR2            ..BR; NOT BUSY
2396        GLO FLGWRD
2397        ANI #F7             ..RESET P.D. FLAG IF BUSY
2398        PLO FLGWRD
2399        LDI #OF             ..FORMAT CUS. BUSY
2400        PHI TMP1            .. ON RETURN
2401        LDI A.0(CHANEL)
2402        PLO BASE
2403        SEX BASE
2404        OUT 4               ..DESELECT CUS. CHANNEL
2405        SEP RETURN          ..EXIT SUBROUTINE
2406 IOSR2: LDA TMP3            ..FETCH TID
2407        STR DNOUPT          ..TID -> WORD 2
2408        INC DNOUPT
2409        GLO FLGWRD
2410        ANI #20             ..TEST FOR S/F
2411        BZ IOSR3            ..BR IF NOT S/F
2412        LDI #42 ..42 FOR RESET P.D.
2413        STR TMP3            ..PUT INTO S/R FILE
2414 IOSR3: LDN TMP3            ..FETCH 1st DATA WORD
2415        STR DNOUPT          ..1st DATA WORD
2416        INC DNOUPT          .. -> WORD 3
2417        PLO TMP1
2418        SEP CALL
2419        ,A(RXWDCT)          ..CALCULATE # WORDS TO RX
2420        GHI TMP1
2421        BNZ IOSR1           ..BR IF ERRORS
2422        SEP CALL
2423        ,A(RXBDR)           ..CALCULATE RX BAUD RATE
2424        GHI TMP1
2425        BNZ IOSR1           ..BR IF ERRORS
2426        LDN TMP3
2427        STR DNOUPT          ..2nd DATA WORD
2428        INC DNOUPT          .. -> WORD 4
2429        GLO FLGWRD
2430        ORI #02             ..SET FLAG FOR S/R RESP.
2431        PLO FLGWRD
2432        LDI A.0(DNOOLD)
2433        PLO BASE
2434        LDA BASE
2435        PHI TMP3            ..DO PARITY ON THE
2436        LDN BASE            .. MESSAGE BLOCK
2437        PLO TMP3
2438        SEX TMP3            ..START AT WORD 1
2439        LDXA
2440        XOR
2441        IRX
2442        XOR
```

```
443            IRX
444            XOR
445            STR DNOUPT         ..STORE PARITY-> WORD 5
446 IOSR1:     SEP RETURN         ..EXIT SUBROUTINE
447
448
449
450
451 ........................................
452 ..IOSCAN SUBROUTINE.....................
453 ........................................
454
455 ..ADVANCE OR RETRY..
456
457 IOSCAN:    GHI FLGWRD
458            ANI #80
459            BNZ SCAN6          ..BR IF RETRY
460
461 ..ADVANCE..
462
463 SCAN3:     LDI A.0(DBSPTR)    ..FETCH ADDR OF
464            PLO BASE           ..NEXT CUSTOMER
465            PLO TMP1
466            INC BASE
467            LDN BASE           ..INCREMENT TO NEXT
468            ADI #0A            ..CUSTOMER'S D.B.
469            STR BASE
470            PLO TMP2           ..DO DOUBLE PRECISION
471            DEC BASE           ..ADD FOR DATA BASE
472            LDN BASE           ..POINTER AND STORE
473            ADCI #00           ..IN TMP2
474            STR BASE
475            PHI TMP2
476
477 ..CHECK FOR END OF DATA BASE..
478
479            LDI A.0(DBSEND)    ..FETCH ADDR FOR
480            PLO BASE           ..END OF D.B.
481            GHI TMP2
482            SEX BASE           ..CHECK FOR PNTR AT
483            XOR                ..END OF D.B.
484            BNZ SCAN6          ..BR IF NOT AT END
485            GLO TMP2           ..OF DATA BASE
486            INC BASE           ..TEST MSB'S
487            XOR
488            DEC BASE
489            BNZ SCAN6          ..BR IF NOT AT END
490
491 ..AT END OF DATA BASE..
492
493            GHI BASE
494            PHI TMP1
495            LDI A.0(DBSSTR)
496            PLO BASE           ..RESTORE D.B. PNTR
497            LDA BASE           ..TO D.B. START
498            STR TMP1
```

```
2499            INC TMP1
2500            LDN BASE
2501            STR TMP1
2502
2503  ..TEST FOR LOAD SHED IN PROGRESS..
2504
2505            GLO FLGWRD
2506            ANI #04
2507            BZ SCAN6            ..BR IF NO LOAD SHED
2508
2509  ..LOAD SHED IN PROGRESS..
2510
2511            LDI A.0(NCOUNT)    ..FETCH L/S PASSES
2512            PLO BASE
2513            LDN BASE
2514            SMI #01            ..DEC THE COUNT
2515            BNF SCAN4          ..BR; N PASSES DONE
2516            STR BASE
2517            BR SCAN6           ..CONTINUE SCAN
2518
2519  ..N PASSES DONE; FORMAT LOAD SHED MESSAGES..
2520
2521  SCAN4:    SEP CALL
2522            ,A(IOCNT)          ..COUNT # UNSHED CUS.
2523            SEP CALL
2524            ,A(IOSET)          ..RESET ALL WORK BITS
2525            ,#00
2526            GLO FLGWRD
2527            ANI #FB            ..RESET LOAD SHED CMD.
2528            PLO FLGWRD
2529
2530  ..TEST FOR SUBSCRIBE BITS SET..
2531
2532  SCAN6:    LDI A.0(DBSPTR)
2533            PLO BASE
2534            INC BASE
2535            LDN BASE
2536            ADI #04            ..OFFSET PNTR BY 4
2537            PLO TMP3           .. TO ADDRESS FUNCTION
2538            DEC BASE           .. WORD IN THE
2539            LDN BASE           .. DATA BASE
2540            ADCI #00
2541            PHI TMP3
2542            LDN TMP3           ..FETCH FUNCTION WORD
2543            ANI #65            ..FETCH SCAN SUBSC. BIT's
2544            LBZ SCAN6A         ..BR; NO SUBSCRIBE, EXIT
2545
2546  ..OUTPUT CHANNEL NUMBER..TEST FOR BUSY..
2547
2548            LDI A.0(DBSPTR)    ..FETCH CUS. LINE NO.
2549            PLO BASE
2550            LDA BASE
2551            PHI TMP1
2552            LDN BASE
2553            PLO TMP1
2554            SEX TMP1
```

```
2555            OUT  4              ..OUTPUT CUS. LINE NO.
2556            SEP  CALL
2557            ,A(TMBUSY)          ..TMOUT FOR VALID BUSY
2558            GLO  TMP4
2559            LBZ  SCAN8           ..BR IF NOT BUSY
2560            GLO  FLGWRD          ..TEST FOR LOAD IN
2561            ANI  #04             ..  PROGRESS
2562            LBNZ SCAN8           ..BR IF LOAD SHEDDING
2563            LDA  TMP3            ..FETCH FUNCTION WORD
2564            ANI  #10             ..TEST BUSY OVERRIDE FLAG
2565            LBZ  SCAN6A          ..BR IF CUS. SUBSCRIBE
2566            GLO  FLGWRD          ..TEST FOR ALARM DETECTED
2567            ANI  #80             ..  LAST SCAN
2568            LBNZ SCAN8A          ..BR IF ALARM DETECTED
2569            INC  TMP3
2570            INC  TMP3            ..ADDR.BUSY PASS COUNTER
2571            SEX  TMP3
2572            LDI  A.0(DNLDA4)     ..FETCH BUSY PASS COUNTER
2573            PLO  BASE
2574            LDN  BASE
2575            XOR                  ..CHECK IF PASSES DONE
2576            LBZ  SCAN8B          ..BR ON CNTR < MAX; ADVANCE
2577            LDN  TMP3
2578            ADI  #01             ..INC BUSY PASS CNTR.
2579            STR  TMP3
2580  SCAN6A:   LDI  A.0(CHANEL)
2581            PLO  BASE
2582            SEX  BASE
2583            OUT  4               ..DE-SELECT CUSTOMER
2584            SEP  RETURN          ..EXIT CUST. BUSY
2585  SCAN8:    INC  TMP3
2586  SCAN8A:   INC  TMP3
2587            INC  TMP3            ..ADDR BUSY PASS CNTR.
2588  SCAN8B:   LDI  #00
2589            STR  TMP3            ..RESET BUSY PASS CNTR.
2590            GLO  FLGWRD
2591            ANI  #04             ..TEST FOR LOAD SHED
2592            BZ   SCAN10          ..BR; NOT IN PROGRESS
2593
2594  ..TEST FOR NOT SHED ON LOAD SHED..
2595
2596  SCAN9:    DEC  TMP3
2597            DEC  TMP3
2598            DEC  TMP3            ..ADDR. FUNCTION WORD
2599            LDN  TMP3            ..FETCH FUNCTION WORD
2600            ANI  #01             ..TEST FOR LOAD SHED
2601            ..                   ..  SERVICE SUBSCRIPTION
2602            BZ   SCAN10          ..BR IF CUS DOES NOT SUBSC
2603            LDN  TMP3
2604            ANI  #02             ..TEST WORK BIT FOR
2605            ..                   ..  LOAD SHED
2606            BZ   SCAN10          ..BR IF ALREADY LOAD SHED
2607            SEP  CALL
2608            ,A(IOTRFR)           ..FORMAT S/R LOAD SHED
2609            ,#FF
2610            GHI  FLGWRD
```

```
2611              ORI  #04           ..SET LOAD SHED
2612              PHI  FLGWRD        .. RESPONSE FLAG
2613              SEP  RETURN        ..EXIT SUBROUTINE
2614  SCAN10:     GLO  FLGWRD
2615              ANI  #80           ..CK FLGWRD FOR ALARM
2616              BNZ  SCAN11        ..BR IF ALARM DETECTED
2617              SEP  CALL
2618              ,A(IOTRFR)         ..FORMAT 21 INSTRUCTION
2619              ,#00
2620              SEP  RETURN        ..EXIT SUBROUTINE
2621
2622  ..ALARM DETECTED..
2623
2624  SCAN11:     SEP  CALL
2625              ,A(IOTRFR)         ..FORMAT 52 INSTRUCTION
2626              ,#01
2627              SEP  RETURN        ..EXIT SUBROUTINE
2628
2629
2630
2631
2632  ...........................
2633  ..RXWDCT SUBROUTINE..........
2634  ...........................
2635
2636  ..RECEIVE WORD COUNT SUBROUTINE..
2637
2638            ..PARAMETERS PASSED..
2639            ..- ON ENTRY TMP1(LO) CONTAINS THE
2640            ..  TRANSPONDER INSTRUCTION
2641            ..- ON RETURN TMP1(HI) -> 00 FOR VALID INST.
2642            ..                     -> FF FOR ILLEGAL INST
2643            ..- RAM LOC. "WRDCNT" CONTAINS THE EXPECTED
2644            ..  NUMBER OF WORDS TO BE RECEIVED
2645
2646
2647  RXWDCT:  LDI  A.O(WRDCNT)  ..FETCH WORD COUNT LOC.
2648           PLO  BASE
2649           LDI  #00
2650           STR  BASE
2651           INC  BASE
2652           GLO  TMP1           ..FETCH INSTRUCTION
2653           XRI  #08            ..TEST FOR 08 INSTRUCTION
2654           BZ   RXWX1          ..BR; FOUND TRNSP. MEM TST
2655           GLO  TMP1
2656           ANI  #05
2657           XRI  #05            ..TEST FOR X5 OR X7
2658           BZ   RXW9           ..BR TO FORMAT 9 WORDS
2659           GLO  TMP1
2660           ANI  #EB
2661           BZ   RXW9           ..X4; X= 0 OR 1
2662           GLO  TMP1           ..BR TO FORMAT 9 WORDS
2663           ANI  #CF            ..X6; X= 0,1,2,OR 3
2664           XRI  #06            ..MAKE SURE ITS A 6
2665           BZ   RXW9           ..BR TO FORMAT 9 WORDS
```

```
2666            GLO TMP1
2667            ANI #03             ..MASK BITS 0 AND 1
2668            PHI TMP1
2669            XRI #03             ..TEST FOR X3
2670            BZ RXWX3            ..BR TO COMPLETE X3
2671            GHI TMP1
2672            XRI #02             ..TEST FOR X2
2673            BZ RXWX2            ..BR TO COMPLETE X2
2674            GHI TMP1
2675            XRI #01             ..TEST FOR X1
2676            BNZ ERROR           ..BR IF ILL. INST
2677
2678    ..TEST X1 SERIES..
2679
2680            GLO TMP1
2681            ANI #F0
2682            BZ ERROR            ..01 IS ILL. INST.
2683            PHI TMP1
2684            XRI #10             ..TEST FOR 11 INST.
2685            BZ RXW14            ..BR TO FORMAT 14 WORDS
2686            GHI TMP1
2687            XRI #20             ..TEST FOR 21 INST.
2688            BZ RXW9             ..BR TO FORMAT 9 WORDS
2689            GHI TMP1
2690            XRI #30             ..TEST FOR 31 INST.
2691            BZ RXW18            ..BR TO FORMAT 18 WORDS
2692    RXWX1:  GLO FLGWRD
2693            ORI #08             ..SET PEAK DEMAND FLAG
2694            PLO FLGWRD
2695            LDI #25
2696            STR BASE
2697            DEC BASE
2698            LDI #04             ..0425 WORDS IS MAX
2699            STR BASE
2700            LDI #00
2701            BR RXEXIT           ..BR TO EXIT
2702
2703    ..TEST X2 SERIES..
2704
2705    RXWX2:  GLO TMP1
2706            ANI #F0
2707            BZ ERROR            ..02 IS ILL. INST.
2708            ANI #C0
2709            BZ RXW14            ..BR TO FORMAT 14 WORDS
2710            ANI #80
2711            BNZ ERROR           ..BR ON ILL. INST.
2712            GLO TMP1
2713            ANI #20             ..62,72 ARE ILLEGAL
2714            BNZ ERROR           ..BR ON ILL. INST.
2715            BR RXW9             ..BR TO FORMAT 9 WORDS
2716
2717    ..TEST X3 SERIES..
2718
2719    RXWX3:  GLO TMP1
2720            ANI #F0
2721            BZ ERROR            ..03 IS ILL. INST.
```

```
2722            PHI TMP1
2723            XRI #40
2724            BZ ERROR         ..43 IS ILL. INST.
2725            GHI TMP1
2726            XRI #80
2727            BZ ERROR         ..83 IS ILL. INST.
2728            GHI TMP1
2729            XRI #90
2730            BZ ERROR         ..93 IS ILL. INST.
2731            GHI TMP1
2732            XRI #A0
2733            BZ ERROR         ..A3 IS ILL. INST.
2734            GHI TMP1
2735            XRI #B0
2736            BZ ERROR         ..B3 IS ILL. INST.
2737            GHI TMP1
2738            XRI #C0
2739            BZ ERROR         ..C3 IS ILL. INST.
2740            GHI TMP1
2741            ANI #80
2742            BNZ RXW14        ..BR IF RESP. CMND
2743            GHI FLGWRD
2744            ORI #40          ..SET "EXPECT NO RESP."
2745            PHI FLGWRD
2746
2747 ..FORMAT WORD COUNT..
2748
2749 RXW18:     LDI 18           ..18 WORDS (DEC)
2750            LSKP
2751 RXW14:     LDI 14           ..14 WORDS (DEC)
2752            LSKP
2753 RXW9:      LDI 9            ..9 WORDS (DEC)
2754            STR BASE         ..STORE WORD COUNT
2755            LDI #00
2756            LSKP
2757
2758 ..FORMAT ILLEGAL INSTRUCTION..
2759
2760 ERROR:     LDI #FF
2761 RXEXIT:    PHI TMP1
2762            SEP RETURN       ..EXIT SUBROUTINE
2763
2764
2765
2766 ..............................
2767 ..PRQSR SUBROUTINE.............
2768 ..............................
2769
2770 ..PROCESS TRANSPONDER SPECIAL REQUEST
2771 ..      1) FIND SIZE BY RCVE WORDS -4 +11(HEADER)
2772 ..      2) FORMAT HEADER
2773 ..      3) DO PARITY
2774 ..      4) SET UP BUS
2775
2776 ..FIND MESSAGE SIZE..
2777
```

```
2778 PROSR:   LDI  A.0(FRMOLD)
2779          PLO  BASE
2780          LDA  BASE
2781          PHI  TMP2         ..TMP2 CONTAINS FRMOLD PTR
2782          LDN  BASE
2783          PLO  TMP2
2784          SEX  BASE         ..ADDR LSB OF FRMOLD
2785          GLO  DNINPT
2786          SM                ..SUBTRACT FROM END OF
2787          STR  TMP2         ..STORE LSB OF SIZE
2788          INC  TMP2
2789          GHI  DNINPT
2790          DEC  BASE         ..ADDRESS MSB OF DNIOLD
2791          SMB               ..SUBTRACT MSB'S WITH BORROW
2792          STR  TMP2         ..STORE MSB OF SIZE
2793          LDI  #11          ..CONTROL WORD FOR S/R RESP.
2794          INC  TMP2
2795          STR  TMP2         ..STORE CONTROL WORD
2796          LDI  A.0(PROOLD)  ..FETCH START ADDRESS
2797          PLO  BASE         .. OF INPUT MESSAGE
2798          LDA  BASE
2799          PHI  TMP4
2800          LDN  BASE
2801          PLO  TMP4
2802          INC  TMP4         ..ADDRESS MESSAGE INDEX
2803          INC  TMP4         .. AND SMCT NUMBERS.
2804          INC  TMP4
2805          LDI  #05          ..TRNSFR DATA TO O/P BUFFER
2806          PLO  BASE
2807          INC  TMP2
2808 PROSR1:  LDA  TMP4
2809          STR  TMP2
2810          INC  TMP2
2811          DEC  BASE
2812          GLO  BASE
2813          LBNZ PROSR1       ..BR IF LOOP NOT DONE
2814          LDI  A.0(CSWWRD)  ..FETCH CSWWRD AND STORE
2815          PLO  BASE
2816          LDN  BASE
2817          STR  TMP2
2818          GHI  DNINPT
2819          PHI  TMP4
2820          GLO  DNINPT
2821          PLO  TMP4
2822          SEP  CALL
2823          ,A(PARITY)        ..CALC. PARITY
2824          ,A.0(FRMOLD)      .. AND STORE IT
2825          ,#1F
2826          ,#01
2827          INC  TMP4         ..POINT TO NEXT LOCATION
2828          SEP  CALL
2829          ,A(FRMCHK)        ..ENTER LAST OF FRMES TO
2830          ,#0F              .. CLEAR OUT LAST S/R
2831          SEP  RETURN       ..EXIT SUBROUTINE
```

```
2832
2833
2834
2835
2836  ................................
2837  ..PROSCN SUBROUTINE..........
2838  ................................
2839
2840  ..PROCESS SCAN RESPONSES..
2841
2842  PROSCN:  LDI A.0(RETRY)
2843           PLO BASE
2844           LDI #00
2845           STR BASE          ..RESET RETRIES
2846           LDI A.0(DBSPTR+#01)
2847           PLO BASE
2848           LDN BASE
2849           ADI #06           ..OFFSET BY 6 FOR ERROR
2850           PLO TMP1          .. PASS COUNTER
2851           DEC BASE
2852           LDN BASE
2853           ADCI #00
2854           PHI TMP1
2855           LDI #00
2856           STR TMP1          ..RESET ERROR PASS CNTR
2857           GLO FLGWRD
2858           ANI #80
2859           BZ PROSC2         ..BR IF NOT 52 RESPONSE
2860           GLO FLGWRD
2861           ANI #7F           ..RESET FORMAT 52 FLAG
2862           PLO FLGWRD
2863  PROSC1:  SEP RETURN        ..EXIT; 52 RESP.IS 00'S
2864
2865  PROSC2:  GHI FLGWRD
2866           ANI #04           ..TEST FOR LOAD SHED RESP
2867           BZ PROSC6         ..BR; NOT L/S RESPONSE
2868           DEC TMP1
2869           DEC TMP1          ..ADDR FUNCTION WORD
2870           LDN TMP1
2871           ANI #FD           ..RESET LOAD SHED
2872           STR TMP1          .. WORK BIT
2873           GHI FLGWRD
2874           ANI #FB           ..RESET LOAD SHED
2875           PHI FLGWRD        .. RESPONSE  FLAG
2876           INC TMP1
2877           INC TMP1
2878  PROSC6:  INC TMP1
2879           INC TMP1          ..ADDR ALARM PASS CNTR
2880
2881           GHI DNOUPT        ..DUMPED FUNCTION WORD
2882           ANI #08           ..TEST FOR ERROR DISABLE
2883           BNZ PROSC1        ..EXIT; ERRORS DISABLED
2884
2885           GHI DNOUPT        ..FUNCTION WORD
2886           ANI #04           ..TEST ALARM SERVICE
2887           BZ PROSC7         ..BR; CUS NO SUBSCRIBE
```

```
2888
2889            GLO DNOUPT          ..DUMPED ALARMS/STATUS
2890            ANI #20             ..TEST FOR FIRE ALARM
2891            BNZ PROSC3          ..BR; ALARM DETECTED
2892
2893 PROSC7:    GHI DNOUPT          ..FUNCTION WORD
2894            ANI #80             ..TEST FOR INTRUSION SER.
2895            BZ PROSC4           ..BR; CUS NO SUBSCRIBE
2896
2897            GLO DNOUPT          ..ALARMS/STATUS
2898            ANI #40             ..TEST FOR ARMING BIT SET
2899            BZ PROSC4           ..BR; ARMING BIT NOT SET
2900
2901            GLO DNOUPT          ..ALARMS/STATUS
2902            ANI #80             ..TEST FOR INTRUDER ALARM
2903            BZ PROSC4           ..BR; ALARM NOT DETECTED
2904
2905 PROSC3:    LDI A.0(DNLDA5)     ..FETCH ALARM PASSES
2906            PLO BASE            ;. MAXIMUM
2907            SEX TMP1
2908            LDN BASE
2909            XOR                 ..COMPARE COUNTER WITH MAX
2910            BNZ PROSC5          ..BR IF PASSES < MAX
2911            STR TMP1
2912            PLO TMP2            ..00 -> WORD 3
2913            LDI A.0(ERWRD1)     ..LOAD ERWRD1 WITH
2914            PLO BASE            .. TRANSPONDER ALARM
2915            LDI #70
2916            STR BASE
2917            GLO DNOUPT          ..ALARMS /STATUS
2918            PHI TMP2            ..   -> WORD 2
2919            SEP CALL
2920            ,A(FRMES)
2921            ,#F0
2922            SEP RETURN          ..EXIT SUBROUTINE
2923
2924 ..RESET ALARM PASS COUNTER..
2925
2926 PROSC4:    STR TMP1             ..00-> ALARM PASS CNTR
2927            SEP RETURN          ..EXIT SUBROUTINE
2928
2929 ..INCREMENT PASS COUNTER..
2930
2931 PROSC5:    LDN TMP1
2932            ADI #01             ..ADD 1 TO PASS CNTR
2933            STR TMP1
2934            GHI FLGWRD
2935            ORI #80             ..SET RETRY FLAG
2936            PHI FLGWRD
2937            GLO FLGWRD
2938            ORI #80             ..SET FORMAT 52 INST
2939            PLO FLGWRD
2940            SEP RETURN          ..EXIT SUBROUTINE
2941
2942 ........................................
2943 ..IOSEC SUBROUTINE...................
```

```
2944          ........................................
2945
2946          ..CALL SEQUENCE
2947
2948          ..      SEP CALL
2949          ..      ,A(IOSEC)
2950          ..
2951          ..RETURN PARAMETERS
2952          ..      ERWRD1 WILL CONTAIN
2953          ..      THE TYPE OF ERROR
2954          ..      TMP2 (HI) -WORD 2
2955          ..      TMP2 (LO) -WORD 3
2956
2957
2958 IOSEC:   LDI A.O(DNIOLD)
2959          PLO BASE
2960          LDA BASE
2961          PHI TMP1
2962          LDN BASE        ..TMP1 ADDRESSES START
2963          PLO TMP1        ..OF RX MESSAGE
2964          LDI A.O(DBSPTR)
2965          PLO BASE
2966          LDA BASE
2967          PHI TMP4
2968          LDN BASE
2969          PLO TMP4        ..TMP4 ADDR CHANNEL #
2970          INC TMP4        ..ADDR TID IN DATA BASE
2971          SEX TMP4
2972
2973 ..TEST FOR TID..
2974
2975          INC TMP1        ..ADDR TID FROM RESP.
2976          LDA TMP1        ..LOAD TID FROM RESP.
2977          XOR             ..COMPARE TID'S
2978          BZ IOSEC1       ..BR; TID IS OK
2979          LDA TMP4
2980          PHI TMP2        ..TID -> WORD 2
2981          INC TMP4
2982          LDN TMP4        ..TXD,BDR -> WORD 3
2983          PLO TMP2
2984          BR IOSEC3       ..BR TO CONTINUE ERR MESS
2985
2986
2987 ..TEST FOR CID..
2988
2989 IOSEC1:  IRX             ..ADDR CID FROM D.B.
2990          LDA TMP1        ..LOAD CID FROM RESP.
2991          XOR             ..COMPARE CID'S
2992          BZ IOSEC2       ..BR; CID IS OK
2993          LDN TMP4
2994          PHI TMP2        ..TX CID -> WORD 2
2995          DEC TMP1
2996          LDN TMP1
2997          PLO TMP2        ..RX CID -> WORD 3
2998          LDI A.O(ERWRD1)
2999          PLO BASE
```

```
3000            LDI #20             ..20 FOR LINE X'ed ERROR
3001            BR IOSEC9           ..BR TO EXIT
3002
3003    ..TEST BAUD RATE AND TXDELAY..
3004
3005    IOSEC2: IRX
3006            LDA TMP1            ..FETCH TXD,BDR OF RESP.
3007            XOR                 ..COMPARE BAUD RATES
3008            BZ IOSEC4           ..BR; TXD,BDR IS OK
3009            LDN TMP4
3010            PLO TMP2            ..TXD;BDR -> WORD 3
3011            DEC TMP1
3012            DEC TMP1
3013            DEC TMP1
3014            LDN TMP1
3015            PHI TMP2            ..TID -> WORD 2
3016    IOSEC3: LDI A.0(ERWRD1)
3017            PLO BASE
3018            LDI #30             ..30 FOR SECURITY ERROR
3019            BR IOSEC9           ..BR TO EXIT
3020
3021    ..TEST RELAYS FOR CHANGES..
3022
3023    IOSEC4: IRX                 ..ADDR RELAY STATUS OF D.B.
3024            LDA TMP4            ..ADDR FUNCTION WORD
3025            PHI DNOUPT          ..SAVE FOR PROSCN
3026            LDN TMP1            ..FETCH STATUS OF RESP.
3027            PLO DNOUPT          ..SAVE FOR PROSCN
3028            ANI #1F             ..MASK FOR STATUS
3029            PLO TMP2            ..SAVE RECEIVED STATUS
3030            XOR                 ..COMPARE WITH D.B.
3031            BZ IOSECA           ..BR; RELAYS ARE OK
3032            GLO FLGWRD
3033            ORI #20             ..SET S/F FLAG
3034            PLO FLGWRD
3035            LDN TMP4            ..FETCH EXPECTED STATUS
3036            PHI TMP2            ..SAVE IN TMP2(HI)
3037            LDI A.0(ERWRD1)
3038            PLO BASE
3039            LDI #50             ..50 FOR BAD RELAY
3040
3041    IOSEC9: STR BASE
3042            LDI #FF
3043            PLO TMP4
3044            SEP RETURN          ..EXIT SUBROUTINE; ERRORS
3045
3046    ..SECURITY CHECK ON RESPONSE IS OK..
3047
3048    IOSECA: PLO TMP4            ..00 -> TMP2(LO)
3049            GHI FLGWRD          ..SET FLG IN FLGWRD
3050            ANI #7F             .. TO DENOTE NO MORE
3051            PHI FLGWRD          .. RETRIES
3052            SEP RETURN          ..EXIT SUBROUTINE; NO ERR
3053
3054
3055
```

```
3056  ........................................
3057  ..IOERPR SUBROUTINE...................
3058  ........................................
3059
3060           ..CALL SEQUENCE
3061           ..      SEP CALL
3062           ..      ,A(IOERPR)
3063           ..
3064           ..ERROR WORDS 1,2,AND 3
3065           ..ARE PASSED THROUGH TO
3066           ..FRMES IF RETRIES AND
3067           ..PASSES ARE COMPLETE
3068
3069  IOERPR:  LDI A.0(DBSPTR) ..FETCH DATA BASE PNTR
3070           PLO BASE
3071           LDA BASE
3072           PHI TMP1
3073           LDN BASE
3074           ADI #04          ..OFFSET BY FOUR FOR
3075           PLO TMP1         .. FUNCTION WORD
3076           GHI TMP1
3077           ADCI #00
3078           PHI TMP1         ..TMP1 ADRESSES
3079           LDA TMP1
3080           ANI #08          ..TEST FOR ERROR DISABLE
3081           LBNZ IOERP2      ..BR; ERRORS DISABLED
3082           LDI A.0(RETRY)
3083           PLO TMP4
3084           GHI BASE
3085           PHI TMP4         ..RETRY CNTR -> TMP4
3086           LDI A.0(DNLDA1)  ..FETCH RETRY MAX
3087           PLO BASE
3088           SEX BASE
3089           LDN TMP4
3090           XOR              ..COMPARE COUNTER AND MAX
3091           BZ IOERP3        ..BR; RETRIES DONE
3092           LDN TMP4
3093           ADI #01          ..INCREMENT RETRY
3094           STR TMP4         .. COUNTER AND STORE
3095
3096  ..DECREASE BAUD RATE AND TRY AGAIN..
3097
3098           LDI A.0(CNTOP1)
3099           PLO BASE
3100           LDN BASE
3101           ANI #03          ..MASK BAUD RATE BITS
3102           BZ IOERP1        ..BR IF BAUD RATE = 150
3103           LDN BASE         ..DECREMENT B.RATE
3104           SMI #01          ..*BUG OF THE MONTH*
3105           STR BASE
3106  IOERP1:  GHI FLGWRD       ..SET FLGWRD BIT 15
3107           ORI #80          .. FOR RETRY SAME CUS
3108           PHI FLGWRD
3109  IOERP2:  SEP RETURN       ..EXIT SUBROUTINE
3110
3111  ..COMPLETED RETRIES..CHECK PASSES..
```

```
3112
3113 IOERP3: STR TMP4            ..RESET RETRY CNTR
3114         INC BASE            ..ADDR PASS MAX
3115         INC TMP1            ..ADDR PASS COUNTER
3116         LDN TMP1
3117         XOR                 ..COMPARE MAX WITH CNTR
3118         BZ IOERP4           ..BR; PASSES ARE DONE
3119         LDN TMP1
3120         ADI #01
3121         STR TMP1
3122         SEP RETURN          ..INC PASSES & EXIT
3123
3124 ..PASSES COMPLETED FORMAT ERROR..
3125
3126 IOERP4: STR TMP1
3127         SEP CALL
3128         ,A(FRMES)           ..FORMAT ERROR MESSAGE
3129         ,#F0                .. ERWRD1, TMP2(HI) + (LO)
3130         SEP RETURN          ..PREVIOUSLY DETERMINED
3131
3132
3133
3134 ........................................
3135 ..IOTRFR SUBROUTINE....................
3136 ........................................
3137
3138         ..CALL SEQUENCE
3139         ..      SEP CALL
3140         ..      ,A(IOTRFR)
3141         ..      ,#XX
3142         .. XX= FF LOAD SHED FORMAT
3143         ..     00 FOR 21 INSTR.
3144         ..     01 FOR 52 INSTR.
3145
3146 IOTRFR: LDI A.0(DNOOLD)
3147         PLO BASE
3148         LDA BASE
3149         PHI DNOUPT          ..RESET DNOUPT
3150         LDN BASE
3151         PLO DNOUPT
3152         LDI A.0(WRDCNT)
3153         PLO BASE
3154         LDI #00
3155         STR BASE
3156         INC BASE
3157         LDI #09             ..SET RX WORD COUNT
3158         STR BASE            .. TO 9 WORDS
3159         LDI #FF
3160         STR DNOUPT          ..#FF-> WORD 1
3161         LDI A.0(DBSPTR)
3162         PLO BASE            ..DATA BASE
3163         LDA BASE            .. POINTER
3164         PHI TMP1            .. ADDRESSED
3165         LDN BASE            .. BY TMP1
3166         PLO TMP1
3167         INC TMP1
```

```
3168            LDA TMP1         ..FETCH TID
3169            INC DNOUPT
3170            STR DNOUPT       ..TID -> WORD 2
3171            INC DNOUPT       ..READY FOR WORD #3
3172            SEX LINK
3173            GLO FLGWRD
3174            ANI #20          ..TEST FOR S/F
3175            BZ IOTRF2        ..BR; IF NOT S/F
3176            SEP CALL
3177            ,A(SHIFT)        ..FORMAT RELAY WORD
3178            INC DNOUPT       ..ADDR. FOR PARITY BYTE
3179            INC TMP1         ..ADDR. TXD,BDR
3180            BR IOTRF5        ..BR TO DETERMINE RX BDR
3181 IOTRF2:    LDI #FF          ..TEST FOR LOAD SHED
3182            XOR
3183            BZ IOTRF1        ..BR IF L/S FORMAT REQ.
3184            LDI #01
3185            XOR
3186            BZ IOTRF3        ..BR IF 52 INST. REQ.
3187            LDI #21          ..INSTRUCTION 21
3188            LSKP
3189 IOTRF3:    LDI #52          ..INSTRUCTION 52
3190            STR DNOUPT       .. GOES TO WORD 3
3191            INC TMP1
3192            INC DNOUPT
3193            LDN TMP1
3194            ANI #03          ..NAB JUST BAUD RATE
3195            STR DNOUPT       ..TXD,BDR -> WORD 4
3196            GHI FLGWRD
3197            ANI #80          ..TEST FOR RETRY
3198            BZ IOTRF5        ..BR IF NOT A RETRY
3199            LDI A.O(CNTOP1)  ..FETCH CONTROL O/P 1
3200            PLO BASE
3201            LDN BASE
3202            ANI #03          ..NAB JUST BDR BITS
3203            STR DNOUPT       ..PUT INTO WORD 4
3204            BR IOTRF4        ..BR; CALCULATE PARITY
3205
3206 ..NO RETRY - DETERMINE RX BDR FROM DATA BASE..
3207
3208 IOTRF5:    LDI A.O(CNTOP1)
3209            PLO BASE
3210            LDN BASE
3211            ANI #FC
3212            STR BASE         ..CLEAR BAUD RATE
3213            SEX BASE
3214            LDN TMP1
3215            ANI #03          ..NAB JUST BAUD RATE
3216            ADD              ..ADD ON THE BAUD RATE
3217            STR BASE         ..STORE RX BAUD RATE
3218
3219 ..DO PARITY ON THE MESSAGE BLOCK..
3220
3221 IOTRF4:    LDI A.O(DNOOLD)
3222            PLO BASE
3223            LDA BASE
```

```
3224            PHI TMP1
3225            LDN BASE
3226            PLO TMP1
3227            SEX TMP1            ..ADDRESS WORD 1
3228            LDXA                ..LOAD AND ADDRESS
3229            XOR                 .. WORD 2
3230            IRX                 ..ADDRESS WORD 3
3231            XOR                 ..EXCLUSIVE OR
3232            IRX                 ..ADDRESS WORD 4
3233            XOR
3234            INC DNOUPT          ..ADDRESS WORD 5
3235            STR DNOUPT          ..STR PARITY INTO WORD 5
3236            INC LINK
3237            SEP RETURN          ..EXIT SUBROUTINE
3238
3239    ..LOAD SHED FORMAT..
3240
3241    IOTRF1: LDI A.0(PROOLD)     ..START OF S/R FILE
3242            PLO BASE
3243            LDA BASE
3244            PHI TMP1
3245            LDN BASE
3246            ADI #08             ..OFFSET BY EIGHT
3247            PLO TMP1
3248            GHI TMP1
3249            ADCI #00
3250            PHI TMP1
3251            LDA TMP1
3252            STR DNOUPT          ..STR WORD 3
3253            LDN TMP1            ..LOAD SECOND WORD
3254            INC DNOUPT
3255            STR DNOUPT          ..TXD,BDR -> WORD 4
3256
3257    ..DETERMINE RECEIVE BAUD RATE FOR RELAY CMND..
3258
3259            LDI A.0(DBSPTR)
3260            PLO BASE
3261            LDA BASE
3262            PHI TMP1
3263            LDN BASE
3264            PLO TMP1
3265            INC TMP1            ..ADDR TID
3266            INC TMP1
3267            INC TMP1            ..ADDR TXD,BDR
3268            BR IOTRF5           ..BR BACK TO COMPLETE
3269
3270
3271
3272
3273    ..........................................
3274    ..IOCNT SUBROUTINE.........................
3275    ..........................................
3276
3277            ..CALL SEQUENCE
3278            ..      SEP CALL
3279            ..           ,A(IOCNT)
```

```
3280
3281 IOCNT:   LDI A.O(ERWRD1)  ..FETCH RAM LOC. FOR
3282          PLO BASE         .. 1st ERROR DATA BYTE
3283          LDI #DO          ..SET 1st WORD TO DO
3284          STR BASE
3285          LDI A.O(DBSPTR)  ..FETCH START OF DATA
3286          PLO BASE         .. BASE FILE
3287          INC BASE
3288          LDN BASE
3289          ADI #04          ..OFFSET POINTER BY 4
3290          PLO TMP6         .. TO ADDR FUNCTION
3291          DEC BASE         .. WORD IN THE D.B.
3292          LDA BASE
3293          ADCI #00
3294          PHI TMP6
3295          LDI #00          ..INITIALIZE TMP4
3296          PLO TMP5         .. TO ZERO
3297          GHI BASE
3298          PHI TMP3
3299
3300 ..TEST FOR LOAD SHED..
3301
3302 IOCNT1:  LDN TMP6
3303          ANI #02          ..CHECK LOAD SHED BIT
3304          BZ IOCNT2        ..BR IF LOAD SHED
3305
3306          INC TMP5         ..INC UNSHED COUNT
3307          LDI #00
3308          PLO TMP2
3309          PHI TMP2
3310          SEP CALL         ..FORMAT ERR MESS.;
3311          ,A(FRMES)        .. CUSTOMER IS UNSHED
3312          ,#FO             ..GET C & T FROM D.B.
3313
3314 ..INCREMENT PNTR TO NEXT D.B. ..
3315
3316 IOCNT2:  GLO TMP6
3317          ADI #0A          ..OFFSET POINTER BY 10
3318          PLO TMP6
3319          GHI TMP6         ..TO ADDR NEXT CUSTOMER'S
3320          ADCI #00
3321          PHI TMP6         ..FUNCTION WORD
3322          LDI A.O(DBSPTR+#01)
3323          PLO BASE
3324          LDN BASE
3325          ADI #0A          ..OFFSET DATA BASE
3326          STR BASE         .. POINTER ALSO
3327          DEC BASE
3328          LDN BASE
3329          ADCI #00
3330          STR BASE
3331          INC BASE
3332
3333 ..CHECK FOR END OF DATA BASE..
3334
3335          LDI A.O(DBSEND)  ..FETCH ADDR OF END
```

```
3336            PLO TMP3            .. OF D. B.
3337            INC TMP3
3338            SEX TMP3
3339            GLO TMP6
3340            SD                  ..SUBTRACT D
3341            DEC TMP3
3342            GHI TMP6
3343            SDB                 ..SUBTRACT D WITH BORROW
3344            LBDF IOCNT1         ..BR IF NOT AT END
3345            DEC BASE
3346            LDI A.O(DBSSTR)     ..FETCH THE START
3347            PLO TMP3
3348            LDA TMP3
3349            STR BASE
3350            INC BASE
3351            LDN TMP3
3352            STR BASE            ..RESET DATA BASE PNTR
3353            LDI A.O(CSWWRD)
3354            PLO BASE
3355            GLO TMP5            ..FETCH COUNT OF UNSHEDS
3356            STR BASE
3357            SEP CALL
3358            ,A(FRMES)           ..ACKNOWLEDGE LOAD
3359            ,#OF                .. SHED IS COMPLETED
3360            SEP RETURN          ..EXIT SUBROUTINE
3361
3362
3363
3364 ............................
3365 ..IOSET SUBROUTINE................
3366 ............................
3367
3368            ..CALL SEQUENCE
3369            ..      SEP CALL
3370            ..        ,A(IOSET)
3371            ..        ,#XX
3372            ..  XX= FF FOR SET= 1
3373            ..      00 FOR RESET= 0
3374
3375 IOSET:     LDI A.O(DBSSTR)  ..FETCH START OF
3376            PLO BASE         .. BASE FILE
3377            INC BASE
3378            LDN BASE
3379            ADI #04          ..OFFSET POINTER BY 4
3380            PLO TMP4         .. TO ADDR FUNCTION
3381            DEC BASE         .. WORD IN THE D.B.
3382            LDN BASE
3383            ADCI #00
3384            PHI TMP4
3385
3386 ..CHECK FOR SUBSCRIBER..
3387
3388 IOSET1:    LDN TMP4
3389            ANI #01
3390            BZ IOSET2        ..BR IF NOT SUBSCRIBER
3391
```

```
3392 ..SET OR RESET..
3393
3394          LDN LINK
3395          BZ IOSET3          ..BR FOR RESET
3396          INC TMP4           ..ADDR. RELAY STATUS WORD
3397          SEP CALL
3398          ,A(BRKDWN)         ..BREAK DOWN INST -> STATUS
3399          DEC TMP4           ..ADDR. FUNCTION WORD
3400          LDN TMP4
3401          ORI #02            ..SET TO 1
3402          BR IOSET2
3403 IOSET3:  LDN TMP4
3404          ANI #FD            ..SET TO 0
3405
3406 ..INCREMENT PNTR TO NEXT D.B. ..
3407
3408 IOSET2:  STR TMP4
3409          GLO TMP4
3410          ADI #0A            ..SKIP 10 WORDS
3411          PLO TMP4           .. VIA DOUBLE PRECISION
3412          GHI TMP4           .. ADD
3413          ADCI #00
3414          PHI TMP4
3415
3416 ..CHECK FOR END OF DATA BASE..
3417
3418          LDI A.0(DBSEND)    ..FETCH ADDR OF END
3419          PLO BASE           .. OF D.B.
3420          INC BASE
3421          SEX BASE
3422          GLO TMP4
3423          SD                 ..SUBTRACT D
3424          DEC BASE
3425          GHI TMP4
3426          SDB                ..SUBTRACT D WITH BORROW
3427          BDF IOSET1         ..BR IF NO BORROW
3428          INC LINK
3429          SEP RETURN         ..EXIT SUBROUTINE
3430
3431
3432
3433
3434 ..........................................
3435 ..GENDB..GENERATE WORKING DATA BASE..........
3436 ..........................................
3437
3438 GENDB:   SEP RETURN
3439
3440
3441 ..........................................
3442 ..RXBDR SUBROUTINE........................
3443 ..........................................
3444
3445 ..CALCULATE RX BAUD RATE (FOR S/R)..
3446 ..FOR X1,X2,X6,X7, 2nd DATA BYTE OF S/R ->CNTOP1
3447 ..FOR X3,X4,X5, SEARCH DATA BASE FOR RX BAUD RATE
```

```
3448 ..                    IF NOT IN D.B. FORMAT CODE ERROR
3449 .. NOTE XN IS THE TRANSPONDER INST.(1st DATA BYTE)
3450
3451 ..ON ENTRY  M(TMP3) CONTAINS 1st DATA BYTE
3452 ..ON EXIT CNTOP1 WILL CONTAIN RX BAUD RATE
3453 ..ON EXIT IF TMP1(HI) IS NOT 0 FORMAT CODE ERROR
3454 ..ON EXIT TMP3 ADDRESSES 2nd DATA BYTE
3455
3456 RXBDR:   LDN TMP3           ..FETCH 1st DATA BYTE
3457          ANI #0F            ..MASK FOR BITS 0 - 3
3458          PLO TMP1
3459          XRI #03            ..TEST FOR X3
3460          BZ RXBDR2          ..BR; X3 INST. FOUND
3461          GLO TMP1
3462          XRI #04            ..TEST FOR X4
3463          BZ RXBDR2          ..BR; X4 INST. FOUND
3464          GLO TMP1
3465          XRI #05            ..TEST FOR X5
3466          BZ RXBDR2          ..BR; X5 INST. FOUND
3467          GLO TMP1
3468          XRI #08            ..TEST FOR MEM TST
3469          BZ RXBDR2          ..BR; 08 INST. FOUND
3470          INC TMP3
3471          LDI A.0(CNTOP1)
3472          PLO BASE           ..ACCESS CNTOP1 VIA BASE
3473          GHI FLGWRD
3474          ANI #80            ..TEST FOR RETRY
3475          BZ RXBDR9          ..BR IF NOT RETRY
3476          LDN BASE
3477          ANI #03
3478          BZ RXBDRA          ..BR ALREADY ZERO
3479          LDN BASE
3480          SMI #01            ..DECREMENT THE BAUD RATE
3481          STR BASE
3482          ANI #03
3483          STR TMP3
3484          BR RXBDRA          ..BR;THIS WON'T WORK
3485 RXBDR9:  LDN BASE
3486          ANI #FC            ..CLEAR OUT OLD BAUD RATE
3487          STR BASE
3488          LDN TMP3           ..FETCH 2nd DATA BYTE
3489 RXBDR1:  ANI #03            ..MASK FOR LAST 2 BYTES
3490          SEX BASE
3491          OR
3492 RXBDRB:  STR BASE           ..RX BAUD RATE -> CNTOP1
3493 RXBDRA:  LDI #00
3494          PHI TMP1           ..ACK NO PROBLEM ON RETURN
3495          SEP RETURN         ..EXIT SUBROUTINE
3496
3497 ..SEARCH DATA BASE FOR RX BAUD RATE..
3498
3499 RXBDR2:  DEC TMP3           ..ADDR WORD #8
3500          DEC TMP3           .. FOR CUSTOMER NUMBER
3501          LDI A.0(DBSSTR)    ..FETCH START OF D.B.
3502          PLO BASE
3503          LDA BASE
```

```
3504            PHI TMP4
3505            LDN BASE
3506            PLO TMP4
3507 RXBDR3:    LDI A.0(DBSEND)
3508            PLO BASE
3509            SEX BASE
3510            GHI TMP4
3511            SD                  ..END - PNTR
3512            BNZ RXBDR4
3513            INC BASE
3514            GLO TMP4
3515            SD                  ..END - PNTR
3516            BZ RXBDR6           ..BR IF AT END
3517 RXBDR4:    SEX TMP3
3518            LDN TMP4
3519            XOR
3520            BZ RXBDR7           ..BR IF CHANNEL MATCH
3521 RXBDR5:    GLO TMP4
3522            ADI #0A             ..OFFSET TO NEXT CUS
3523            PLO TMP4            .. DATA BASE
3524            GHI TMP4
3525            ADCI #00            ..DOUBLE PRECISION ADD
3526            PHI TMP4
3527            BR RXBDR3           ..BR BACK TO LOOK FOR MATCH
3528
3529 ..AT END OF DATA BASE WITH NO MATCH FOUND..
3530
3531 RXBDR6:    LDI #FF
3532            PHI TMP1            ..FORMAT CODE ERROR ON
3533            SEP RETURN          .. RETURN FROM SUBROUTINE
3534
3535 ..CHANNEL MATCH FOUND WITHIN DATA BASE..
3536
3537 RXBDR7:    INC TMP4            ..ADDR TID IN DATA BASE
3538            INC TMP3            ..ADDR TID IN S/R
3539            LDN TMP4
3540            XOR                 ..TEST FOR TID MATCH
3541            BZ RXBDR8           ..BR IF TID MATCHES
3542            DEC TMP4
3543            DEC TMP4
3544            BR RXBDR5           ..BR TO CHECK NEXT CHAN.
3545
3546 ..CHANNEL AND TID MATCH FOUND..
3547
3548 RXBDR8:    INC TMP4            ..ADDR CID IN DATA BASE
3549            INC TMP4            ..ADDR TXD,BDR IN D.B.
3550            INC TMP3            ..ADDR 1st DATA BYTE
3551            INC TMP3            ..ADDR 2nd DATA BYTE
3552            LDI A.0(CNTOP1)
3553            PLO BASE            ..ACCESS CNTOP1 VIA BASE
3554            LDN BASE
3555            ANI #FC             ..CLEAR OUT OLD BAUD RATE
3556            STR BASE
3557            LDN TMP4
3558            BR RXBDR1           ..BR BACK TO EXIT
3559
```

```
3560
3561
3562   ..........................
3563   ..RXERR SUBROUTINE..................
3564   ..........................
3565
3566   ..RECEIVE ERROR PROCESSING SUBROUTINE..
3567
3568       ..ON ENTRY:    RECEIVE ERROR WORD WILL
3569       ..             CONTAIN THE TYPE OF ERROR
3570       ..             RXERRW: 80 = NO RESP.
3571       ..                     40 = INVALID FF/EE
3572       ..                     20 = UART ERROR
3573   ..                         10 = B.F. ERROR
3574
3575       ..ON EXIT:     ERWRD1    - ERROR WORD 1
3576       ..            TMP2(HI) - ERROR WORD 2
3577       ..            TMP2(LO) - ERROR WORD 3
3578
3579
3580   ..TEST FOR TYPE..
3581
3582   RXERR:   LDI A.0(RXERRW)  ..FETCH RX ERROR WORD
3583            PLO BASE
3584            LDA BASE
3585            SHL
3586            BDF RXERR4       ..BR; FORMAT NO RESPONSE
3587            SHL
3588            BDF RXERR3       ..BR; INVALID FF,EE
3589            SHL
3590            BDF RXERR2       ..BR; FORMAT UART ERROR
3591            LDI #10
3592            STR BASE         ..10->WORD 1; B.F. ERROR
3593   RXERR1:  LDI #00
3594            PHI TMP2         ..00 -> WORD 2
3595            PLO TMP2         ..00 -> WORD 3
3596            SEP RETURN       ..EXIT SUBROUTINE
3597   RXERR2:  LDI #F0          ..F0-> WORD 1;UART ERR.
3598            STR BASE
3599            LDN DNINPT       ..FE,FE,or OE ->WORD 2
3600            PHI TMP2
3601            GLO TMP5
3602            PLO TMP2         ..WRD CNT -> WORD3
3603            SEP RETURN       ..EXIT SUBROUTINE
3604   RXERR3:  LDI #00
3605            STR BASE         ..00-> WORD 1
3606            BR RXERR1        ..BR TO EXIT SUBROUTINE
3607   RXERR4:  LDI #60          ..60-> WORD 1; NO RESP
3608            STR BASE
3609            BR RXERR1        ..BR TO EXIT SUBROUTINE
3610
3611
3612
3613
3614            ORG #0F00
```

```
3615
3616  ....................................
3617  ..TMBUSY SUBROUTINE............
3618  ....................................
3619
3620  ..BUSY DETECT TIMEOUT SUBROUTINE..
3621
3622  ..REQUIRED: 4msec TIMEOUT BETWEEN THE TIME A
3623  ..          CUSTOMER IS SELECTED AND THE TIME
3624  ..          BUSY WILL BE VALID
3625
3626  ..ON RETURN: TMP4 =  00; CUSTOMER IS NOT BUSY
3627  ..           TMP4 <> 00; CUSTOMER IS BUSY
3628
3629  TMBUSY: LDI A.0(DNLDB5)
3630          PLO BASE
3631          LDN BASE
3632          ANI #01              ..MASK BIT 0
3633          BZ  TMBUS0           ..OVERIDE FLAG NOT SET
3634          LDI #00
3635          BR  TMBUS2           ..BR TO EXIT
3636  TMBUS0: LDI.A.0(TM7)         ..FETCH BUSY DETECT
3637          PLO TMP1             ..  TMOUT
3638          LDI A.1(TM7)
3639          PHI TMP1
3640          LDN TMP1             ..FETCH FROM ROM
3641          PLO TMP4
3642          GHI BASE             ..STORE TO RAM
3643          PHI TMP1
3644          GLO TMP4
3645          STR TMP1
3646  TMBUS1: SEP CALL
3647          ,A(MAINBS)           ..LOOP THOUGH MAINBS
3648          LDI A.0(TM7)         ..FETCH TMOUT
3649          PLO BASE
3650          LDN BASE
3651          SMI #01              ..DEC COUNT
3652          STR BASE             ..CHECK FOR NEGATIVE
3653          BDF TMBUS1           ..BR; CONTINUE TIMEOUT
3654          SEX FREE             ..SET X TO FREE LOC.
3655          INP 4                ..INPUT BUSY LATCH
3656          ANI #40              ..MASK FOR BUSY BIT
3657  TMBUS2: PLO TMP4             ..SET-UP RETURN FLAG
3658          SEP RETURN           ..EXIT SUBROUTINE
3659
3660
3661
3662
3663
3664  ....................................
3665  ..BRKDWN............................
3666  ....................................
3667
3668  ..BREAKDOWN SUBROUTINE..
3669  ..THIS ROUTINE CONVERTS A RELAY COMMAND INTO
3670  ..  EXPECTED STATUS FOR 4 RELAYS
```

```
3671
3672
3673 BRKDWN: LDN TMP3           ..FETCH COMBINED RELAY WORD
3674         PHI TMP1           ..SAVE IN REGISTER
3675         SEX BASE
3676         LDI A.0(RLMASK)    ..FETCH MASK ADDRESS
3677         PLO BASE
3678         LDI #01            .. START OFF RELAY MASK
3679         STR BASE           .. AT 01
3680
3681         LDN TMP4
3682         PLO TMP1           ..DATA BASE STATUS->TMP1.LO
3683
3684 BRKDN1: GHI TMP1           ..FETCH RELAY INST.
3685         SHR
3686         PHI TMP1           ..SHIFT and SAVE
3687         BNF BRKDN2         ..BR IF NOT 'SET'
3688         GLO TMP1           ..FETCH STATUS
3689         OR                 ..OR IN MASK
3690         PLO TMP1           ..RELAY SHOULD BE 'SET'
3691
3692 BRKDN2: LDN BASE
3693         XRI #FF            ..COMPLIMENT MASK
3694         STR BASE
3695
3696         GHI TMP1           ..FETCH RELAY INST.
3697         SHR
3698         PHI TMP1           ..SHIFT and SAVE
3699         BNF BRKDN3         ..BR IF NOT 'RESET'
3700         GLO TMP1
3701         AND                ..AND IN COMPLIMENT MASK
3702         PLO TMP1           ..RELAY TO BE 'RESET'
3703
3704 BRKDN3: LDN BASE
3705         XRI #FF            ..COMPLIMENT MASK
3706         SHL
3707         STR BASE
3708         BNF BRKDN1         ..BR; CONTINUE BREAKDOWN
3709
3710         GLO TMP1
3711         STR TMP4           ..REPLACE DATA BASE STATUS
3712         SEP RETURN         ..EXIT SUBROUTINE
3713
3714
3715 ..............................................
3716 ..SHIFT........................................
3717 ..............................................
3718
3719 ..RELAY COMMAND GENERATOR..
3720
3721
3722 SHIFT:  LDI #03
3723         PHI TMP1           ..SET UP CNTR #1
3724         LDI #00
3725         PLO TMP1           ..SET UP CNTR #2
3726         GHI TMP2           ..FETCH EXPECTED STATUS
```

```
3727            STR FREE        ..SAVE ON STACK
3728            GLO TMP2        ..FETCH RECEIVED STATUS
3729            XOR             ..COMPARE SHOULD WITH ACTUAL
3730            PLO TMP2        ..SAVE ERROR INDICATOR
3731
3732 SHIFT0:    GLO TMP2        ..FETCH ERROR INDICATOR
3733            SHR
3734            PLO TMP2
3735            BNF SHIFT3      ..BR; NO ERROR THIS SHIFT
3736            GHI TMP1
3737            SMI #01         ..DECREMENT ERROR COUNTER
3738            BNF SHIFT3      ..ALLOW ONLY 3 RELAY
3739            PHI TMP1        .. CHANGES PER TRNSP. INSTR.
3740            LDN FREE        ..SHIFT OUT ACTUAL FOR
3741            SHR             .. EVERY ERROR SHIFT
3742            STR FREE
3743            BNF SHIFT4      ..BR; STATUS INDICATES LO
3744
3745 SHIFT1:    LDN DNOUPT      ..FETCH DUMP LOCATION
3746            SHRC            ..SHIFT IN RELAY CHANGE
3747            STR DNOUPT
3748
3749 SHIFT2:    LDN DNOUPT      ..FETCH DUMP LOCATION
3750            SHRC            ..SHIFT IN RELAY CHANGE
3751            STR DNOUPT
3752
3753            INC TMP1        ..INC THE SHIFT CNTR
3754            GLO TMP1        ..FETCH CNTR #2
3755            XRI #02         ..CHECK IF 2 SHIFTS DONE
3756            BZ SHIFT5       ..BR; 2 SHIFTS DONE
3757
3758            GLO TMP1        ..FETCH CNTR #2
3759            SMI #05         ..SUBTRACT 5
3760            BZ SHIFT3       ..BR; DONE;COMPLETE SHIFTING
3761            BNF SHIFT0      ..BR; NO WHERE NEAR DONE
3762
3763            SEP RETURN      ..ALL DONE TESTING,
3764                            .. SHIFTING AND FORMATTING
3765                            .. PROPER RELAY INST. WORD
3766
3767 SHIFT3:    LDN FREE
3768            SHR
3769            STR FREE
3770            SMI #FF         ..SET DF = 0.
3771            BR SHIFT1
3772
3773 SHIFT4:    LDN DNOUPT      ..DF = 0
3774            SHRC            ..SHIFT IN A ZERO
3775            STR DNOUPT
3776            SMI #00         ..SET DF = 1
3777            BR SHIFT2       ..BR TO SHIFT IN THE 1
3778
3779 SHIFT5:    LDN DNOUPT      ..FINISHED WITH WORD 1
3780            ADI #05         ..ADD ON THE RELAY INSTR.
3781            STR DNOUPT
```

```
3782            INC DNOUPT      ..BASE NOW POINTS TO
3783            BR SHIFT0       .. INSTRUCTION WORD 2
3784
3785
3786    ..............................
3787    ..PARITY LOOK UP TABLE........
3788    ..............................
3789
3790            ORG #0E00
3791
3792    PARTAB: ,X'0019322B'
3793            ,X'647D564F'
3794            ,X'C8D1FAE3'
3795            ,X'ACB59E87'
3796            ,X'8990BBA2'
3797            ,X'EDF4DFC6'
3798            ,X'4158736A'
3799            ,X'253C170E'
3800            ,X'0B123920'
3801            ,X'6F765D44'
3802            ,X'C3DAF1E8'
3803            ,X'A7BE958C'
3804            ,X'829BB0A9'
3805            ,X'E6FFD4CD'
3806            ,X'4A537861'
3807            ,X'2E371C05'
3808            ,X'160F243D'
3809            ,X'726B4059'
3810            ,X'DEC7ECF5'
3811            ,X'BAA38891'
3812            ,X'9F86ADB4'
3813            ,X'FBE2C9D0'
3814            ,X'574E657C'
3815            ,X'332A0118'
3816            ,X'1D042F36'
3817            ,X'79604B52'
3818            ,X'D5CCE7FE'
3819            ,X'B1A8839A'
3820            ,X'948DA6BF'
3821            ,X'F0E9C2DB'
3822            ,X'5C456E77'
3823            ,X'38210A13'
3824            ,X'2C351E07'
3825            ,X'48517A63'
3826            ,X'E4FDD6CF'
3827            ,X'8099B2AB'
3828            ,X'A5BC978E'
3829            ,X'C1D8F3EA'
3830            ,X'6D745F46'
3831            ,X'09103B22'
3832            ,X'273E150C'
3833            ,X'435A7168'
3834            ,X'EFF6DDC4'
3835            ,X'8B92B9A0'
3836            ,X'AEB79C85'
3837            ,X'CAD3F8E1'
```

```
3838        ,X'667F5440'
3839        ,X'021B3029'
3840        ,X'3A230811'
3841        ,X'5E476C75'
3842        ,X'F2EBC0D9'
3843        ,X'968FA4BD'
3844        ,X'B3AA8198'
3845        ,X'D7CEE5FC'
3846        ,X'7B624950'
3847        ,X'1F062D34'
3848        ,X'3128031A'
3849        ,X'554C677E'
3850        ,X'F9E0CBD2'
3851        ,X'9D84AFB6'
3852        ,X'B8A18A93'
3853        ,X'DCC5EEF7'
3854        ,X'7069425B'
3855        ,X'140D263F'
3856
```

What I claim is:

1. A high speed central office scanner for communicating with a plurality of transponding units connected by telephone lines; said scanner is comprised of:
A. N, I/O means, where N is a positive integer, each I/O means comprising:
   (a) multiplex means for connecting said I/O means to M telephone lines, each telephone line being connected to at least one transponder, where M is a positive integer;
   (b) a microprocessor;
   (c) multiplex logic means, controlled by said microprocessor for sequentially selecting one of said M telephone lines;
   (d) a bush detect means for checking said selected line and producing a signal when said selected line is busy;
   (e) transmitting-receiving means connected to said selected line, controlled by said microprocessor for transmitting an instruction code to a transponder connected thereto when said signal is absent, and receiving data from said transponder in response to said instruction code;
   (f) storage means; and
   (g) I/O interface logic means,
wherein said microprocessor analyzes the received data and enters the received data in said storage means if the received data satisfies a predetermined criterion;
B. master microprocessor means comprising:
   (a) interface logic means connected with said I/O interface logic means of each of said N, I/O means;
   (b) a main microprocessor for sequentially selecting one of said N, I/O means and for generating an interrogation code for transmission to each selected I/O means to enquire if said selected I/O means has received data stored therein;
   (c) main storage means for storing received data from said selected I/O means; and
   (d) main transmitting-receiving means for transmitting said received data stored in said main storage means upon receipt of a further interrogation code;
wherein each said N, I/O means scan said M telephone lines independently and asynchronously with respect to each other of said N, I/O means and said master microprocessor means.

2. The scanner according to claim 1, further including a central computer connected to P, said master microprocessing means so that the scanner now contains NP, I/O means scanning MNP telephone lines, where P is a positive integer; said central computer sequentially selecting each of said P master microprocessor means, said central computer generating said further interrogation code and receiving the received data transmitted from said selected master microprocessing means.

3. The scanner according to claim 2 further comprising a data concentrator is connected between said central computer and said P master microprocessors, said data concentrator being connected to a direct memory access port of said central computer, said data concentrator comprising a direct memory access interface connecting said direct memory access port and a data concentrator master microprocessor, said data concentrator master microprocessor being connected to P data concentrator slave microprocessors each of which is connected in a one-to-one correspondence with said P master microprocessors, wherein said data concentrator master microprocessor sequentially selects each of said P data concentrator slave microprocessors and generates said further interrogation code and receives data transmitted from said selected master microprocessor means for transmitting to said central computer.

4. The scanner according to claim 2, wherein said P master microprocessor means are connected to said central computer via P high speed links, each of said P high speed links includes a first data set located adjacent said master microprocessing means for converting digital data stored in said main storage means for transmission to said central computer into signals for telephone line transmission and for converting telephone signals from said central computer into digital data for use by said master microprocessing means, and a second data set located adjacent said central computer for converting digital data produced by said central computer into signals for telephone line transmission for transmission to said first data set and for converting telephone signals transmitted by said first data set into digital data for use by said central computer.

5. The scanner according to claim 3, wherein said P master microprocessor means are connected to said central computer via P high speed links, each of said P high speed links includes a first data set located adjacent said master microprocessing means for converting digital data stored in said main storage means for transmission to said central computer into signals for telephone line transmission and for converting telephone signals from said central computer into digital data for use by said master microprocessing means, and a second data set located adjacent said data concentrator for converting digital data produced by said central computer into signals for telephone line transmission for transmission to said first data set and for converting telephone signals transmitted by said first data set into digital data for use by said central computer.

6. The scanner according to claim 1, wherein said multiplex means includes M double-pole, single-throw solid state switches, with each switch of said M switches being connected to one of said M telephone lines in a one-to-one correspondence so that each of said M telephone lines is selectively connected to said scanner.

7. The scanner according to claim 6, wherein each said switch is activated by a select signal produced by said microprocessor and wherein each said switch is operated by a power supply having one of its polarities connected to a logic ground; wherein each of said M telephone lines is comprised of a tip line and a ring line; wherein said tip line is terminated to a central office ground, via a portion of said busy detect means, and wherein said logic ground is isolated from said central office ground.

8. The scanner according to claim 7, wherein said busy detect means includes a light emitting diode connected between said tip line of said selected telephone line and said central office ground, said LED being forward biased only by a voltage appearing between said tip line and said central office ground when said selected telephone line is in use, and a phototransistor located directly adjacent said light emitting diode, said phototransistor being biased into a conductive state as a result of the forward biasing of said LED.

9. The scanner according to claim 6, wherein each said switch is activated by a select signal produced by said microprocessor and wherein each said switch is operated by a power supply having one of its polarities connected to a logic ground; wherein each of said M telephone lines is comprised of a tip and a ring line wherein said tip and ring lines are isolated from said logic ground; and wherein said busy detect means is connected across the tip and ring lines of said selected telephone line, said busy detect means comprising full wave bridge rectifier means connected to said selected tip and ring lines via a resistor means, a light emitting diode connected across said rectifying means; a phototransistor connected as an analog amplifier the output of which is connected to a Schmitt trigger means, said analog amplifier being biased to produce a signal at the output of said Schmitt trigger means when the DC voltage across said selected tip and ring lines drops below a predetermined DC voltage thereby indicating a busy condition on said selected telephone line.

* * * * *